US011245891B2

(12) United States Patent
Cole et al.

(10) Patent No.: US 11,245,891 B2
(45) Date of Patent: Feb. 8, 2022

(54) METHODS AND APPARATUS FOR ENVIRONMENTAL MEASUREMENTS AND/OR STEREOSCOPIC IMAGE CAPTURE

(71) Applicant: Nevermind Capital LLC

(72) Inventors: David Cole, Laguna Beach, CA (US); Alan McKay Moss, Laguna Beach, CA (US); Hector M Medina, Monroe, NY (US)

(73) Assignee: Nevermind Capital LLC, Wilmington, DE (US)

( * ) Notice: Subject to any disclaimer, the term of this patent is extended or adjusted under 35 U.S.C. 154(b) by 174 days.

(21) Appl. No.: 15/072,227

(22) Filed: Mar. 16, 2016

(65) Prior Publication Data

US 2016/0269716 A1    Sep. 15, 2016

Related U.S. Application Data

(63) Continuation of application No. 14/952,910, filed on Nov. 25, 2015, now Pat. No. 10,531,071.
(Continued)

(51) Int. Cl.
*H04N 13/243* (2018.01)
*H04N 13/128* (2018.01)
(Continued)

(52) U.S. Cl.
CPC ......... *H04N 13/243* (2018.05); *H04N 5/2251* (2013.01); *H04N 13/128* (2018.05);
(Continued)

(58) Field of Classification Search
CPC .......... H04N 13/0242; H04N 13/0022; H04N 13/243; H04N 13/239; H04N 13/161;
(Continued)

(56) References Cited

U.S. PATENT DOCUMENTS 3,608,458 A * 9/1971 Ratliff, Jr. .............. G03B 35/00
                                                        396/326
7,463,280 B2 * 12/2008 Steuart, III ............ G03B 35/08
                                                        348/36
(Continued)

OTHER PUBLICATIONS

Notification of Transmittal of the International Search Report and the Written Opinion of the International Searching Authority, International Search Report and Written Opinion of the International Searching Authority from PCT/US2016/014319 dated Jun. 9, 2016 1-8 pages.
(Continued)

*Primary Examiner* — Joseph Suh
(74) *Attorney, Agent, or Firm* — Blank Rome LLP

(57) ABSTRACT

A camera rig including one or more stereoscopic camera pairs and/or one or more light field cameras are described. Images are captured by the light field cameras and stereoscopic camera pairs are captured at the same time. The light field images are used to generate an environmental depth map which accurately reflects the environment in which the stereoscopic images are captured at the time of image capture. In addition to providing depth information, images captured by the light field camera or cameras is combined with or used in place of stereoscopic image data to allow viewing and/or display of portions of a scene not captured by a stereoscopic camera pair.

20 Claims, 38 Drawing Sheets

Related U.S. Application Data

(60) Provisional application No. 62/260,238, filed on Nov. 25, 2015, provisional application No. 62/257,651, filed on Nov. 19, 2015, provisional application No. 62/106,122, filed on Jan. 21, 2015.

(51) Int. Cl.

| | | |
|---|---|---|
| *H04N 13/239* | (2018.01) | |
| *H04N 5/225* | (2006.01) | |
| *H04N 13/194* | (2018.01) | |
| *H04N 13/282* | (2018.01) | |
| *H04N 13/232* | (2018.01) | |
| *H04N 13/161* | (2018.01) | |
| *H04N 13/00* | (2018.01) | |

(52) U.S. Cl.
CPC ......... *H04N 13/161* (2018.05); *H04N 13/194* (2018.05); *H04N 13/232* (2018.05); *H04N 13/239* (2018.05); *H04N 13/282* (2018.05); *H04N 2013/0081* (2013.01); *H04N 2213/001* (2013.01)

(58) Field of Classification Search
CPC .. H04N 13/282; H04N 13/194; H04N 13/232; H04N 13/128; H04N 5/2251; H04N 2213/001; H04N 2013/0081
USPC .......................................................... 348/48
See application file for complete search history.

(56) References Cited

U.S. PATENT DOCUMENTS

| | | | |
|---|---|---|---|
| 7,949,252 B1 | 5/2011 | Georgiev | |
| 8,451,320 B1 | 5/2013 | Cole et al. | |
| 8,610,757 B2 | 12/2013 | Cole et al. | |
| 9,204,127 B1 | 12/2015 | Cole et al. | |
| 9,300,946 B2 * | 3/2016 | Do | H04N 13/257 |
| 9,313,474 B1 | 4/2016 | Cole et al. | |
| 9,407,902 B1 | 8/2016 | Cole et al. | |
| 9,485,494 B1 | 11/2016 | Cole et al. | |
| 9,538,160 B1 | 1/2017 | Cole | |
| 9,699,437 B2 | 7/2017 | Cole et al. | |
| 9,729,850 B2 | 8/2017 | Cole et al. | |
| 9,821,920 B2 | 11/2017 | Cole et al. | |
| 9,832,449 B2 | 11/2017 | Cole et al. | |
| 9,832,450 B2 | 11/2017 | Cole et al. | |
| 9,836,845 B2 | 12/2017 | Cole et al. | |
| 9,843,689 B1 * | 12/2017 | Heller | H04N 1/00267 |
| 9,865,055 B2 | 1/2018 | Cole et al. | |
| 9,894,350 B2 | 2/2018 | Cole et al. | |
| 9,912,965 B2 | 3/2018 | Cole et al. | |
| 9,918,136 B2 | 3/2018 | Cole et al. | |
| 9,930,318 B2 | 3/2018 | Cole et al. | |
| 9,955,147 B2 | 4/2018 | Cole et al. | |
| 2002/0173367 A1 * | 11/2002 | Gobush | A63B 24/0003 473/197 |
| 2004/0246333 A1 * | 12/2004 | Steuart, III | G03B 35/08 348/36 |
| 2007/0014347 A1 * | 1/2007 | Prechtl | H04N 5/23293 375/240.01 |
| 2011/0187878 A1 * | 8/2011 | Mor | H04N 13/207 348/218.1 |
| 2011/0249100 A1 * | 10/2011 | Jayaram | H04N 5/23238 348/48 |
| 2012/0105574 A1 * | 5/2012 | Baker | G03B 37/04 348/36 |
| 2012/0176481 A1 * | 7/2012 | Lukk | H04N 13/243 348/47 |
| 2012/0188344 A1 * | 7/2012 | Imai | H04N 5/235 348/47 |
| 2012/0249730 A1 * | 10/2012 | Lee | G06T 7/11 348/38 |
| 2013/0033582 A1 * | 2/2013 | Sun | H04N 13/122 348/47 |
| 2013/0271729 A1 * | 10/2013 | Ranchod | A61B 3/117 351/206 |
| 2014/0035959 A1 * | 2/2014 | Lapstun | G02B 26/08 345/690 |
| 2014/0044420 A1 * | 2/2014 | Kagaya | H04N 9/87 386/343 |
| 2014/0104378 A1 * | 4/2014 | Kauff | H04N 5/247 348/38 |
| 2014/0104395 A1 * | 4/2014 | Rohaly | G01B 11/165 348/47 |
| 2014/0146132 A1 * | 5/2014 | Bagnato | G03B 37/04 348/36 |
| 2014/0147050 A1 * | 5/2014 | S V | G06T 3/4053 382/201 |
| 2014/0159721 A1 * | 6/2014 | Grodzki | G01R 33/48 324/309 |
| 2014/0168415 A1 * | 6/2014 | Ihlenburg | H04N 5/2254 348/118 |
| 2014/0184758 A1 * | 7/2014 | Lee | G06F 3/147 348/51 |
| 2014/0267596 A1 * | 9/2014 | Geerds | H04N 5/2252 348/38 |
| 2014/0267776 A1 * | 9/2014 | Duthu | G01S 17/89 348/169 |
| 2014/0327736 A1 * | 11/2014 | DeJohn | H04N 13/128 348/43 |
| 2014/0340390 A1 * | 11/2014 | Lanman | H04N 13/344 345/419 |
| 2014/0341484 A1 * | 11/2014 | Sebring | G06T 7/70 382/284 |
| 2014/0375788 A1 | 12/2014 | Gabara | |
| 2015/0116453 A1 * | 4/2015 | Hirata | G03B 37/04 348/38 |
| 2015/0145966 A1 * | 5/2015 | Krieger | H04N 13/122 348/47 |
| 2015/0163478 A1 * | 6/2015 | Geiss | H04N 13/243 348/47 |
| 2015/0172633 A1 * | 6/2015 | Nobori | H04N 5/23238 348/36 |
| 2015/0208060 A1 * | 7/2015 | Kim | H04N 13/243 348/51 |
| 2015/0215601 A1 * | 7/2015 | Zhou | G06F 3/013 348/43 |
| 2015/0302592 A1 * | 10/2015 | Bruls | G06T 7/50 348/44 |
| 2015/0312445 A1 * | 10/2015 | Cha | G06F 1/1626 348/48 |
| 2015/0316767 A1 | 11/2015 | Ebstyne et al. | |
| 2015/0326847 A1 * | 11/2015 | Zhou | H04N 13/221 348/50 |
| 2015/0341617 A1 * | 11/2015 | Cole | G03B 17/561 348/36 |
| 2015/0341619 A1 * | 11/2015 | Meir | G01S 17/87 348/47 |
| 2015/0346812 A1 | 12/2015 | Cole et al. | |
| 2015/0346832 A1 | 12/2015 | Cole et al. | |
| 2016/0012633 A1 * | 1/2016 | Wei | G06T 7/593 345/420 |
| 2016/0037097 A1 * | 2/2016 | Duparre | H01L 29/127 348/241 |
| 2016/0065946 A1 | 3/2016 | Cole et al. | |
| 2016/0065947 A1 | 3/2016 | Cole et al. | |
| 2016/0080728 A1 | 3/2016 | Cole et al. | |
| 2016/0137126 A1 * | 5/2016 | Fursich | B60R 1/00 348/38 |
| 2016/0191897 A1 * | 6/2016 | Small | H04N 5/232133 348/49 |
| 2016/0205394 A1 * | 7/2016 | Meng | H04N 17/002 348/187 |
| 2016/0212403 A1 | 7/2016 | Cole et al. | |
| 2016/0212404 A1 * | 7/2016 | Maiello | A61B 3/032 |
| 2016/0212409 A1 | 7/2016 | Cole et al. | |
| 2016/0212411 A1 * | 7/2016 | Lindner | G06T 5/50 |
| 2016/0219262 A1 | 7/2016 | Cole et al. | |

(56) References Cited

U.S. PATENT DOCUMENTS

| | | |
|---|---|---|
| 2016/0219305 A1 | 7/2016 | Cole et al. |
| 2016/0227190 A1 | 8/2016 | Cole et al. |
| 2016/0239978 A1 | 8/2016 | Cole et al. |
| 2016/0241836 A1 | 8/2016 | Cole et al. |
| 2016/0241837 A1 | 8/2016 | Cole et al. |
| 2016/0241838 A1 | 8/2016 | Cole et al. |
| 2016/0241892 A1 | 8/2016 | Cole et al. |
| 2016/0253795 A1 | 9/2016 | Cole et al. |
| 2016/0253809 A1 | 9/2016 | Cole et al. |
| 2016/0253810 A1 | 9/2016 | Cole et al. |
| 2016/0253839 A1 | 9/2016 | Cole et al. |
| 2016/0255326 A1 | 9/2016 | Cole et al. |
| 2016/0255327 A1 | 9/2016 | Cole et al. |
| 2016/0360180 A1 | 12/2016 | Cole et al. |
| 2016/0373734 A1 | 12/2016 | Cole et al. |
| 2017/0050743 A1 | 2/2017 | Cole et al. |
| 2017/0061600 A1 | 3/2017 | Cole et al. |
| 2017/0094247 A1 | 3/2017 | Cole et al. |
| 2017/0109931 A1* | 4/2017 | Knorr .................. G06T 19/006 |
| 2017/0150122 A1 | 5/2017 | Cole |
| 2017/0324945 A1 | 11/2017 | Cole et al. |
| 2017/0359564 A1 | 12/2017 | Cole et al. |
| 2018/0020206 A1 | 1/2018 | Sheridan |
| 2018/0024419 A1 | 1/2018 | Sheridan |
| 2018/0027152 A1 | 1/2018 | Sheridan |
| 2020/0021720 A1* | 1/2020 | Wang .................. H04N 5/2258 |

OTHER PUBLICATIONS

U.S. Appl. No. 14/952,910 titled "Methods and Apparatus for Environmental Measurements and/or Stereoscopic Image Capture" filed Nov. 25, 2015, pp. 1-87.

\* cited by examiner

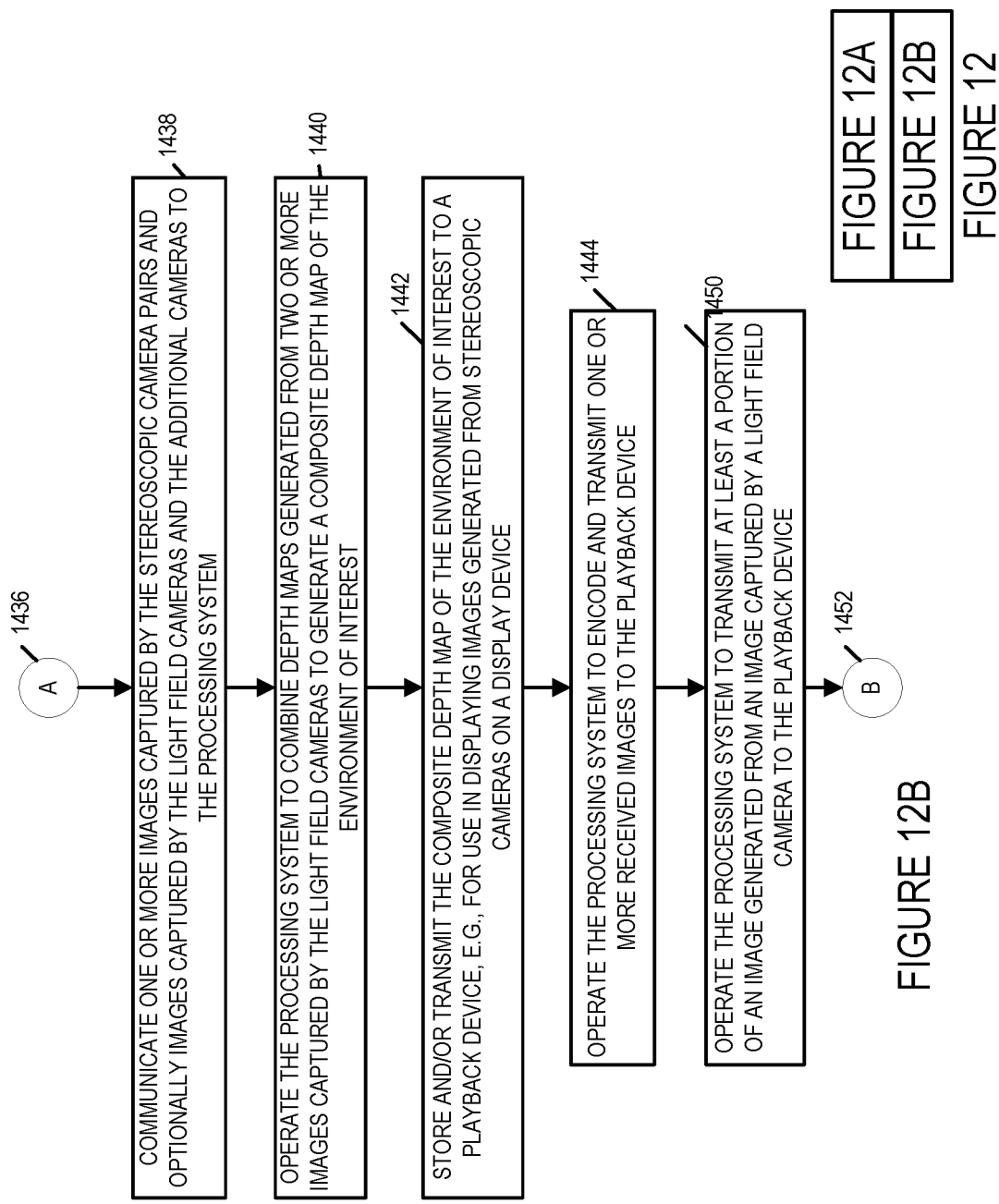

METHODS AND APPARATUS FOR ENVIRONMENTAL MEASUREMENTS AND/OR STEREOSCOPIC IMAGE CAPTURE

RELATED APPLICATIONS

The present application is a continuation of U.S. patent application Ser. No. 14/952,910 filed Nov. 25, 2015 which claims the benefit of U.S. Provisional Patent Application Ser. No. 62/106,122 filed Jan. 21, 2015, U.S. Provisional Patent Application Ser. No. 62/257,651 filed Nov. 19, 2015, and U.S. Provisional Patent Application Ser. No. 62/260,238 filed Nov. 25, 2015, each of which is hereby expressly incorporated by reference in its entirety.

FIELD

The present invention relates to methods and apparatus for making environmental measurements and/or capturing stereoscopic images, e.g., pairs of left and right eye images.

BACKGROUND

Stereoscopic playback devices, e.g., display devices which are capable of displaying different images to a users left and right eyes, are growing in popularity. Unfortunately, there is limited stereoscopic content available for such devices at the present time. This is due, in part to the difficulty with existing camera systems and rigs to capture images that are well suited for presentation as stereoscopic images with a realistic 3D effect.

Rather than capture two images in parallel, e.g., a left and right eye image, many systems have take the approach of capturing images using multiple cameras each oriented in a different direction and then using computations to simulate 3D effects and generate left and right eye images for playback. In such cases left and right eye images, e.g., stereoscopic image pairs, are not captured in parallel but rather generated through relatively complicated computational processing intended to generate image pairs.

While the computational approach to generating stereoscopic image content from images captured by cameras facing different directions can have some advantages in that the camera rig need not simulate the human visual system and/or in terms of the number of cameras needed the computational processing associated with such an approach has certain disadvantages in terms of the quality of the 3D content which is generated and is also not well suited for real time content capture and streaming to playback devices given the number and time involved with generating pairs of left and right eye images from the content captured by cameras which are arranged in a configuration very different from the spacing and/or orientation of a normal human's pair of eyes.

In addition to capturing stereoscopic image content, depth measurements are also desirable so that an accurate model of an environment can be generated and used during playback. While static environmental models may be used it would be highly desirable if environmental measurements, e.g., depth measurements relative to a camera position, could be made during an event and used to generate or update an environmental module.

It would be desirable if environmental measurements could be made during an event from the same rig used to capture stereoscopic camera images so that the measurement accurately reflect distances, e.g., depths.

In view of the above, it should be appreciated that there is a need for improved methods and/or apparatus for capturing and/or processing stereoscopic image content. In addition there is a need for methods and/or apparatus for capturing environmental information, e.g., depth information, which can be used for generating or updating a 3D model of an environment. It should be appreciated that to be beneficial or desirable a device need not support both stereoscopic image capture and environmental measurements but it would be desirable if in at least some embodiments a camera rig could capture stereoscopic image content as well as environmental measurement information.

BRIEF DESCRIPTION OF THE DRAWINGS

FIG. 12B is a second part of FIG. 12 which illustrates a flowchart of an exemplary method of operating an imaging apparatus in accordance with some embodiments.

FIG. 12, shows how FIGS. 12A and 12B in combination comprise FIG. 12.

SUMMARY

Figure 1:
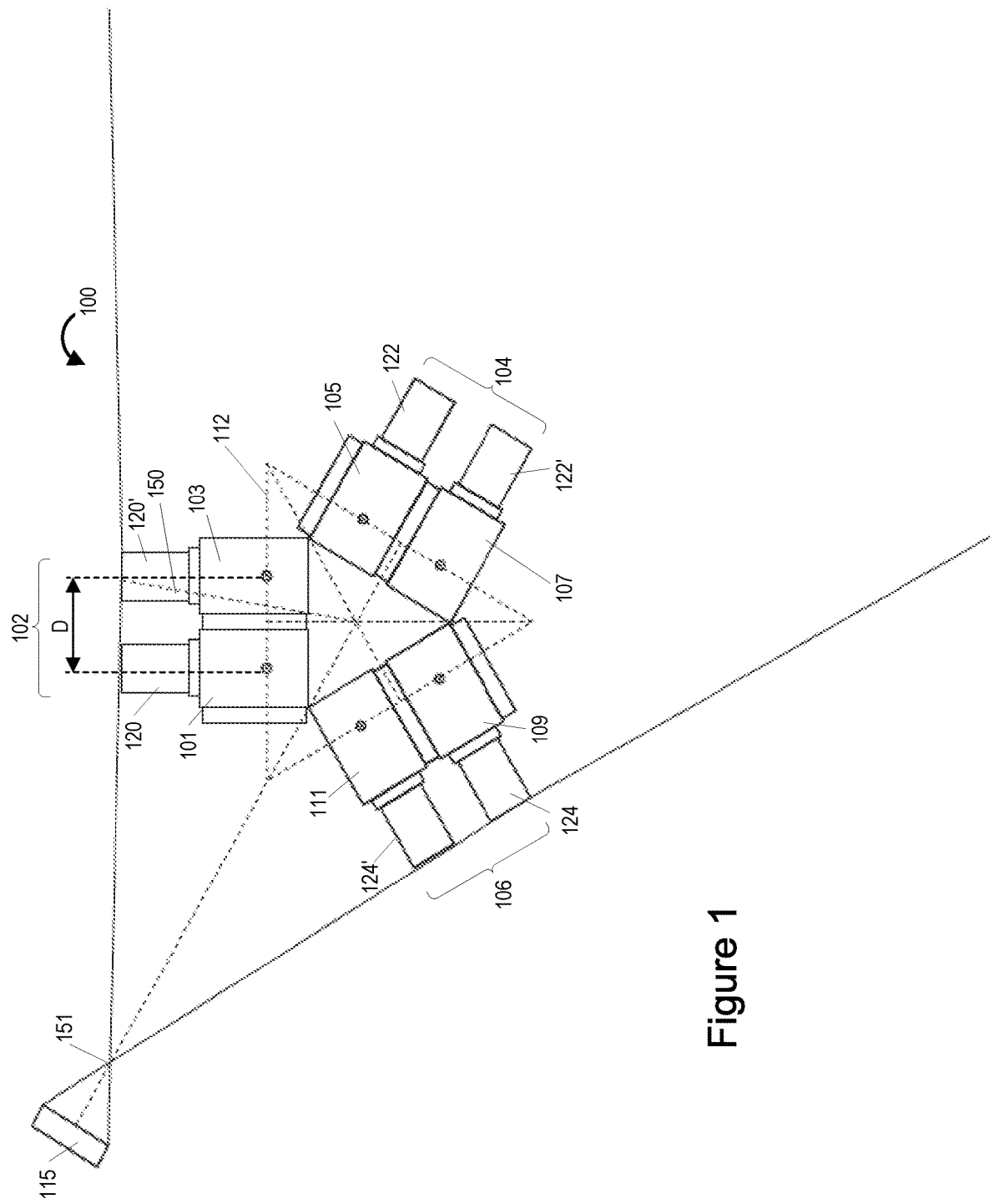
FIG. 1 illustrates a camera rig implemented in accordance with one embodiment along with a calibration target which may be used to for calibrating the camera rig.

Methods and apparatus for capturing stereoscopic image content and/or making environmental measurements are described.

In at least some embodiments a camera rig including one or more pairs of cameras are used. In one embodiment a camera rig includes at least a first camera pair including first and second cameras used to capture left and right eye images in parallel. The cameras in the first camera pair in some embodiments are arranged in parallel facing in a first direction and are operated in parallel. The spacing between the camera pairs in some but not necessarily all embodiments is intended to approximate the spacing between a human's pair of eyes. In some embodiments multiple pairs of cameras are arranged on a camera rig with the different pairs of cameras being spaced in a horizontal plane to capture a 360 degree view of the environment.

The spacing between camera pairs maybe and in some embodiments is uniform. In some embodiment not only is the spacing between camera pairs the same, the spacing between cameras is also intentionally arranged so the distance between the optical axis of one camera to the optical axis of another camera in the horizontal plane is the same whether the distance between optical axis is being measured between adjacent cameras of a camera pair or between adjacent cameras of different camera pairs. Such uniform spacing is not required for all embodiments but is used in at least some embodiments.

In some but not all embodiments an upward camera or camera pair may be included in addition to the multiple horizontal outward facing camera pairs. In addition in some embodiments a downward camera or camera pair may be included in addition to the vertical camera or camera pair and/or horizontal camera pairs. To allow capture of images of the ground the lens or lens assembly of the downward facing camera may extend through a support ring used to secure the camera rig to a support structure such as a tripod or four legged stand.

In some embodiments the legs of the camera support structure are aligned with the interface between camera pairs with lenses facing in a generally horizontal outward facing direction. In this manner, the legs will appear in peripheral portions of images captured by cameras which are facing in a generally horizontal direction and not block or appear at the center of images captured by such cameras. Legs of the support structure may be of a predetermined color. The use of a predetermined color for the legs facilitates removal of pixels corresponding to the legs from captured images. In some embodiments portions of the legs which are captured by a camera are removed or concealed by processing the captured images before streaming of the captured image content to a playback device or devices. The portions of the leg may be replaced with pixel values from adjacent non-leg portions of an image being processed and/or concealed through other techniques such as blurring.

By using multiple pairs of cameras to capture left and right eye images, mounted on a camera single camera rig, it is possible to capture stereoscopic image content, e.g., pairs of left and right eye images in a synchronized manner in multiple directions, e.g., directions that may be need to generate a complete or nearly complete 360 degree world view from the position of the camera rig.

Because image pairs are captured, less processing may be required than in systems where stereoscopic image pairs are synthesized via computational approaches from camera views captured by cameras oriented in different, e.g., nonparallel, directions. Thus, the camera rig of the present invention is well suited for capturing image content intended to be streamed in real or near real time, e.g., live content of a sporting event, concert or another event. Furthermore, because multiple camera pairs are mounted on a single camera rig, the rig assembly is relatively easy to set up and transport. Furthermore, the rig assembly is well suited for mounting on a tripod or other movable base making for relatively easy deployment at field locations including sporting events, concerts, etc. Given that the rig provides for fixed camera spacing relationships and a fixed height from the ground, computational processing and combining of images can be performed in a manner that takes into consideration the known rig configuration and camera spacing arrangement.

While various embodiments are well suited for capturing stereo image pairs in multiple directions in a synchronized manner in real time, the camera rig in some embodiments is also well equipped for making environmental measurements, e.g., depth measures from the camera rig through the use of a light field camera. In some embodiments, in addition to one or more stereoscopic camera pairs, a light field camera or array of light field cameras is oriented in the same direction as one or more cameras used to capture left and right eye images. The light field cameras are used to measure depth from the camera rig to objects in the field of view of the light field camera. The depths measures are used in some embodiments to update an environmental model while an event is ongoing. In such embodiments the light field cameras provide depth information and the environmental module can be updated in response to changes in the position of objects. The updated environmental depth map information generated from one or more light field camera is communicated to a playback device in some cases and used to update an environmental map upon which captured images are displayed as textures. Thus, in some embodiments the camera rig can capture depth information which can be used to update an environmental module during an event.

It should be appreciated that with its ability to capture pairs of left and right eye images in multiple directions in a synchronized manner and to update an environmental map using depth information obtained from images captured by one or more light field cameras included on the camera rig in some embodiments, the camera rig of the present invention is well suited for supporting real time content capture and streaming for virtual reality playback devices.

Numerous benefits and features are discussed in the detailed description which follows.

DETAILED DESCRIPTION

The present invention is related to the field of panoramic stereoscopic imagery and more particularly, to an apparatus suitable for capturing high-definition, high dynamic range, high frame rate stereoscopic, 360-degree panoramic video using a minimal number of cameras in an apparatus of small size and at reasonable cost while satisfying weight, and power requirements for a wide range of applications.

Stereoscopic, 360-degree panoramic video content is increasingly in demand for use in virtual reality displays. In order to produce stereoscopic, 360-degree panoramic video content with 4K or greater of resolution, which is important for final image clarity, high dynamic range, which is important for recording low-light content, and high frame rates, which are important for recording detail in fast moving content (such as sports), an array of professional grade, large-sensor, cinematic cameras or of other cameras of suitable quality is often needed.

Camera methods and apparatus including camera apparatus and/or methods which are well suited for capturing stereoscopic image data, e.g., pairs of left and right eye images are described. Various features relate to the field of panoramic stereoscopic imagery and more particularly, to an apparatus suitable for capturing images, e.g., high-definition video images. The images may have a high dynamic range, high frame rate, and in some embodiments support 360-degree panoramic video. A camera rig implemented in accordance with various features may use one or more pairs of cameras and/or a camera pair in combination with one or more single cameras. The rig allows for a minimal number of cameras to be used for a given application in an apparatus of small size and at reasonable cost while satisfying weight, and power requirements for a wide range of applications. In some embodiments a combination of stereoscopic cameras and Light Field cameras (also referred to as Lytro cameras) arranged in a specific manner is used.

Stereoscopic, 360-degree panoramic video content is increasingly in demand for use in 3D stereoscopic playback systems and/or virtual reality displays. In order to produce stereoscopic, 360-degree panoramic video content, e.g., with 4K, or greater of resolution, which is important for final image clarity, high dynamic range, which is important for recording low-light content, and high frame rates, which are important for recording detail in fast moving content (such as sports), an array of professional grade, large-sensor, cinematic cameras or of other cameras of suitable quality is often needed.

In order for the camera array to be useful for capturing 360-degree, stereoscopic content for viewing in a stereoscopic virtual reality display, the camera array should acquire the content such that the results approximate what the viewer would have seen if his head were co-located with the camera. Specifically, the pairs of stereoscopic cameras should be configured such that their inter-axial separation is within an acceptable delta from the accepted human-model average of 63 mm (millimeters). Additionally, the distance from the panoramic array's center point to the entrance pupil of a camera lens (aka nodal offset) should be configured such that it is within an acceptable delta from the accepted human-model average of 101 mm (millimeters).

In order for the camera array to be used to capture events and spectator sports where it should be compact and non-obtrusive, it should be constructed with a relatively small physical footprint allowing it to be deployed in a wide variety of locations and shipped in a reasonable sized container when shipping is required. The camera array should also be designed, if possible, such that the minimum imaging distance of the array is small, e.g., as small as possible, which minimizes the "dead zone" where scene elements are not captured because they fall outside of the field of view of adjacent cameras. The camera rig of the present invention show in FIG. 1 and various other embodiments addresses one or more of these design goals.

It would be advantageous if the camera array included in the rig can be calibrated for optical alignment by positioning calibration targets where the highest optical distortion is prone to occur (where lens angles of view intersect and the maximum distortion of the lenses occur). To facilitate the most efficacious calibration target positioning, target locations should, and in some embodiments are, determined formulaically from the rig design.

Figure 4:
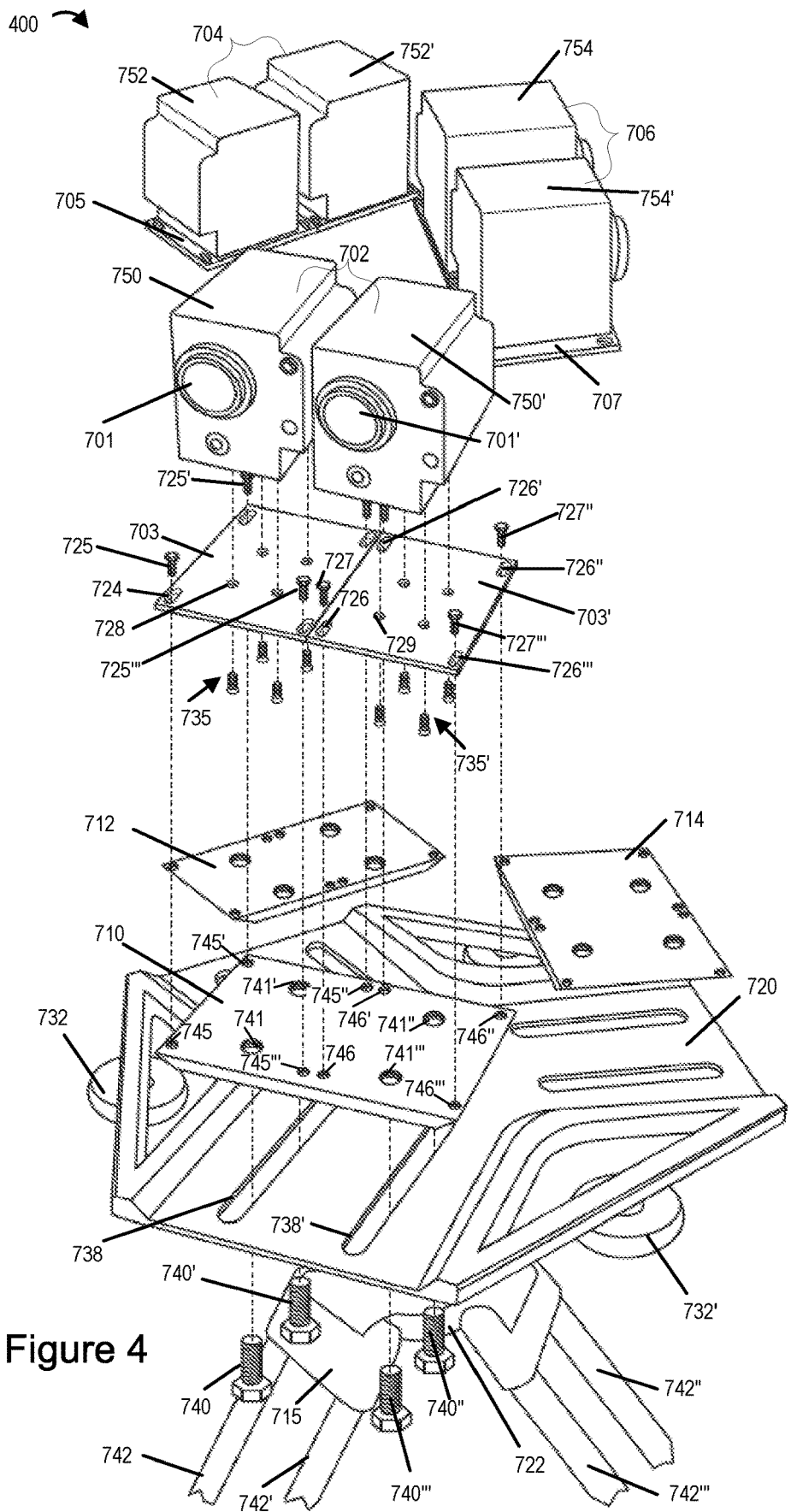
FIG. 4 illustrates another exemplary camera rig implemented in accordance with an exemplary embodiment with various elements of the camera rig being shown for clarity in partially disassembled form.

FIG. 1 shows an exemplary camera configuration used in some embodiments. The support structure shown in FIGS. 4 and 5 is not shown in FIG. 1 to allow for better appreciation of the camera pair arrangement shown used in some embodiments.

While in some embodiments three camera pairs are used such as in the FIG. 1 example in some but not all embodiments a camera array, e.g., the camera positions of the rig, is populated with only 2 of the 6-total cameras which may be used to support simultaneous 360-degree stereoscopic video. When the camera rig or assembly is configured with less than all 6 cameras which can be mounted in the rig, the rig is still capable of capturing the high-value, foreground 180-degree scene elements in real-time while manually capturing static images of the lower-value, background 180-degree scene elements, e.g., by rotating the rig when the foreground images are not being captured. For example, in some embodiments when a 2-camera array is used to capture a football game with the field of play at the 0-degree position relative to the cameras, the array is manually rotated around the nodal point into the 120-degree and 240-degree positions. This allows the action on the field of a sports game or match, e.g., foreground, to be captured in real time and the sidelines and bleachers, e.g., background areas, to be captured as stereoscopic static images to be used to generate a hybridized panorama including real time stereo video for the front portion and static images for the left and right rear portions. In this manner, the rig can be used to capture a 360 degree view with some portions of the 360 view being captured at different points in time with the camera rig being rotated around its nodal axis, e.g., vertical center point between the different points in time when the different view of the 360 scene area are captured. Alternatively, single cameras may be mounted in the second and third camera pair mounting positions and mono (non-stereoscopic) video captured for those areas.

In other cases where camera cost is not an issue, more than two cameras can be mounted at each position in the rig with the rig holding up to 6 cameras as in the FIG. 1 example. In this manner, cost effect camera deployment can be achieved depending on the performance to be captured and, the need or ability of the user to transport a large number, e.g., 6 cameras, or the user's ability to transport fewer than 6 cameras, e.g., 2 cameras.

Figure 5:
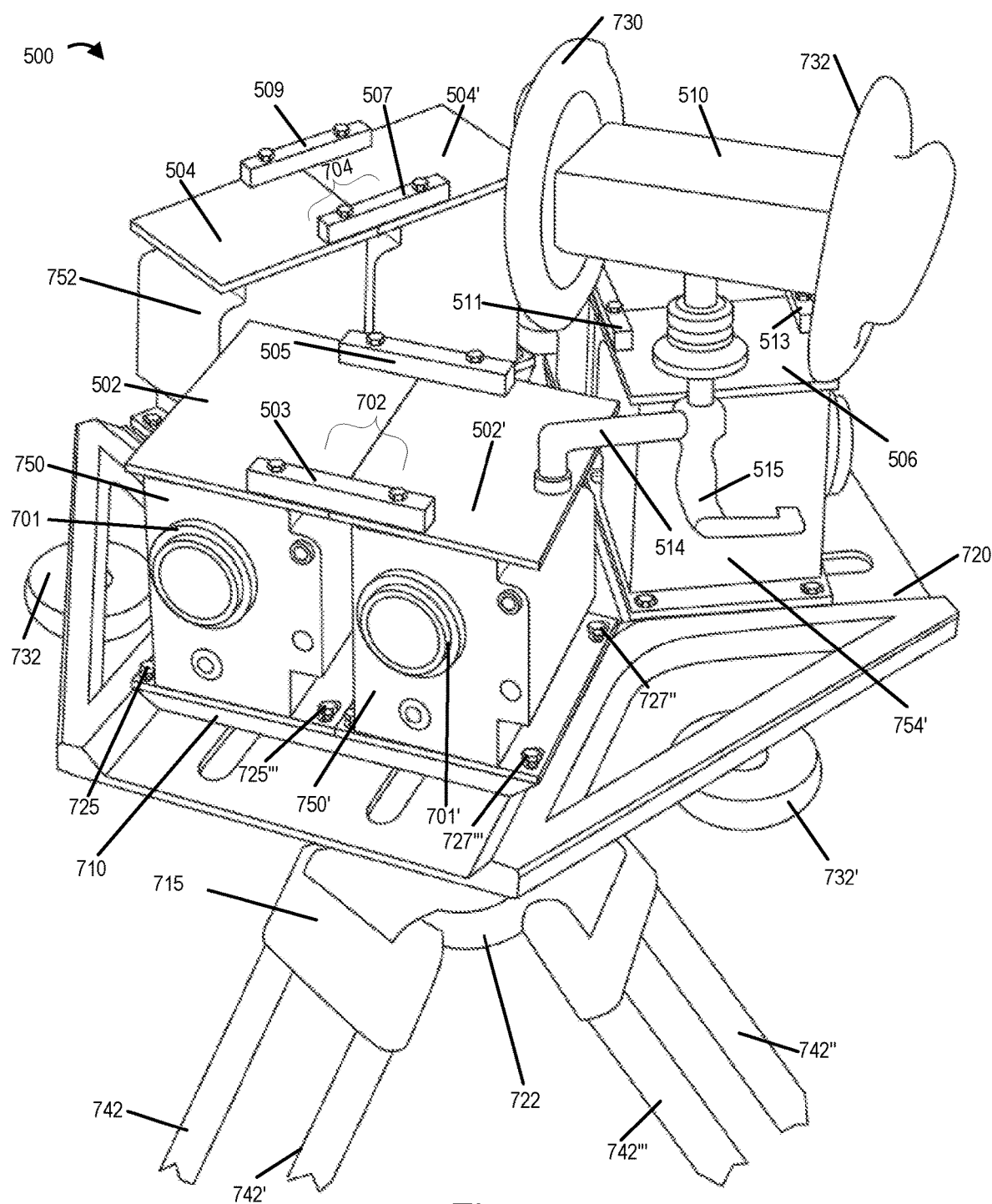
FIG. 5 shows the camera rig of FIG. 4 with the cameras mounted thereon along with an audio capture device including ear shaped devices including microphones used for capturing stereo audio.

FIG. 1 depicts a six (6) camera assembly 100 also sometimes referred to as a rig or camera array, along with a calibration target 115. The camera rig 100 illustrated in FIG. 1 includes a support structure (shown in FIGS. 4 and 5) which holds the cameras in the indicated positions, 3 pairs 102, 104, 106 of stereoscopic cameras (101, 103), (105, 107), (109, 111) for a total of 6 cameras. The support structure includes a base 720 also referred to herein as a mounting plate (see element 720 shown in FIG. 4) which supports the cameras and to which plates on which the cameras are mounted can be secured. The support structure may be made of plastic, metal or a composite material such as graphite or fiberglass, and is represented by the lines forming the triangle which is also used to show the spacing and relationship between the cameras. The center point at which the doted lines intersect represents the center nodal point around which the camera pairs 102, 104, 106 can be rotated in some but not necessarily all embodiments. The center nodal point corresponds in some embodiments to a steel rod or threaded center mount, e.g., of a tripod base, around which a camera support frame represented by the triangular lines can be rotated. The support frame may be a plastic housing in which the cameras are mounted or tripod structure as shown in FIGS. 4 and 5.

In FIG. 1, each pair of cameras 102, 104, 106 corresponds to a different camera pair position. The first camera pair 102 corresponds to a 0 degree forward to front facing position and normally meant to cover the foreground where the main action occurs. This position normally corresponds to the main area of interest, e.g., a field upon which a sports game is being played, a stage, or some other area where the main action/performance is likely to occur. The second camera pair 104 corresponds to a 120 degree camera position (approximately 120 degree from the front facing) degree position) and is used to capture a right rear viewing area. The third camera pair 106 corresponds to a 240 degree viewing position (approximately 240 degree from the front facing) and a left rear viewing area. Note that the three camera positions are 120 degrees apart.

Each camera viewing position includes one camera pair in the FIG. 1 embodiment, with each camera pair including a left camera and a right camera which are used to capture images. The left camera captures what are sometimes referred to as a left eye images and the right camera captures what is sometime referred to as right eye images. The images may be part of a view sequence or still image captured at one or more times. Normally at least the front camera position corresponding to camera pair 102 will be populated with high quality video cameras. The other camera positions may be populated with high quality video cameras, lower quality video cameras or a single camera used to capture still or mono images. In some embodiments the second and third camera embodiments are left unpopulated and the support plate on which the cameras are mounted is rotated allowing the first camera pair 102 to capture images corresponding to all three camera positions but at different times. In some such embodiments left and right rear images are captured and stored and then video of the forward camera position is captured during an event. The captured images may be encoded and streamed in real time, e.g. while an event is still ongoing, to one or more playback devices.

The first camera pair 102 shown in FIG. 1 includes a left camera 101 and a right camera 103. The left camera has a first lens assembly 120 secured to the first camera and the right camera 103 has a second lens assembly secured to the right camera 103. The lens assemblies 120, 120' include lenses which allow for a wide angle field of view to be captured. In some embodiments each lens assembly 120, 120' includes a fish eye lens. Thus each of the cameras 102, 103 can capture a 180 degree field of view or approximately 180 degrees. In some embodiments less than 180 degrees is captured but there is still at least some overlap in the images captured from adjacent camera pairs in some embodiments. In the FIG. 1 embodiment a camera pair is located at each of the first (0 degree), second (120 degree), and third (240 degree) camera mounting positions with each pair capturing at least 120 degrees or more of the environment but in many cases with each camera pair capturing 180 degrees or approximately 180 degrees of the environment.

Second and third camera pairs 104, 106 are the same or similar to the first camera pair 102 but located at 120 and 240 degree camera mounting positions with respect to the front 0 degree position. The second camera pair 104 includes a left camera 105 and left lens assembly 122 and a right camera 107 and right camera lens assembly 122'. The third camera pair 106 includes a left camera 109 and left lens assembly 124 and a right camera 111 and right camera lens assembly 124'.

In FIG. 1, D represents the inter-axial distance of the first 102 stereoscopic pair of cameras 101, 103. In the FIG. 1 example D is 117 mm which is the same or similar to the distance between pupils of the left and right eyes of an average human being. Dashed line 150 in FIG. 1 depicts the distance from the panoramic array's center point to the entrance pupil of the right camera lens 120' (aka nodal offset). In one embodiment corresponding to the FIG. 1 which example the distance indicated by reference number 150 is 315 mm but other distances are possible.

In one particular embodiment the footprint of the camera rig 100 is relatively small. Such a small size allows the camera rig to be placed in an audience, e.g., at a seating position where a fan or attendance might normally be located or positioned. Thus in some embodiments the camera rig is placed in an audience area allowing a viewer to have a sense of being a member of the audience where such an effect is desired. The footprint in some embodiments corresponds to the size of the base to which the support structure including, in some embodiments a center support rod is mounted or support tower is located. As should be appreciated the camera rigs in some embodiments can rotate around the center point of the base which corresponds to the center point between the 3 pairs of cameras. In other embodiments the cameras are fixed and do not rotate around the center of the camera array.

The camera rig is capable of capturing relatively close as well as distinct object. In one particular embodiment the minimum imaging distance of the camera array is 649 mm but other distances are possible and this distance is in no way critical.

The distance from the center of the camera assembly to the intersection point 151 of the views of the first and third camera parts represents an exemplary calibration distance which can be used for calibrating images captured by the first and second camera pairs. In one particular exemplary embodiment, an optimal calibration distance, where lens angles of view intersect and the maximum distortion of the lenses occur is 743 mm. Note that target 115 may be placed at a known distance from the camera pairs located at or slightly beyond the area of maximum distortion. The calibration target include a known fixed calibration pattern. The calibration target can be and is used for calibrating the size of images captured by cameras of the camera pairs. Such calibration is possible since the size and position of the calibration target is known relative to the cameras capturing the image of the calibration target 115.

Figure 2:
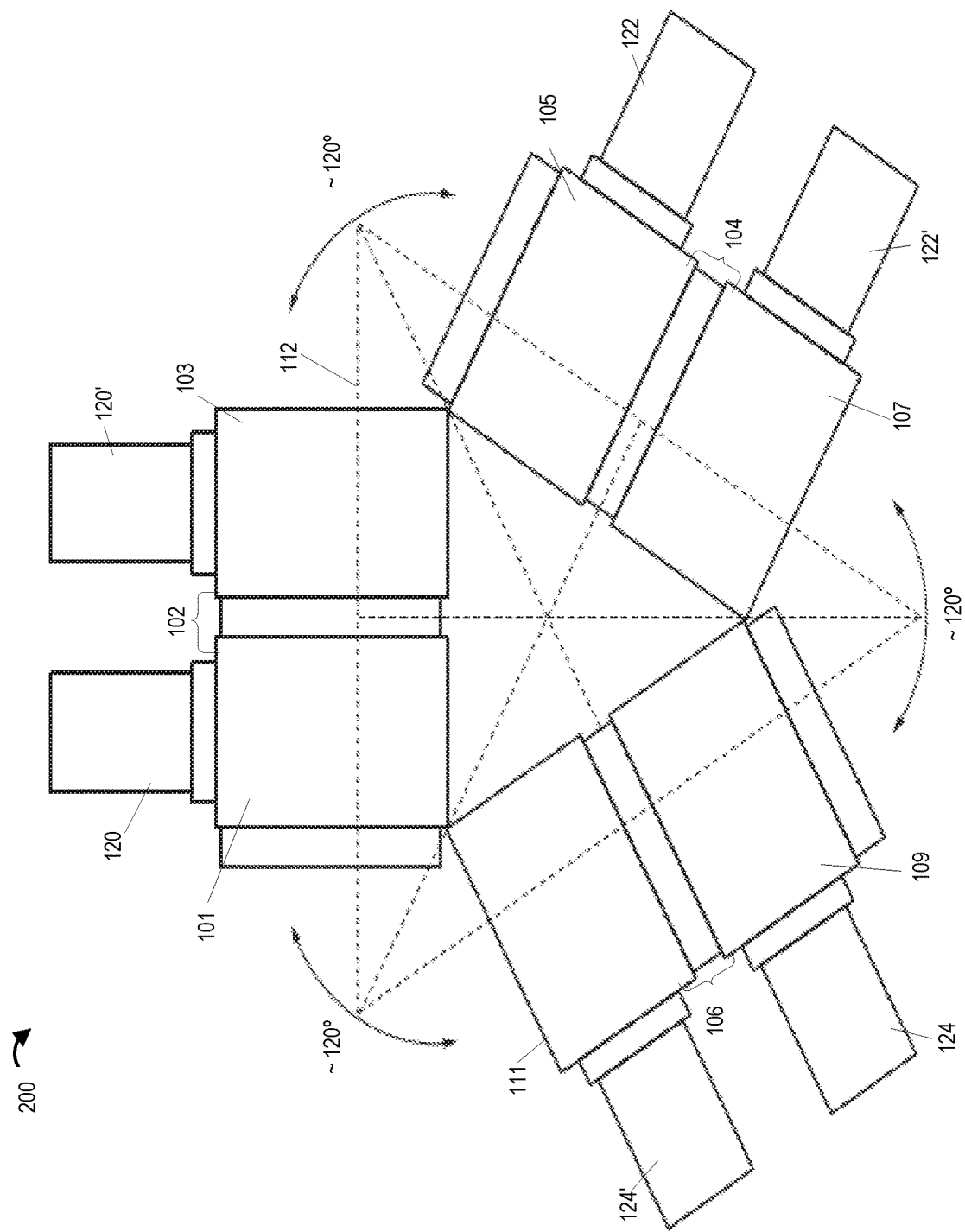
FIG. 2 illustrates the camera rig with three pairs of cameras, e.g., 3 pairs of cameras capturing stereoscopic image data, mounted in the camera rig.

FIG. 2 is a diagram 200 of the camera array 100 shown in FIG. 1 in greater detail. While the camera rig 100 is again shown with 6 cameras, in some embodiment the camera rig 100 is populated with only two cameras, e.g., camera pair 102 including cameras 101 and 103. As shown there is a 120 degree separation between each of the camera pair mounting positions. Consider for example if the center between each camera pair corresponds to the direction of the camera mounting position. In such a case the first camera mounting position corresponds to 0 degrees, the second camera mounting position corresponds to 120 degrees and the third camera mounting position corresponding to 240 degrees. Thus each camera mounting position is separated by 120 degrees. This can be seen if the center line extending out through the center of each camera pair 102, 104, 106 was extended and the angle between the lines measured.

In the FIG. 2 example, the pair 102, 104, 106 of cameras can, and in some embodiments do, rotate around the center point of the camera rig allowing for different views to be captured at different times without having to alter the position of the camera rig base. That is, the cameras can be rotated around the center support of the rig and allowed to capture different scenes at different times allowing for a 360 degree scene capture using the rig shown in FIG. 2 while it is populated with only two cameras. Such a configuration is particularly desirable from a cost perspective given the cost of stereoscopic cameras and is well suited for many applications where it may be desirable to show a background captured from the same point of view but at a different time than the time at which the front scene including the main action during a sporting event or other event may occur. Consider for example that during the event objects may be placed behind the camera that it would be preferable not to show during the main event. In such a scenario the rear images may be, and sometimes are, captured prior to the main event and made available along with the real time captured images of the main event to provide a 360 degree set of image data.

Figure 3:
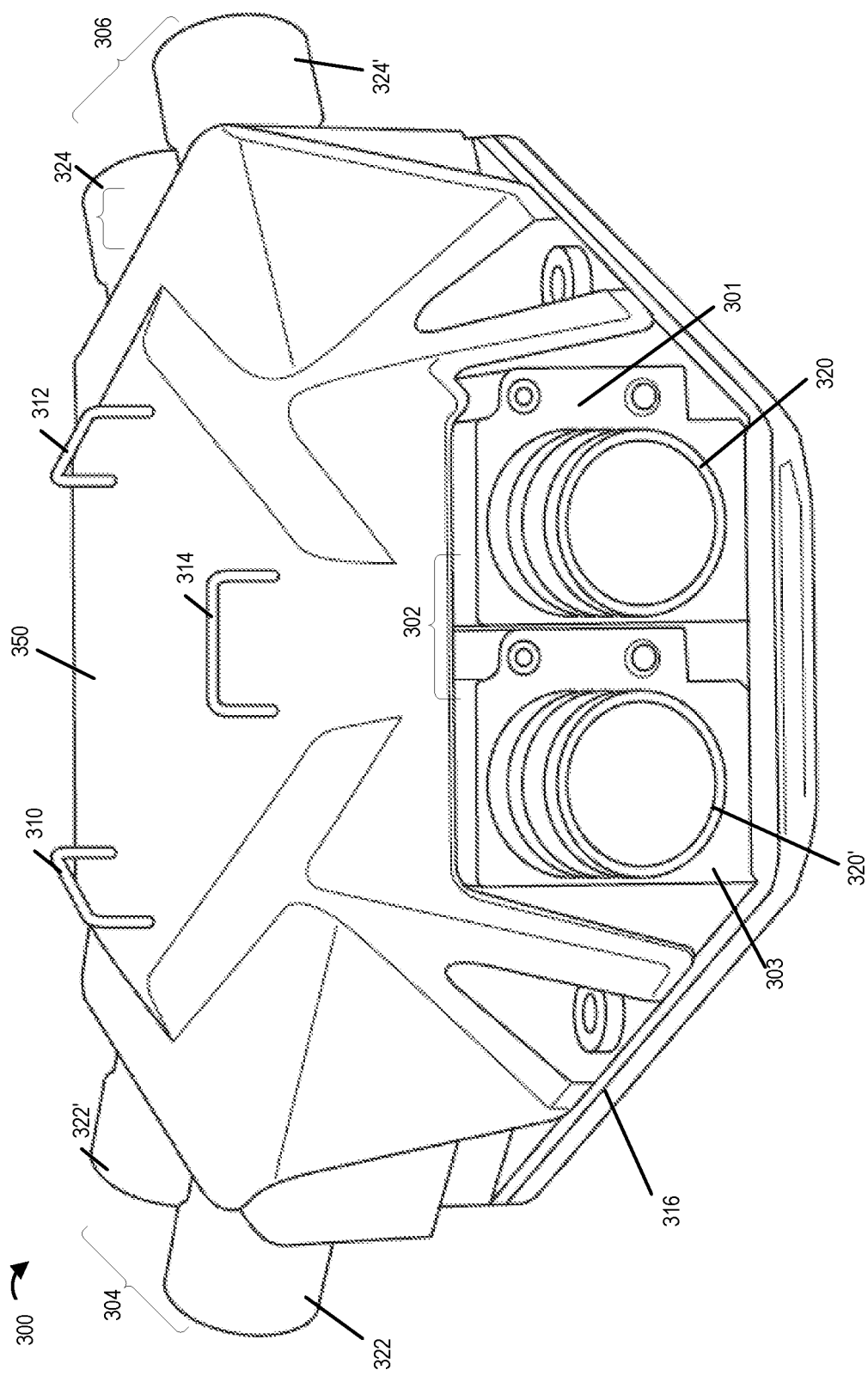
FIG. 3 illustrates an exemplary camera rig with an exemplary protective cover implemented in accordance with some exemplary embodiments.

FIG. 3 shows an exemplary camera rig 300 which is the same or similar to the rig of FIGS. 1 and 2 but without a support tripod and with a plastic cover 350 placed over the camera pairs. The plastic cover 350 includes handles 310, 312, 314 which can be used to lift or rotate, e.g., when placed on a tripod, the camera rig 300. The camera rig 300 is shown with three pairs of cameras, a first camera pair 302 including cameras 301, 303 with lens assemblies 320, 320', a second camera pair 304 including cameras with lens assemblies 322, 322', and a third camera pair 306 including cameras with lens assemblies 324, 324'. The plastic cover 350 is secured to the mounting platform 316, which may be implemented as a flat plate with one or more slots and screw holes as shown in FIG. 4. The plastic cover 350 is secured to the base with nuts or screws 330, 331 which can be removed or tightened by hand to allow for easy removal or attachment of the cover 350 and easy access to the cameras of the camera pairs. While six cameras are included in the rig 300 shown in FIG. 3, a single camera pair may be included and/or a single camera pair with one or more individual cameras located at the other camera mounting positions where the camera pairs are not mounted may be used.

FIG. 4 is a detailed diagram of a camera rig assembly 400 shown in partially disassembled form to allow better view of how the components are assembled. The camera rig 400 is implemented in accordance with one exemplary embodiment and may have the camera configuration shown in FIGS. 1 and 2. In the example shown in FIG. 4 various elements of the camera rig 400 are shown in disassembled form for clarity and detail. As can be appreciated from FIG. 4, the camera rig 400 includes 3 pairs of cameras 702, 704 and 706, e.g., stereoscopic cameras, which can be mounted on a support structure 720 of the camera rig 400. The first pair of cameras 702 includes cameras 750 and 750'. The second pair of cameras 704 includes cameras 752. 752' and the third pair of cameras 706 includes cameras 754, 754'. The lenses 701, 701' of the cameras 750, 750' can be seen in FIG. 7. While elements 701 and 701' are described as lenses, in some embodiments they are lens assemblies which are secured to the cameras 750, 750 with each lens assembly including multiple lenses positioned in a lens barrel which is secured to the cameras 750, 750' via a friction fit or twist lock connection.

In some embodiments the three pairs (six cameras) of cameras 702, 704 and 706 are mounted on the support structure 720 via the respective camera pair mounting plates 710, 712 and 714. The support structure 720 may be in the form of a slotted mounting plate 720. Slot 738 is exemplary of some of the slots in the plate 720. The slots reduce weight but also allow for adjustment of the position of the camera mounting plates 710, 712, 714 used to support camera pairs or in some cases a single camera.

The support structure 720 includes three different mounting positions for mounting the stereoscopic camera pairs 702, 704, 706, with each mounting position corresponding to a different direction offset 120 degrees from the direction of the adjacent mounting position. In the illustrated embodiment of FIG. 7, the first pair of stereoscopic cameras 702 is mounted in a first one of the three mounting positions, e.g., front facing position, and corresponds to a front viewing area. The second pair 704 of stereoscopic cameras 704 is mounted in a second one of the three mounting positions, e.g., background right position rotating 120 degrees clockwise with respect the front position, and corresponds to a different right rear viewing area. The third pair 706 of stereoscopic cameras is mounted in a third one of the three mounting positions, e.g., background left position rotating 240 degrees clockwise with respect the front position, and corresponds to a left rear viewing area. The cameras in each camera position capture at least a 120 viewing area but may capture in many case at least a 180 degree viewing area resulting in overlap in the captured images which can facilities combining of the images into a 360 degree view with some of the overlapping portions being cut off in some embodiments.

The first camera pair mounting plate 710 includes threaded screw holes 741, 741', 741" and 741'" through which screws 704, 740', 740", 740'" can be inserted, respectively through slots 738 and 738'; to secure the plate 710 to the support structure 720. The slots allow for adjustment of the position of the support plate 710.

The cameras 750, 750' of the first camera pair are secured to individual corresponding camera mounting plates 703, 703' using screws that pass through the bottom of the plates 703, 703' and extend into threaded holes on the bottom of the cameras 750, 750'.

Once secured to the individual mounting plates 703, 703' the cameras 750, 750' and mounting plates 703, 703' can be secured to the camera pair mounting plate 710 using screws. Screws 725, 725', 725" (which is not fully visible) and 725'" pass through corresponding slots 724 into threaded holes 745, 745', 745" and 745'" of the camera pair mounting plate 710 to secure the camera plate 703 and camera 750 to the camera pair mounting plate 710. Similarly, screws 727, 727'(which is not fully visible), 727" and 727" pass through corresponding slots 726, 726', 726" and 726'" into threaded holes 746, 746', 746" and 746'" of the camera pair mounting plate 710 to secure the camera plate 703' and camera 750' to the camera pair mounting plate 710.

The support structure 720 has standoff rollers 732, 732' mounted to reduce the risk that an object moving past the support structure will get caught on the support structure as it moves nearby. This reduces the risk of damage to the support structure 720. Furthermore by having a hollow area inside behind the roller an impact to the roller is less likely to be transferred to the main portion of the support structure. That is, the void behind the rollers 732, 732' allows for some deformation of the bar portion of the support structure on which the standoff roller 732' is mounted without damage to the main portion of the support structure including the slots used to secure the camera mounting plates.

In various embodiments the camera rig 400 includes a base 722 to which the support structure 720 is rotatable mounted e.g. by a shaft or threaded rod extending trough the center of the base into the support plate 720. Thus in various embodiments the camera assembly on the support structure 720 can be rotated 360 degrees around an axis that passes through the center of the base 722. In some embodiments the base 722 may be part of a tripod or another mounting device.

The tripod includes legs formed by pairs of tubes (742, 742'), (742" and 742"') as well as additional leg which is not visible in FIG. 4 due to the viewing angle. The legs are secured by a hinge to the base 722 and can be folded for transport. The support structure may be made of plastic, metal or a composite material such as graphite or fiberglass or some combination thereof. The camera pairs can be rotated around a central point, sometimes referred to as center nodal point, in some embodiments.

The assembly 400 shown in FIG. 4 allows for the position of individual cameras to be adjusted from the top by loosing the screws securing the individual camera mounting plates to the camera pair mounting plate and then adjusting the camera position before retightening the screws. The position of a camera pair can be adjusted by moving the camera pair mounting plate after loosening the screws accessible from the bottom side of the support structure 720, moving the plate and then retightening the screws. Accordingly, what the general position and direction of the camera pairs is defined by the slots in the support plate 720, the position and direction can be finely adjusted as part of the camera calibration process to achieve the desired camera alignment while the cameras are secured to the support structure 720 in the field where the camera rig is to be used.

In FIG. 5 reference numbers which are the same as those used in FIG. 4 refer to the same elements. FIG. 5 illustrates a drawing 500 showing the exemplary camera rig 400 in assembled form with additional stabilization plates 502, 502', 504, 504', 506 and stabilization plate joining bars 503, 505, 507, 509, 511, 513 added to the tops of the camera pairs to increase the rigidity and stability of the cameras pairs after they have been adjusted to the desired positions.

In the drawing 500 the camera pairs 702, 704, 706 can be seen mounted on the support structure 720 with at least one of the camera pair mounting plate 710 being visible in the illustrated drawing. In addition to the elements of camera rig 400 already discussed above with regard to FIG. 4, in drawing 500 two simulated ears 730, 732 mounted on the camera rig can also be seen. These simulated ears 730, 732 imitate human ears and in some embodiments are made from silicone or plastic molded in the shape of a human ear. Simulated ears 730, 732 include microphones with the two ears being separated from each other by a distance equal to, or approximately equal to, the separation between human ears of an average human. The microphones mounted in the simulated ears 730, 732 are mounted on the front facing camera pair 702 but could alternatively be mounted on the support structure, e.g., platform, 720. The simulated ears 730, 732 are positioned perpendicular to the front surface of the camera pair 702 in a similar manner as human ears are positioned perpendicular to the front surface of eyes on a human head. Holes in the side of the simulated ears 730, 732 act as an audio/sound entry point to the simulated ears with the simulated ears and hole operating in combination to direct audio towards a microphone mounted in each one of the simulated ears much as a human ear directs audio sounds into the eardrum included in a human ear. The microphones in the left and right simulated ears 730, 732 provide for stereo sound capture similar to what a human at the location of the camera rig 500 would perceive via the human's left and right ears if located at the position of the camera rig. The audio input of the microphones mounted in the simulate ears is perpendicular to the face of the outer lens of front facing cameras 750, 750' in the same manner that the sensor portion of a human ear would be somewhat perpendicular to the humans beings face. The simulate ears direct sound into toward the microphone just as a human ear would direct sound waves towards a human ear drum.

The simulated ears 730, 730 are mounted on a support bar 510 which includes the microphones for capturing sound. The audio capture system 730, 732, 810 is supported by a movable arm 514 which can be moved via handle 515.

While FIGS. 4-5 illustrate one configuration of an exemplary camera rig with three stereoscopic camera pairs, it should be appreciated that other variations are possible. For example, in one implementation the camera rig 400 includes a single pair of stereoscopic cameras which can rotate around the center point of the camera rig allowing for different 120 degree views to be captured at different times. Thus a single camera pair can be mounted on the support structure and rotated around the center support of the rig and allowed to capture different scenes at different times allowing for a 360 degree scene capture.

In other embodiments the camera rig 400 includes a single stereoscopic camera pair 702 and one camera mounted in each of the second and third positions normally used for a pair of stereoscopic cameras. In such an embodiment a single camera is mounted to the rig in place of the second camera pair 704 and another single camera is mounted to the camera rig in place of the camera pair 706. Thus, in such an embodiment, the second camera pair 704 may be thought of as being representative of a single camera and the camera pair 706 may be thought of as being illustrative of the additional single camera.

FIGS. 6-9 illustrate various views of other exemplary camera rigs implemented in accordance with some exemplary embodiments.

Figure 6:
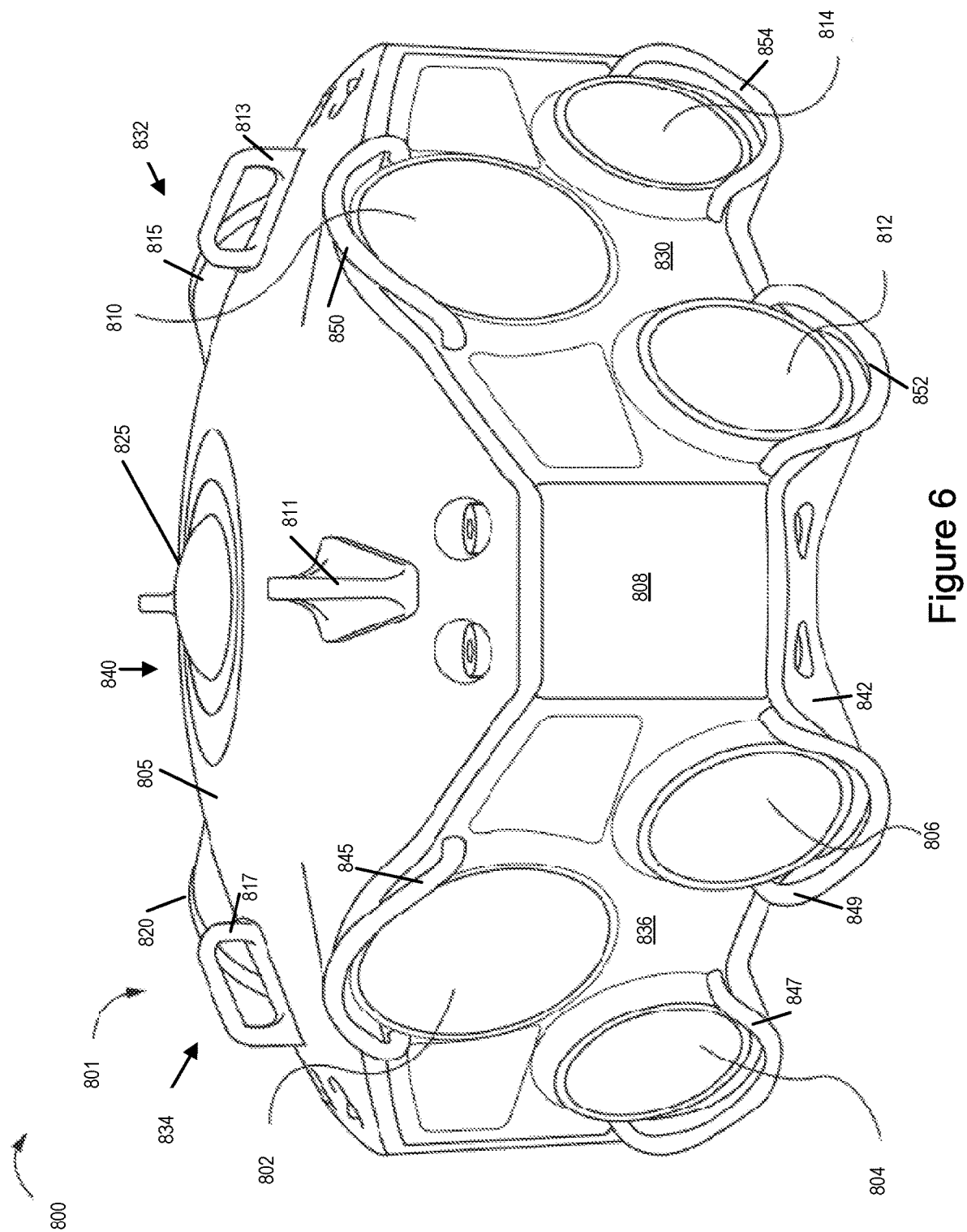
FIGS. 6-9 illustrate various views of an exemplary camera rig implemented in accordance with some exemplary embodiments.

FIG. 6 illustrates a drawing 800 showing one view of an exemplary camera rig 801 implemented in accordance with some exemplary embodiments. An array of cameras is included in the camera rig 801 some of which are stereoscopic cameras. In the illustrated view of the camera rig 801 in drawing 800, only a portion of the camera rig 801 is visible while a similar arrangement of cameras exist on the other sides (also referred to as different faces) of the camera rig 801 which cannot be fully seen in the drawing 800. In some but not all embodiments, the camera rig 801 includes 13 cameras secured by a top plastic body or cover 805 and a bottom base cover 842. In some embodiments 8 of these 13 cameras are stereoscopic cameras such as the cameras 804, 806, 812 and 814 in pairs while many other cameras are light field cameras such as cameras 802 and 810 which are visible in the drawing 800 and cameras 815 and 820 which are not fully but partially visible in drawing 800. Various other combinations of the cameras are possible. In some embodiments a camera 825 is also mounted on the top portion of the camera rig 801, e.g., top face 840 of camera rig 801, to capture images of a top hemisphere of an environment of interest. The plastic body/cover 805 includes handles 811, 813, 817 which can be used to lift or rotate the camera rig 801.

In some embodiments the camera rig 801 includes one light field camera (e.g., camera 802) and two other cameras (e.g., cameras 804, 806) forming a stereoscopic camera pair on each longer side of the camera rig 801. In some such embodiments there are four such longer sides (also referred to as the four side faces 830, 832, 834 and 836) with each longer side having one light field camera and one stereoscopic camera pair, e.g., light field camera 802 and stereoscopic camera pair 804, 806 on one longer side 836 to the left while another light field camera 810 and stereoscopic camera pair 812, 814 on the other longer side 830 to the right can be seen in drawing 800. While the other two side faces are not fully shown in drawing 800, they are shown in more detail in FIG. 8. In some embodiments at least some of the cameras, e.g., stereoscopic cameras and the light field cameras, in the camera rig 801 use a fish eye lens. In various embodiments each of the cameras in the camera rig 801 is protected by a corresponding lens/camera guard to protect the camera and/or lens against a physical impact and/or damage that may be caused by an object. For example cameras 802, 804 and 806 are protected by guards 845, 847 and 849 respectively. Similarly cameras 810, 812 and 814 are protected by guards 850, 852 and 854 respectively.

In addition to the stereoscopic camera pair and the light field camera on each of the four side faces 830, 832, 834 and 836, in some embodiments the camera rig 801 further includes a camera 825 facing in the upward vertical direction, e.g., towards the sky or another top ceiling surface in the case of a closed environment, on the top face 840 of the camera rig 801. In some such embodiments the camera 825 on the top face of the camera rig 801 is a light field camera. While not shown in drawing 800, in some other embodiments the top face 840 of the camera rig 801 also includes, in addition to the camera 825, another stereoscopic camera pair for capturing left and right eye images. While in normal circumstances the top hemisphere (also referred to as the sky portion) of a 360 degree environment, e.g., stadium, theater, concert hall etc., captured by the camera 825 may not include action and/or remain static in some cases it may be important or desirable to capture the sky portion at the same rate as other environmental portions are being captured by other cameras on the rig 801.

Figure 8:
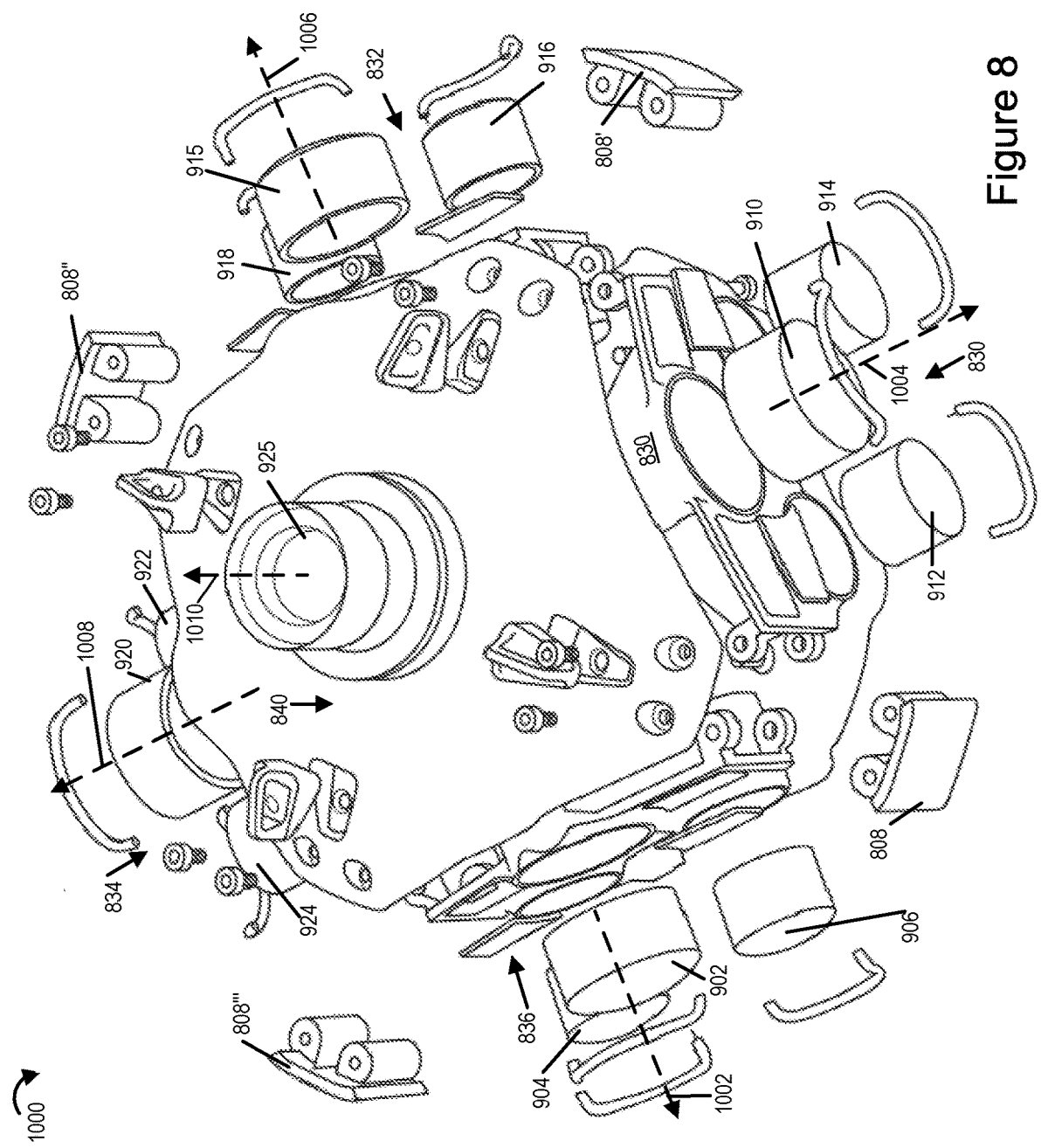

While one exemplary camera array arrangement is shown and discussed above with regard to camera rig 801, in some other implementations instead of just a single light field camera (e.g., such as cameras 802 and 810) arranged on top of a pair of stereoscopic cameras (e.g., cameras 804, 806 and 812, 814) on four faces 830, 832, 834, 836 of the camera rig 801, the camera rig 801 includes an array of light field cameras arranged with stereoscopic camera pair. For example in some embodiments there are 3 light field cameras arranged on top of a stereoscopic camera pair on each of the longer sides of the camera rig 801. In another embodiment there are 6 light field cameras arranged on top of stereoscopic camera pair on each of the longer sides of the camera rig 801, e.g., with two rows of 3 light field cameras arranged on top of the stereoscopic camera pair. Some of such variations are discussed with regard to FIGS. 12-13. Moreover in another variation a camera rig of the type shown in drawing 800 may also be implemented such that instead of four faces 830, 832, 834, 836 with the cameras pointed in the horizontal direction as shown in FIG. 8, there are 3 faces of the camera rig with cameras pointing in the horizontal direction.

In some embodiments the camera rig 801 may be mounted on a support structure such that it can be rotated around a vertical axis. In various embodiments the camera rig 801 may be deployed in an environment of interest, e.g., such as a stadium, auditorium, or another place where an event to be captured is taking place. In some embodiments the light field cameras of the camera rig 801 are used to capture images of the environment of interest, e.g., a 360 degree scene area of interest, and generate depth maps which can be used in simulating a 3D environment and displaying stereoscopic imaging content.

Figure 7:
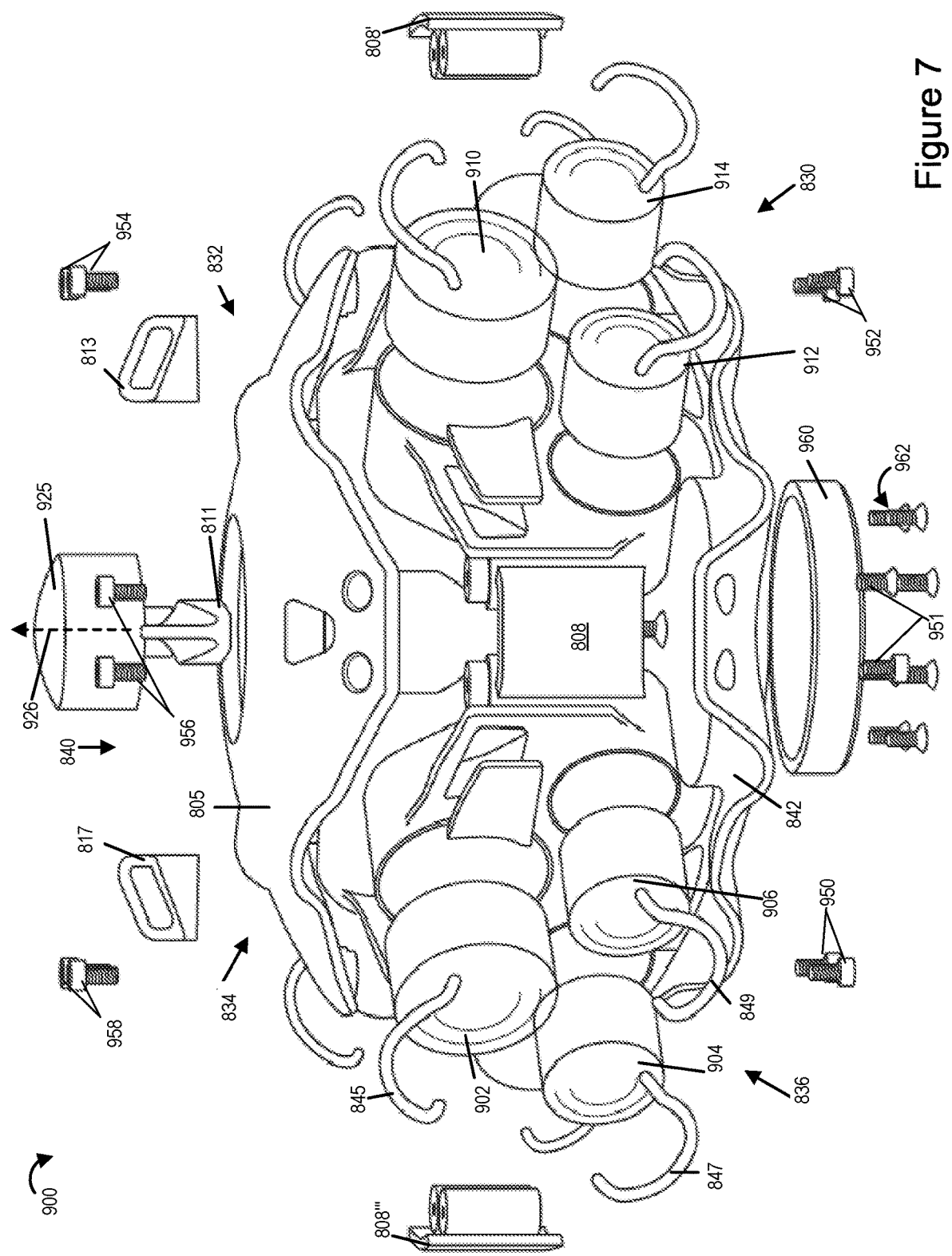

FIG. 7 illustrates a drawing 900 showing the exemplary camera rig 801 with some elements of the camera rig 801 being shown in a disassembled form for more clarity and detail. Various additional elements of the camera rig 801 which were not visible in the illustration shown in drawing 800 are shown in FIG. 7. In FIG. 7, same reference numbers have been used to identify the elements of the camera rig 801 which were shown and identified in FIG. 6. In drawing 900 at least the two side faces 830 and 836 as well as the top face 840 and bottom face 842 of the camera rig 801 are visible.

In drawing 900 various components of the cameras on two out of four side faces 830, 832, 834, 836 of the camera rig 801 are shown. The lens assemblies 902, 904 and 906 correspond to cameras 802, 804 and 806 respectively of side face 836 of the camera rig 801. Lens assemblies 910, 912 and 914 correspond to cameras 810, 812 and 814 respectively of side face 830 while lens assembly 925 corresponds to camera 825 on the top face of the camera rig 801. Also show in drawing 900 are three side support plates 808, 808', and 808''' which are support the top and bottom cover plates 805 and 842 of the camera rig 801. The side support plates 808, 808', and 808''' are secured to the top cover 805 and bottom base cover 842 via the corresponding pairs of screws shown in the Figure. For example the side support plate 808 is secured to the top and bottom cover plates 805, 842 via the screw pairs 951 and 956, the side support plate 808' is secured to the top and bottom cover plates 805, 842 via the screw pairs 952 and 954, and the side support plate 808''' is secured to the top and bottom cover plates 805, 842 via the screw pairs 950 and 958. The camera rig 801 in some embodiments includes a base support 960 secured to the bottom cover plate 842 via a plurality of screws 960. In some embodiments via the base support 960 the camera rig may be mounted on a support structure such that it can be rotated around a vertical axis, e.g., axis going through the center of base 960. The external support structure may be a tripod or another platform.

FIG. 8 illustrates a drawing 1000 showing a top view of the exemplary camera rig 801 with more elements of the camera rig 801 being shown in greater detail. In the top view of the camera rig 801 the other two side faces 832 and 834 which were not fully visible in drawings 800-900 are more clearly shown. The lens assemblies 915, 916 and 918 correspond to camera 815 and the stereoscopic camera pair on the side face 832 of the camera rig 801. Lens assemblies 920, 922 and 924 correspond to camera 920 and the stereoscopic camera pair on the side face 834 of the camera rig 801.

As can be seen in drawing 1000, the assembly of cameras on each of the four sides faces 830, 832, 834, 836 (small arrows pointing towards the faces) and the top face 840 of the camera rig 801 face in different directions. The cameras on the side faces 830, 832, 834, 836 of the camera rig 801 are pointed in the horizontal (e.g., perpendicular to the corresponding face) while the camera(s) on the top face 840 is pointed in the upward vertical direction. For example as shown in FIG. 8 the cameras on the face 836 of the camera rig 801 (cameras corresponding to lens assemblies 902, 904, 906) are facing in a first direction shown by arrow 1002. The arrow 1004 shows a second direction in which the cameras on the face 830 of the camera rig 801 (cameras corresponding to lens assemblies 910, 912, 914) are facing, arrow 1006 shows a third direction in which the cameras on the face 832 of the camera rig 801 (cameras corresponding to lens assemblies 915, 916, 918) are facing, arrow 1008 shows a fourth direction in which the cameras on the face 834 of the camera rig 801 (cameras corresponding to lens assemblies 920, 922, 924) are facing and arrow 1010 shows a fifth (vertical) direction in which the camera on the top face 840 of the camera rig 801 (camera 825 corresponding to lens assembly 925, is facing. In various embodiments the first, second, third and fourth directions are generally horizontal directions while the fifth direction is a vertical direction. In some embodiments the cameras on the different side faces 830, 832, 834 and 836 are uniformly spaced. In some embodiments the angle between the first, second, third and fourth directions is the same. In some embodiments the first, second, third and fourth directions are different and 90 degrees apart. In some other embodiments the camera rig is implemented such that instead of four side faces the camera rig has 3 side faces with the same or similar camera assemblies as shown in drawings 800-1000. In such embodiments the cameras on the side faces of the camera rig 801 point in three different directions, e.g., a first, second and third direction, with the first, second and third directions being 120 degrees apart.

Figure 11:
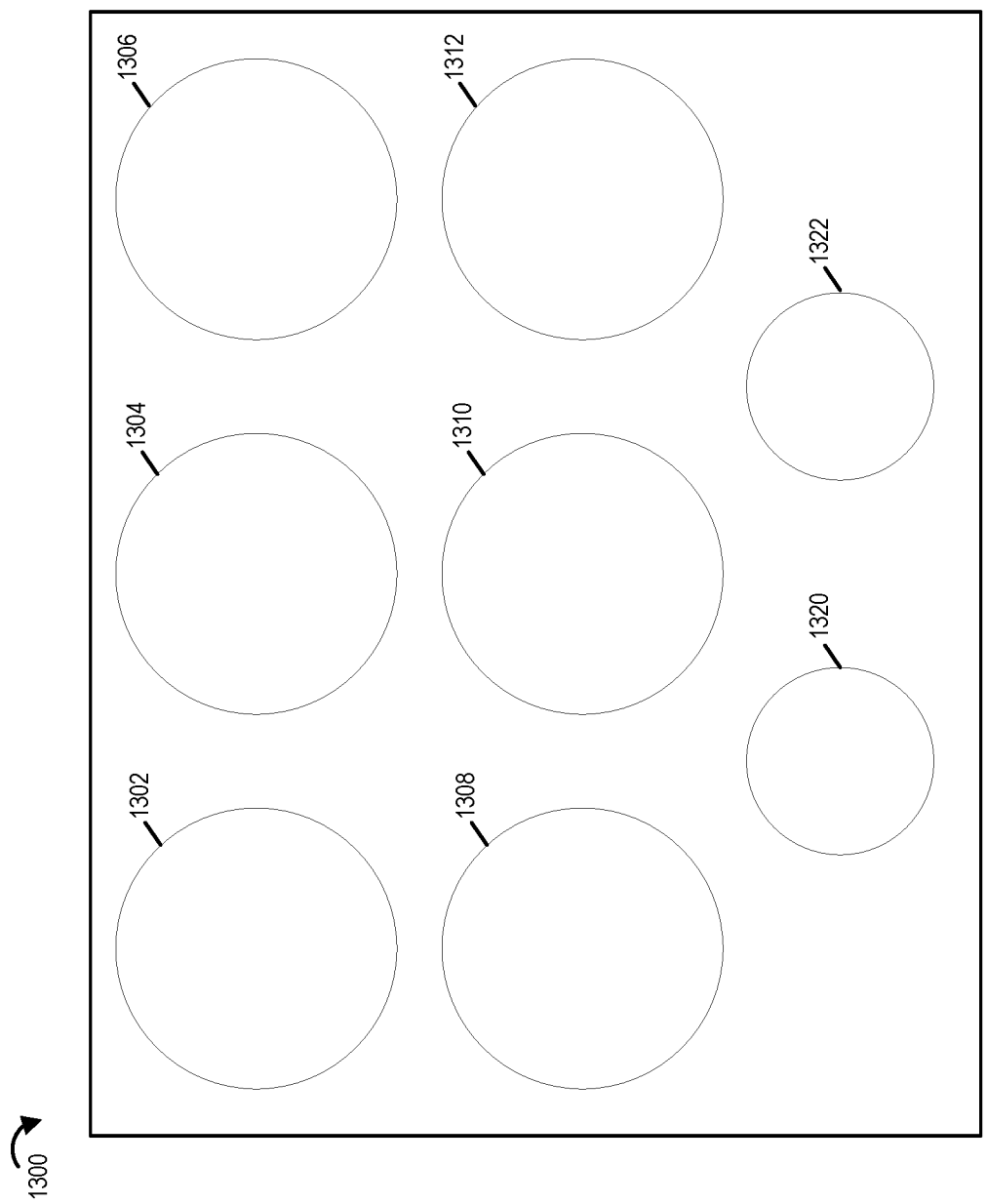
FIG. 11 illustrates a front view of yet another exemplary arrangement of an array of cameras that can be used in any of the camera rigs of the present invention.

FIG. 11 illustrates a drawing 1100 showing a view of yet another exemplary camera rig 1101 implemented in accordance with some exemplary embodiments. The exemplary camera rig 1101 is similar to the camera rig 801 in most and many aspects and includes the same or similar configuration of cameras as discussed with regard to camera rig 801 above. The camera rig 1101 includes four side faces 1130, 1132, 1134, 1136 and a top face 1140 similar to camera rig 801. Each of the four side faces 1130, 1132, 1134, 1136 of the camera rig 1101 includes an array of cameras including a light field camera and a pair of stereoscopic camera pair while the top face 1140 of camera rig includes at least one camera device 1125 similar to what has been shown and discussed with regard to camera rig 801. However the camera rig 1101 further includes, in addition to the camera arrays on each of the five faces 1130, 1132, 1134, 1136 and 1140, a sixth bottom face 1142 including at least one camera 1126 facing vertically downward, e.g., towards the ground. In some such embodiments the bottom surface camera 1126 facing vertically downwards and the top face camera 1125 facing vertically upwards are light field cameras. In some embodiments each of the cameras 1125 and 1126 are part of a corresponding stereoscopic camera pair on the top and bottom faces 1140, 1142 of the camera rig 1101.

While the stereoscopic cameras of the camera rigs 801 and 1101 are used to capture stereoscopic imaging content, e.g., during an event, the use of light field cameras allows for scanning the scene area of interest and generate depth maps of various portions of the scene area captured by the light field cameras (e.g., from the captured images corresponding to these portions of the scene of interest). In some embodiments the depth maps of various portions of the scene area may be combined to generate a composite depth map of the scene area. Such depth maps and/or composite depth map may, and in some embodiments are, provided to a playback device for use in displaying stereoscopic imaging content and simulating a 3D environment which can be experienced by the viewers.

The use of light field camera in combination with the stereoscopic cameras allows for environmental measurements and generation of the environmental depth maps in real time, e.g., during an event being shot, thus obviating the need for deployment of equipment for environmental measurements to be performed offline ahead in time prior to the start of an event, e.g., a football game and/or other performance in an environment.

While the depth map generated from each image captured by the light field camera corresponds to a portion of the environment to be mapped, in some embodiments the depth maps generated from individual images are processed, e.g., stitched together, to form a composite map of the complete environment scanned using the light field cameras. Thus by using the light field cameras a relatively complete environmental map can be, and in some embodiments is generated.

In the case of light field cameras, an array of micro-lenses captures enough information that one can refocus images after acquisition. It is also possible to shift, after image capture, one's viewpoint within the sub-apertures of the main lens, effectively obtaining multiple views. In the case of a light field camera, depth cues from both defocus and correspondence are available simultaneously in a single capture. This can be useful when attempting to fill in occluded information/scene portions not captured by the stereoscopic cameras.

The depth maps generated from the light field camera outputs will be current and is likely to accurately measure changes in a stadium or other environment of interest for a particular event, e.g., a concert or game to be captured by a stereoscopic camera. In addition, by measuring the environment from the same location or near the location at which the stereoscopic camera are mounted, the environmental map, at least in some embodiments, accurately reflects the environment as it is likely to be perceived from the perspective of the stereoscopic cameras that are used to capture the event.

In some embodiments images captured by the light field cameras can be processed and used to fill in for portions of the environment which are not captured by a stereoscopic camera pair, e.g., because the position and/or field of view of the stereoscopic camera pair may be slightly different from that of the light field camera and/or due to an obstruction of view from the stereoscopic cameras. For example, when the light field camera is facing rearward relative to the position of the stereoscopic pair it may capture a rear facing view not visible to a forward facing stereoscopic camera pair. In some embodiments output of the light field camera is provided to a playback device separately or along with image data captured by the stereoscopic camera pairs. The playback device can use all or portions of the images captured by the light field camera when a scene area not sufficiently captured by the stereoscopic camera pairs is to be displayed. In addition a portion of an image captured by the light field camera may be used to fill in a portion of the a stereoscopic image that was occluded from view from the position of the stereoscopic camera pair but which a user expects to be able to see when he or she shifts, e.g., slightly rotate and/or tilt, his or her head to the left or right relative to the default viewing position corresponding to the location of the stereoscopic camera pair. For example, if a user leans to the left or right in an attempt to peek around a column obstructing his/her view, in some embodiments content from one or more images captured by the light field camera will be used to provide the image content which was not visible to or captured by the stereoscopic camera pair but which is expected to be visible to the user from the shifted head portion the user achieves during playback by leaning left or right.

FIG. 12 illustrates a front view of an exemplary arrangement 1200 of an array of cameras that can be used in an exemplary camera rig implemented in accordance with the invention such as camera rig 300, camera rig 400 and/or camera rigs 801 and 1101 in accordance with some embodiments. In comparison to the arrangement shown in drawing 800 with a single light field camera arranged on top of a pair of stereoscopic cameras on each of the faces of the camera rig 801, the exemplary arrangement 1200 uses an array of light field cameras 1202, 1204 and 1206 arranged with a stereoscopic camera pair 1208, 1210. The exemplary arrangement 1200 may be, and in some embodiments is, used in a camera rig (such as camera rig 801) implemented in accordance with the invention. In such embodiments each face of the camera rig uses the exemplary arrangement 1200 with three light field cameras (e.g., 1202, 1204 and 1206) arranged with a single pair of stereoscopic cameras (e.g., 1208, 1210). It should be appreciated that many variations in arrangement are possible and are within the scope of the invention.

Figure 13:
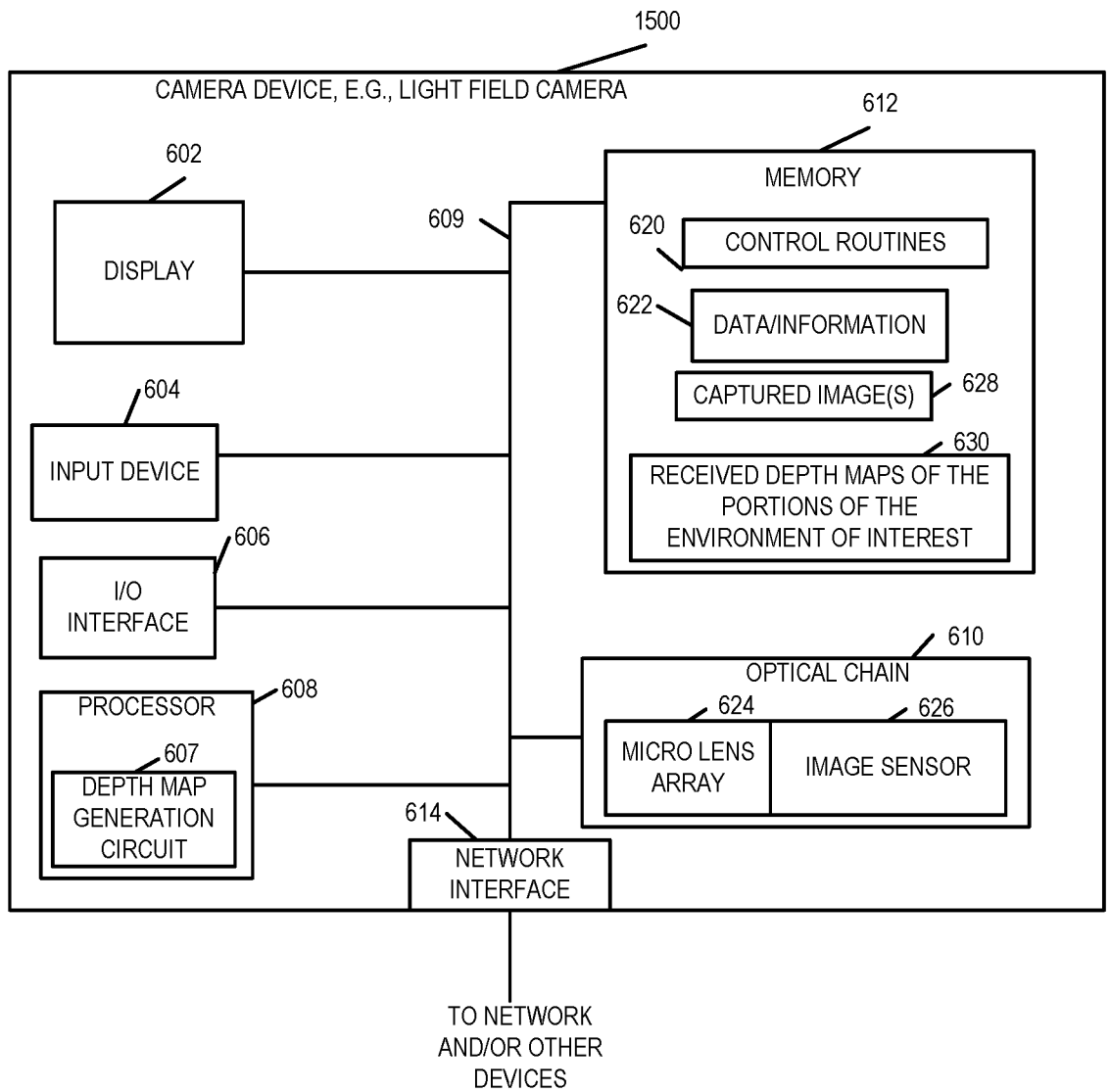
FIG. 13 illustrates an exemplary light field camera which can be used in the camera rigs shown in FIGS. 1-9.

FIG. 13 illustrates a front view of yet another exemplary arrangement 1300 of an array of cameras that can be used in an exemplary camera rig such as camera rig 801 or any of the other camera rigs discussed earlier, in accordance with some embodiments. In comparison to the arrangement shown in drawing 800 with a single light field camera arranged on top of a pair of stereoscopic cameras, the exemplary arrangement 1300 uses an array of six light field cameras 1302, 1304, 1306, 1308, 1310 and 1312 arranged with a stereoscopic camera pair 1320, 1322. The light field cameras are stacked in two rows of 3 light field cameras arranged one on top of the other with each row including a group of three light field cameras as shown. The exemplary arrangement 1300 may be, and in some embodiments is, used in a camera rig (such as camera rig 801) implemented in accordance with the invention with each face of the camera rig using the arrangement 1300.

Figure 12A:
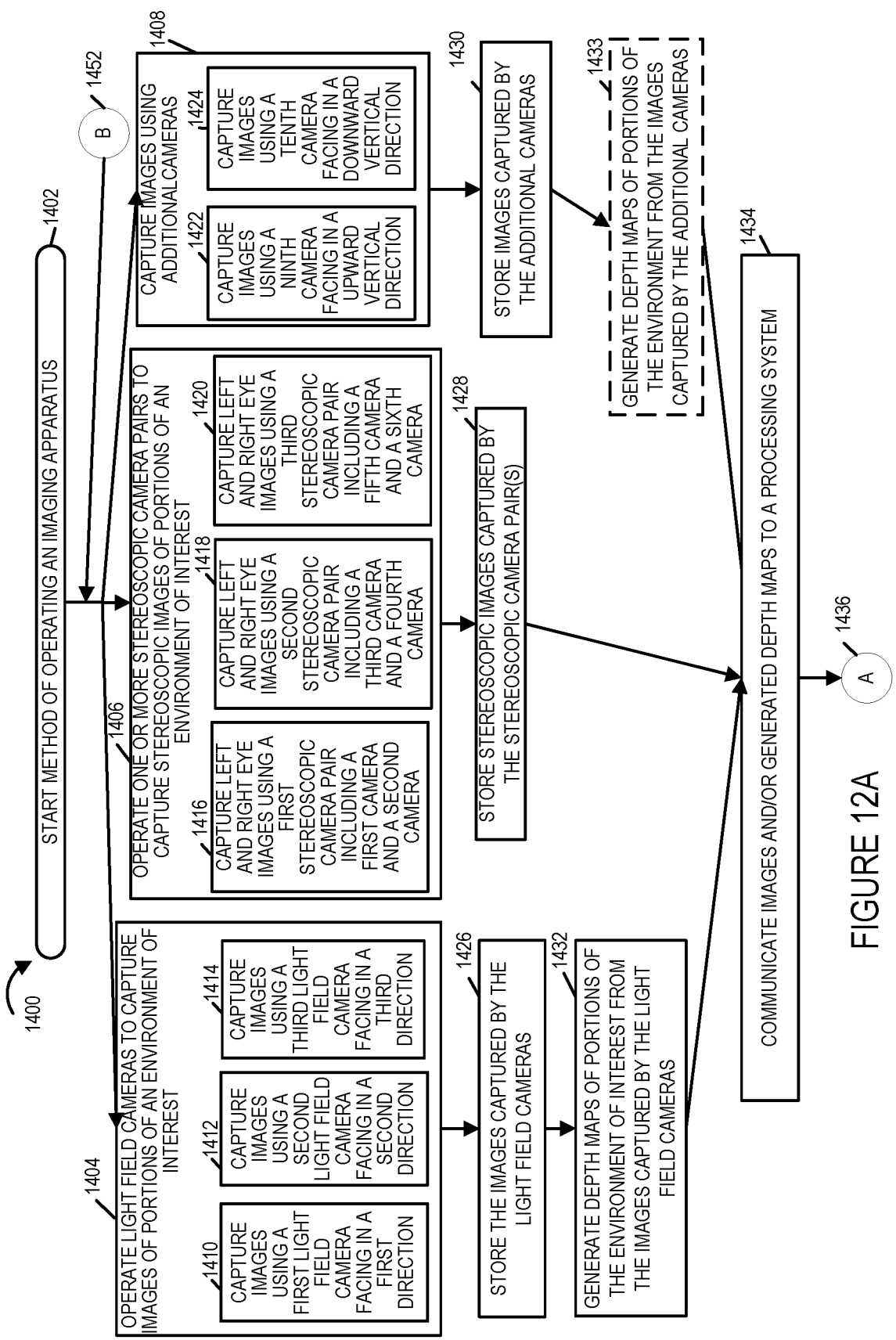
FIG. 12A is a first part of FIG. 12 which illustrates a flowchart of an exemplary method of operating an imaging apparatus in accordance with some embodiments.
Figure 30:
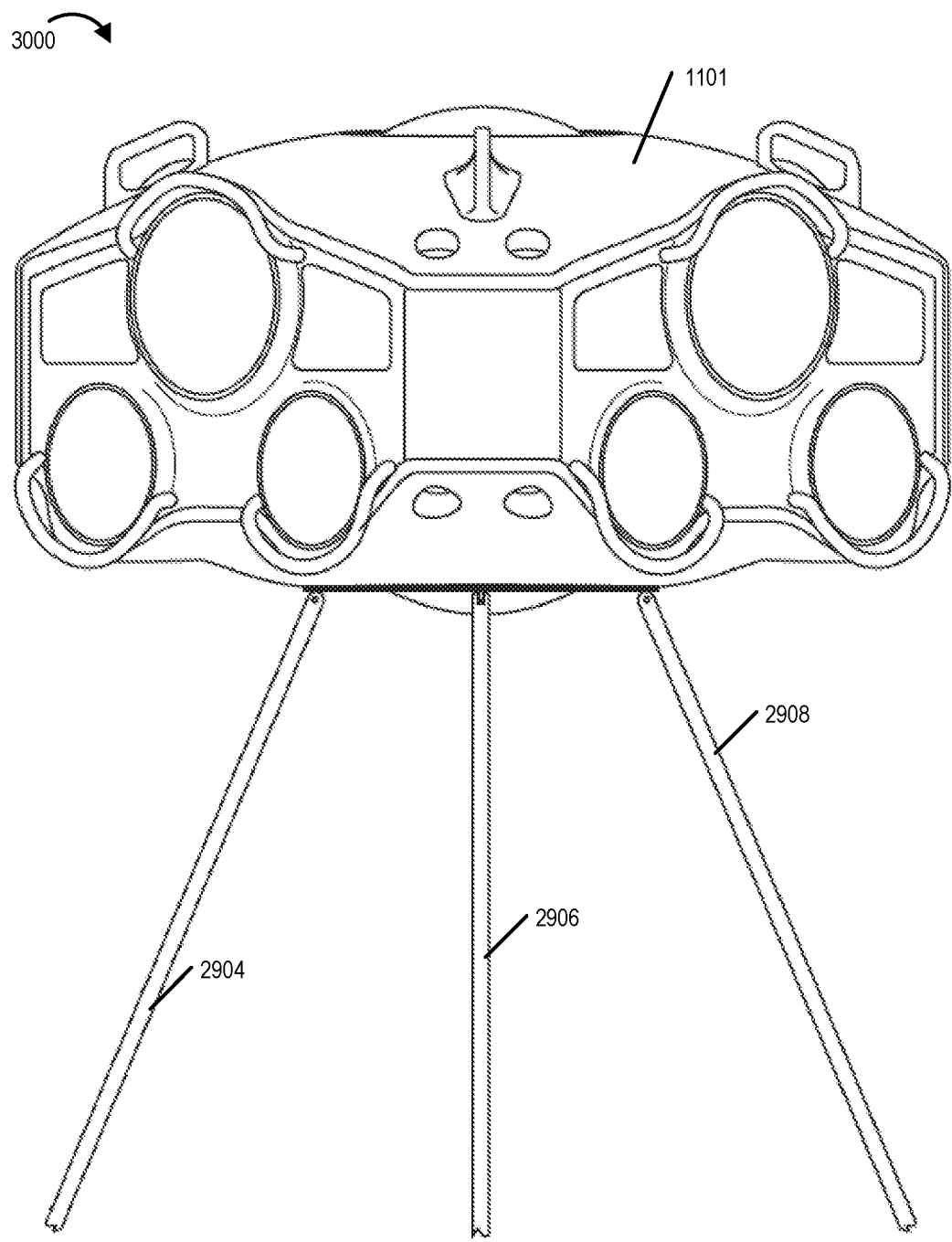
FIG. 30 illustrates how the camera rig and support structure shown in FIG. 29 may appear during use with the camera rig secured to the support structure.

FIG. 12, which comprises a combination of FIGS. 12A and 12B, illustrates a flowchart 1400 of an exemplary method of operating an imaging apparatus, e.g., the camera rig 1101 shown in FIG. 30 as well as other figures and/or another one of the camera rigs in the present application, in accordance with some embodiments. As should be appreciated, in some embodiments the imaging apparatus includes multiple pairs of stereoscopic cameras as well as one or more light field cameras. In addition to having camera pairs used to capture left and right eye images for stereoscopic purposes, the camera rig may also have one or more light field cameras facing outward in the same direction as a corresponding stereo camera pair. An upward and/or downward facing camera or camera pair may also be included. The upward and downward facing cameras may include a light filed camera, a non-light field camera or a combination of light field and non-light field cameras.

As should be appreciated light filed cameras are well suited for generating depth maps from the images they capture using know depth estimation techniques.

The method 1400 shown in FIG. 12 which comprise the combination of FIGS. 12A and 12B will now be described in detail. The method may be implemented using the camera rig 1101 which is operated under control of the control routines 1614 of the processing system 1600 and which provides captured images and/or depth maps produced by light field cameras to the processing system for further processing and possible encoding and streaming of captured image content. The depths maps may be generated by the light field cameras and/or by the processing system 1600 from images captured by the light field cameras.

The method 1400 begins in step 1402 with the processing system 1600 and camera rig, e.g., rig 1101, being powered on. Operation proceeds from start step 1402 to various image capture steps 1404, 1406 and 1408 which may be, and sometimes are, implemented in parallel synchronized manner so that images are captured by different stereoscopic camera pairs in addition to one or more light field cameras in parallel. While image capture is synchronized in some embodiments this is not required and light field image capture and depth map generation will often occur at a different frame rate than the rate at which images are captured by the cameras of the stereoscopic camera pairs which normally operate at a video frame rate, e.g., 30, 60 or some other number of frames per second.

In step 1404, light field cameras are operated to capture images of portions of an environment of interest, e.g., all or a portion of an environment also being captured by one or more cameras of the stereo pairs, upward facing camera or downward facing camera. In step 1410 one or more images are captured using a first light field camera facing in a first direction. In step 1412, one or more images are captured by a second light filed camera facing in a second direction and in step 1414 one or more images are captured by a third light field camera facing in a third direction. The first, second and third directions may correspond to different directions, e.g., of the different directions corresponding to a direction in which a stereoscopic camera pair faces for example. The first, second and third light field cameras may be and sometimes are on different sides of the camera rig 1101. Operation proceeds from step 1404 to step 1426 in which the images captured by the light field cameras are stored in memory, e.g., memory in the individual light field cameras and/or processing system 1600. Then in step 1432 depth maps are generated from the images captured by the light field cameras. Each depth map corresponds to a portion of the environment of interest. In the case where individual cameras store and process the images they capture, each light field camera would generate a depth map for the portion of the environment in its field of view. In the case where the image processing system generates the depth maps from captured images, the image processing system 1600 would generate the depth maps for different portions of the environment from the light field images it receives. If the light field cameras generate the depth maps they are supplied to the processing system 1600 in sep 1434.

In step 1406 which may be performed in parallel with step 1404, one or more stereoscopic camera pairs are operated to capture images, e.g., left and right eye images one per camera of the camera pair. Step 1406 includes step 1416 in which left and right eye images are captured using a first stereoscopic camera pair. Each camera of the stereoscopic camera pair may and sometimes does include a fish eye lens. Step 1406 may and sometimes does also include step 1418 in which left and right eye images are captured using a second stereoscopic camera pair which includes third and fourth cameras. Step 1406 may and also does include step 1420 in some embodiments in which left and right eye images are captured suing a third stereoscopic pair including a fifth camera and a sixth camera. While step 1406 only shows three substeps, in embodiments where the camera rig includes more than 3 stereoscopic pairs step 1406 would include, in some but not necessarily all embodiments, a step of capturing images using each of the available stereoscopic pairs. For example if the method 1400 is implemented using the camera rig 1101, four stereoscopic camera pairs would be operated in step 1406 to capture images. In embodiments with a larger number of stereo camera pairs, such as 5 or 6 camera pairs, step 1406 would include steps for operating 5 or 6 stereo camera pairs to capture images. The images captured by the stereo camera pairs are stored in step 1428, e.g., in camera buffer memory and then communicated in step 1434 to the processing system 1600 where they are stored and subject to further processing, e.g., encoding, prior to streaming to a playback device. Each of the different stereoscopic camera pairs may, and in some embodiments does, correspond to a different face of the camera rig on which they are mounted, e.g., rig 1101. While the rig may include one light field camera per face, in some embodiments the rig includes multiple light field cameras, e.g., an array of light field cameras per face. The light field cameras may be in addition to the stereo camera pair on a face of the rig. Left and right cameras of a stereoscopic camera pair may, and in various embodiments do, have optical axis which extend parallel to each other with the lenses of the camera rig for at least some pairs facing outward.

Step 1408 which may be and sometimes is performed in parallel with steps 1404 and 1406. In step 1408 images are captured using one or more additional cameras. The cameras may include, for example, an upward facing camera and/or a downward facing camera. Images in the upward and/or downward directions need not be captured in all embodiments but are captured in some embodiments. In the FIG. 12A example, step 1408 includes step 1422 in which one or more images are captured by a ninth camera facing in an upward direction and step 1424 in which one or more images are captured using a tenth camera facing in a downward direction. Depending on the embodiment the upward facing camera may be a camera of an upward facing stereo camera pair, an upward facing light field camera or a single upward facing non-light field camera. The downward facing camera may be a camera of a downward facing stereo camera pair, a downward facing light field camera or a single downward facing non-light field camera.

Images captured in step 1408 are stored in step 1430, e.g., in a camera buffer. In optional step 1433, which is performed in some embodiments when the upward and/or downward facing cameras are light field cameras, depth maps are generated by the processors included in the cameras from the images captured in step 1408.

In step 1434 the captured images from the upward and/or downward facing cameras along with any generated depth maps are communicated to the processing system, e.g., processing system 1600 for generating an update depth map representing a 3D environmental model and/or for generating stereoscopic image content to be streamed, e.g., pairs of left and right eye images corresponding to one or more portions of the environment captured by cameras mounted on the camera rig, e.g., camera rig 1101.

Operation proceeds from step 1434 to step 1438 via connecting node A 1436. FIG. 12 includes 1438 as a separate step in which one or more images captured by the stereoscopic camera pairs and light filed cameras are communicated to the image processing system 1600. This step may be and sometimes is performed as par to step 1434. Operation proceeds from step 1438 to step 1440.

In step 1440 the processing system 1660 is operated to combine depth maps generated from two or more images captured by different cameras, e.g., light field cameras and/or cameras of the stereoscopic camera pairs, to generate a composite depth map of the environment of interest. The composite depth map is a model of the environment in which the images where captured since it defines a surface of the environment as viewed from the perspective of the camera rig in the environment. Operation proceeds from step 1440 to step 1442 in which the composite depth map, e.g., environmental model, of the environment of interest is transmitted to a playback device. The playback device in some embodiments uses the depth map in the rendering of images with captured and/or transmitted images being applied to the surface of the model as part of a rendering operation. Thus, from the perspective of a viewer observing the simulated environment from the position of the camera rig, the viewer will see the images as if they were being observed from the same size and distance from which they were captured given the user a realistic impression of being in the same environment as the camera rig used to capture the images.

Operation then proceeds to step 1444. In step 1444 the processing system 1600 encodes one or more image pairs captured by the stereoscopic camera pairs and transmits it to the playback device. The images may be transmitted as part of a content stream or streams which are received, decoded and displayed to a user of a playback device taking into consideration the environmental model information communicated to the playback device to be used in image rendering. Thus, a user of a playback device may receive and view 3D content corresponding to a live event while the event is ongoing which might not be possible if a more computationally complex method of generating the 3D content stream was used.

While a 3D content stream is desirable, it may be desirable to allow a user to view portions of the environment which are occluded from view or capture by the stereoscopic camera pairs. In step 1450 the processing system 1600 transmits at leas a portion of an image generated from a image captured by a light field camera to the playback device. The image may be an image of the sky or ground not captured by a stereo camera pair or a portion of the environment visible to a light filed camera that was not visible to the stereo pair given the position or orientation of the stereo pair. The playback device may, and in some embodiments does, use the light filed image in a rendering operation to fill in an area of the environment which was not captured, e.g., was occluded from view, of a stereo camera. The operation shown in FIG. 12 may occur on an ongoing basis with stereo images and depth map information being captured and updated on an ongoing basis but potentially at different rates do to differences between light field and other camera image capture rates.

The ongoing operation of the method shown in FIG. 12 is represented by connecting node B 1452 showing operation returning form step 1450 to steps 1404, 1406, 1408.

FIG. 13 illustrates an exemplary light field camera 1500 implemented in accordance with one exemplary embodiment of the present invention which can be used in any of the camera assemblies and/or camera rigs shown in FIGS. 1-11. The camera 1500 can be used to capture images in accordance with the methods of the present invention and implement one or more steps of the method of flowchart 1400. The exemplary camera device 1500 includes a display device 602, an input device 604, an I/O interface 606, a processor 608, memory 610, and a bus 609 which are mounted in a housing represented by the rectangular box touched by the line leading to reference number 1500. The camera device 1500 further includes an optical chain 612 and a network interface 614. The various components are coupled together via bus 609 which allows for signals and information to be communicated between the components of the camera 1500.

The display device 602 may be, and in some embodiments is, a touch screen, used to display images, video, information regarding the configuration of the camera device, and/or status of data processing being performed on the camera device. In the case where the display device 602 is a touch screen, the display device 602 serves as an additional input device and/or as an alternative to the separate input device, e.g., buttons, 606. The input device 604 may be, and in some embodiments is, e.g., keypad, touch screen, or similar device that may be used for inputting information, data and/or instructions.

Via the I/O interface 606 the camera device 1500 may be coupled to external devices and exchange information and signaling with such external devices. In some embodiments via the I/O interface 606 the camera 1500 may, and in some embodiments does, interfaces with the processing system 1600. In some such embodiments the processing system 1600 can be used to configure and/or control the camera 1500.

The network interface 614 allows the camera device 1500 to be able to receive and/or communicate information to an external device over a communications network.

The optical chain 610 includes a micro lens array 624 and an image sensor 626. The camera 1500 uses the micro lens array 624 to capture light information of a scene of interest coming from more than one direction when an image capture operation is performed by the camera 1500.

The memory 612 includes various modules and routines, which when executed by the processor 608 control the operation of the camera 1500 in accordance with the invention. The memory 612 includes control routines 620 and data/information 622. The processor 506, e.g., a CPU, executes control routines and uses data/information 622 to control the camera 1500 to operate in accordance with the invention and implement one or more steps of the method of flowchart 400. The processor 608 includes a on-chip depth map generation circuit 607 which generates depth map of various portions of the environment of interest from captured images corresponding to these portions of the environment of interest which are captured during the operation of the camera 1500 in accordance with the invention. The depth maps of various portions of the environment of interest generated by the camera 1500 are stored in the memory 612 as depth maps 630 while images corresponding to one or more portions of the environment of interest are stored as captured image(s). The captured images and depth maps are stored in memory 612 for future use, e.g., additional processing, and/or transmission to another. In various embodiments the depth maps 630 and one or more captured images 628 are provided to the processing system 104 for further processing and actions in accordance with the features of the invention.

Figure 14:
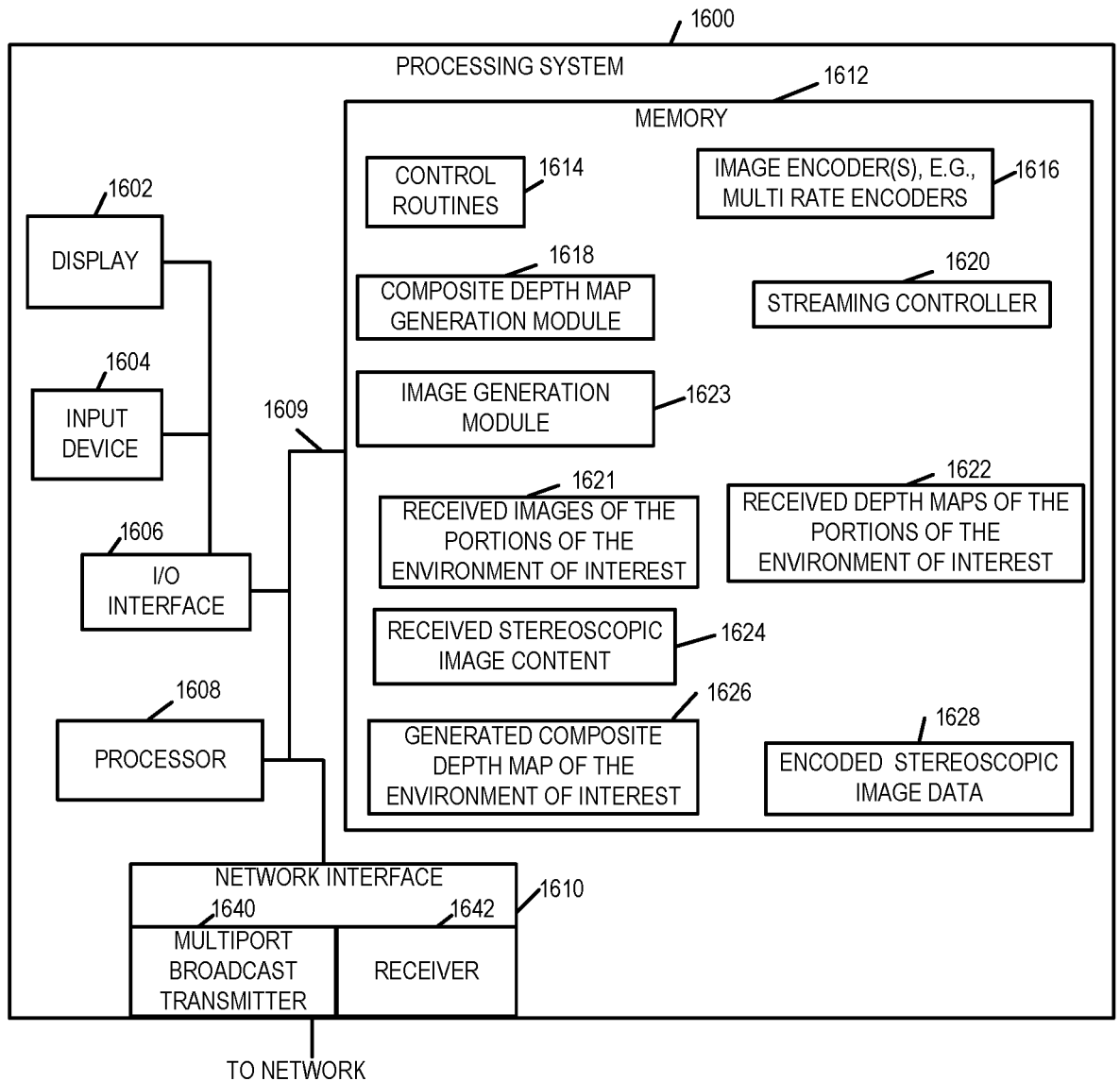
FIG. 14 illustrates an exemplary processing system implemented in accordance with the invention.

FIG. 14 illustrates an exemplary processing system 1600 in accordance with the features of the invention. The processing system 1600 can be used to implement one or more steps of the method of flowchart 1400. The processing system 1600 includes multi-rate encoding capability that can be used to encode and stream stereoscopic imaging content.

The processing system 1600 may be, and in some embodiments is, used to perform composite depth map generation operation, multi-rate encoding operation, storage, and transmission and/or content output in accordance with the features of the invention. The processing system 1600 may also include the ability to decode and display processed and/or encoded image data, e.g., to an operator.

The system 1600 includes a display 1602, input device 1604, input/output (I/O) interface 1606, a processor 1608, network interface 1610 and a memory 1612. The various components of the system 1600 are coupled together via bus 1609 which allows for data to be communicated between the components of the system 1600.

The memory 1612 includes various routines and modules which when executed by the processor 1608 control the system 1600 to implement the composite depth map generation, encoding, storage, and streaming/transmission and/or output operations in accordance with the invention. The routines may and sometimes do control image capture by one or more camera rigs such as the multi-camera rig 1101.

The display device 1602 may be, and in some embodiments is, a touch screen, used to display images, video, information regarding the configuration of the processing system 1600, and/or indicate status of the processing being performed on the processing device. In the case where the display device 602 is a touch screen, the display device 602 serves as an additional input device and/or as an alternative to the separate input device, e.g., buttons, 1606. The input device 1604 may be, and in some embodiments is, e.g., keypad, touch screen, or similar device that may be used for inputting information, data and/or instructions.

Via the I/O interface 606 the processing system 1600 may be coupled to external devices and exchange information and signaling with such external devices, e.g., such as the camera rig 801 and/or camera 1500. In some embodiments via the I/O interface 1606 the processing system 1600 receives images and depth maps generated by the camera device 1500.

The network interface 1610 allows the processing system 1600 to be able to receive and/or communicate information to an external device over a communications network, e.g., such as communications network 105. The network interface 1610 includes a multiport broadcast transmitter 1640 and a receiver 1642. The multiport broadcast transmitter 1640 allows the processing system 1600 to broadcast multiple encoded stereoscopic data streams each supporting different bit rates to various customer devices. In some embodiments the processing system 1600 transmits different portions of a scene, e.g., 180 degree front portion, left rear portion, right rear portion etc., to customer devices via the multiport broadcast transmitter 1640. Furthermore, via the multiport broadcast transmitter 1640 the processing system 1600 also broadcasts composite depth map 1626 to the one or more customer devices. While the multiport broadcast transmitter 1640 is used in the network interface 1610 in some embodiments, still in some other embodiments the processing system transmits, e.g., unicasts or multicasts, the composite depth map and/or stereoscopic imaging content to individual customer devices.

The memory 1612 includes control routines 1614, image encoder(s) 1616, a composite depth map generation module 1618, streaming controller 1620, received images 1621 of environment of interest, received depth maps of the environment of interest 1622, received stereoscopic image data 1624, generated composite depth map 1626 and encoded stereoscopic image data 1628.

In some embodiments the modules are, implemented as software modules. In other embodiments the modules are implemented in hardware, e.g., as individual circuits with each module being implemented as a circuit for performing the function to which the module corresponds. In still other embodiments the modules are implemented using a combination of software and hardware.

The control routines 1614 include device control routines and communications routines to control the operation of the processing system 1600. The encoder(s) 1616 may, and in some embodiments do, include a plurality of encoders configured to encode received image content, stereoscopic images of a scene and/or one or more scene portions in accordance with the features of the invention. In some embodiments encoder(s) include multiple encoders with each encoder being configured to encode a stereoscopic scene and/or partitioned scene portions to support a given bit rate stream. Thus in some embodiments each scene portion can be encoded using multiple encoders to support multiple different bit rate streams for each scene. An output of the encoder(s) 1616 is the encoded stereoscopic image data 1628 stored in the memory for streaming to customer devices, e.g., playback devices. The encoded content can be streamed to one or multiple different devices via the network interface 1610.

The composite depth map generation module 1618 is configured to generate a composite depth map of the environment of interest from the depth maps of the environment of interest 1622 received from the camera device 1500. The generated composite depth map of the environment of interest 1626 is an output of the composite depth map generation module 1618. The streaming controller 1620 is configured to control streaming of encoded content for delivering the encoded image content (e.g., at least a portion of encoded stereoscopic image data 1628) to one or more customer playback devices, e.g., over the communications network 105. In various embodiments the streaming controller 1620 is further configured to communicate, e.g., transmit, the composite depth map 1626 to one or more customer playback devices, e.g., via the network interface 1610.

The image generation module 1623 is configured to generate a first image from at least one image captured by the light field camera, e.g., received images 1621, the generated first image including a portion of the environment of interest which is not included in at least some of the images (e.g., stereoscopic image content 1624) captured by the stereoscopic cameras. In some embodiments the streaming controller 1620 is further configured to transmit at least a portion of the generated first image to one or more customer playback devices, e.g., via the network interface 1610.

Received stereoscopic image data 1624 includes stereoscopic content received from one or more stereoscopic cameras 103. Encoded stereoscopic image data 1628 includes a plurality of sets of stereoscopic image data which have been encoded by the encoder(s) 1616 to support multiple different bit rate streams.

Figure 15A:
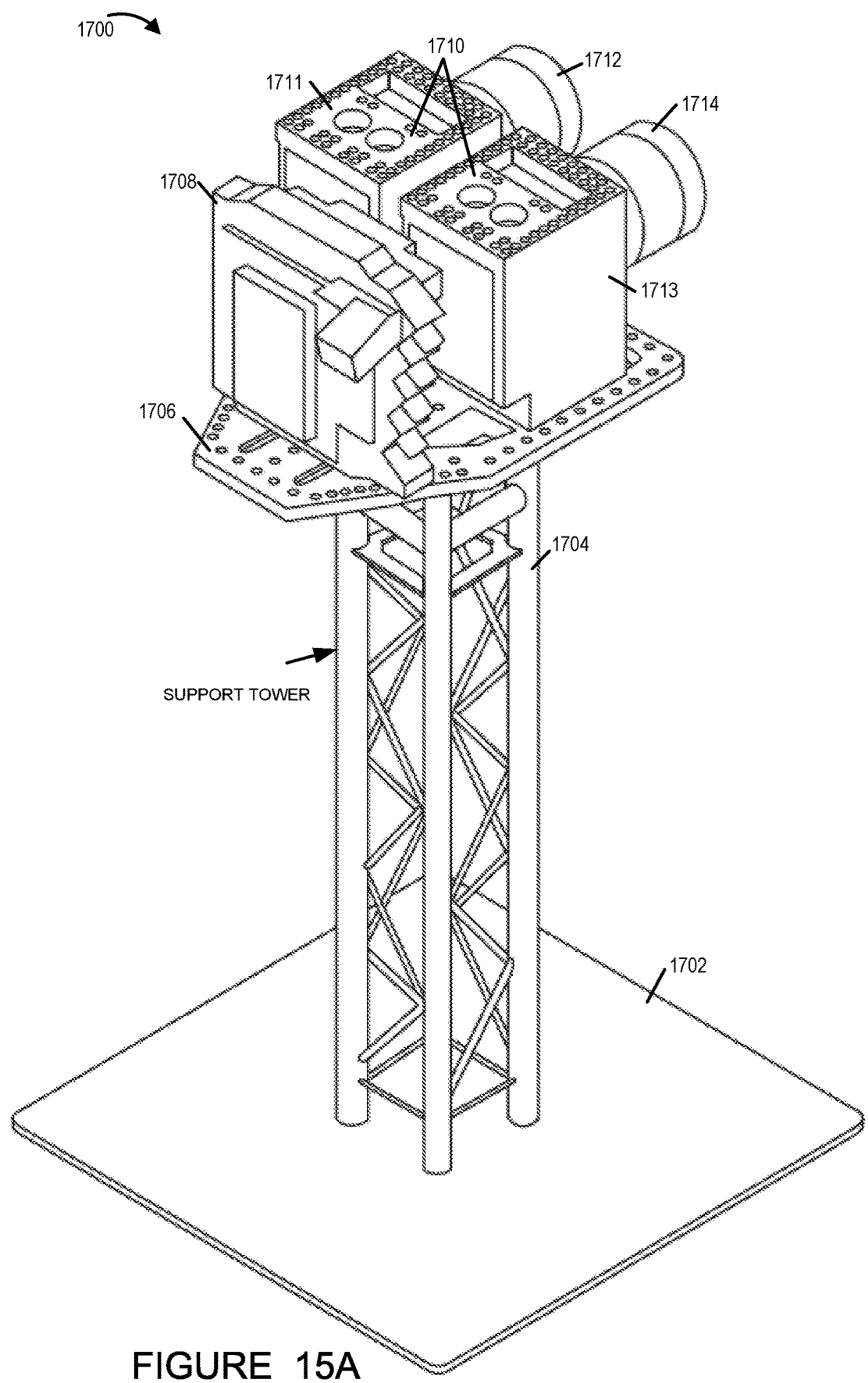
FIG. 15A illustrates a perspective view of an exemplary tower mounted single camera pair rig suitable for capturing images intended for stereoscopic viewing.

FIG. 15A illustrates a perspective view of an exemplary tower mounted single stereo camera pair rig 1700 in accordance with an exemplary embodiment. The exemplary rig 1700 includes a base 1702 on which a support tower 1704 is mounted. Over the support tower 1704 the camera rig support structure/mounting plate 1706 is placed. The support structure/mounting plate 1706 supports the stereoscopic camera pair 1710 including a left eye camera 1711 and a right eye camera 1713 for capturing left and right eye images respectively. The left eye camera 1711 includes and/or is coupled to lens assembly 1712 and the right eye camera 1713 includes and/or is coupled to lens assembly 1714. The camera rig 1700 also includes an interface 1708 via which the camera rig can be coupled to one or more external devices, e.g., for communicating captures images and/or for remotely controlling the camera rig 1700.

Figure 15B:
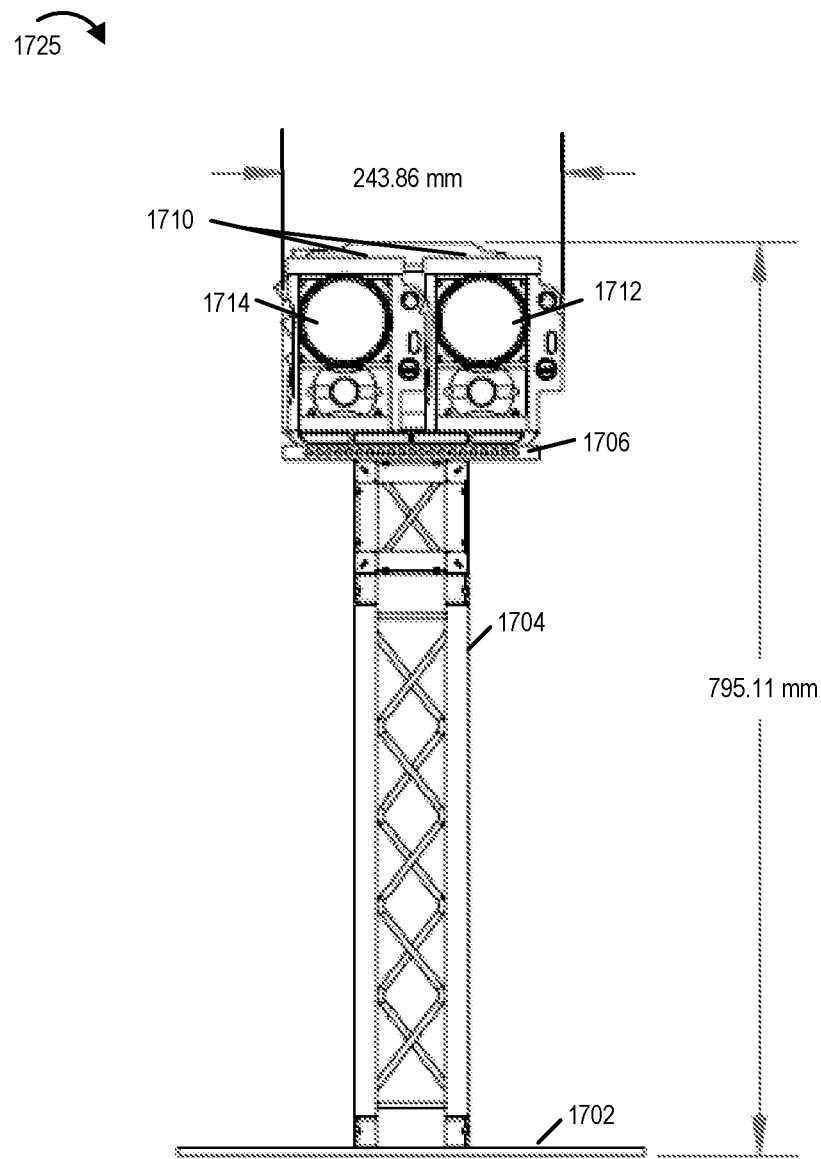
FIG. 15B illustrates a front view of the exemplary tower mounted single stereo camera pair rig.

FIG. 15B is a drawing 1725 illustrating a front view of the exemplary tower mounted single stereo camera pair rig 1700, with various structures and/or elements of the camera rig 1700 shown from a frontal perspective. The total height from a surface where the base 1702 rests to the top of the camera pair 1710 used in some embodiments is shown to be 795.11 mm (millimeter).

Figure 15C:
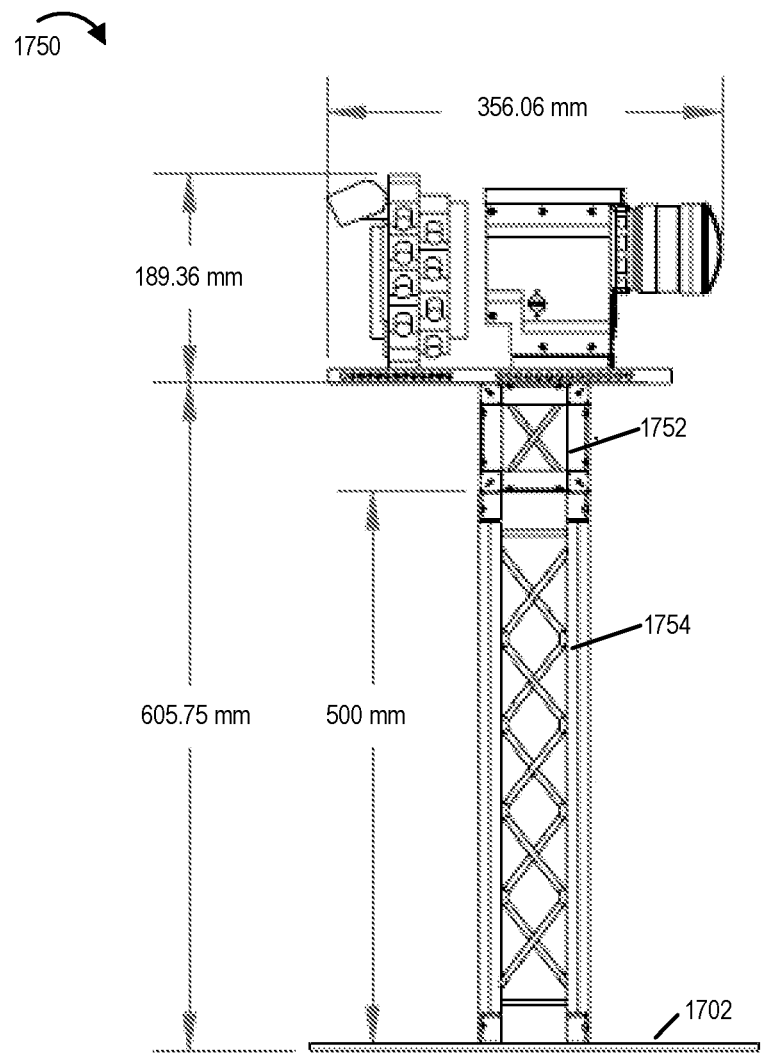
FIG. 15C is a drawing illustrating a side view of the exemplary tower mounted single stereo camera pair rig of FIG. 15A.

FIG. 15C is a drawing 1750 illustrating a side view of the exemplary tower mounted single stereo camera pair rig 1700. The support tower 1704 includes a fixed truss segment 1752 and a modular truss segment to support the camera pair 1710. FIG. 15C also shows various additional constructional features, dimensions and/or elevation adjustment values used in some embodiments.

Figure 15D:
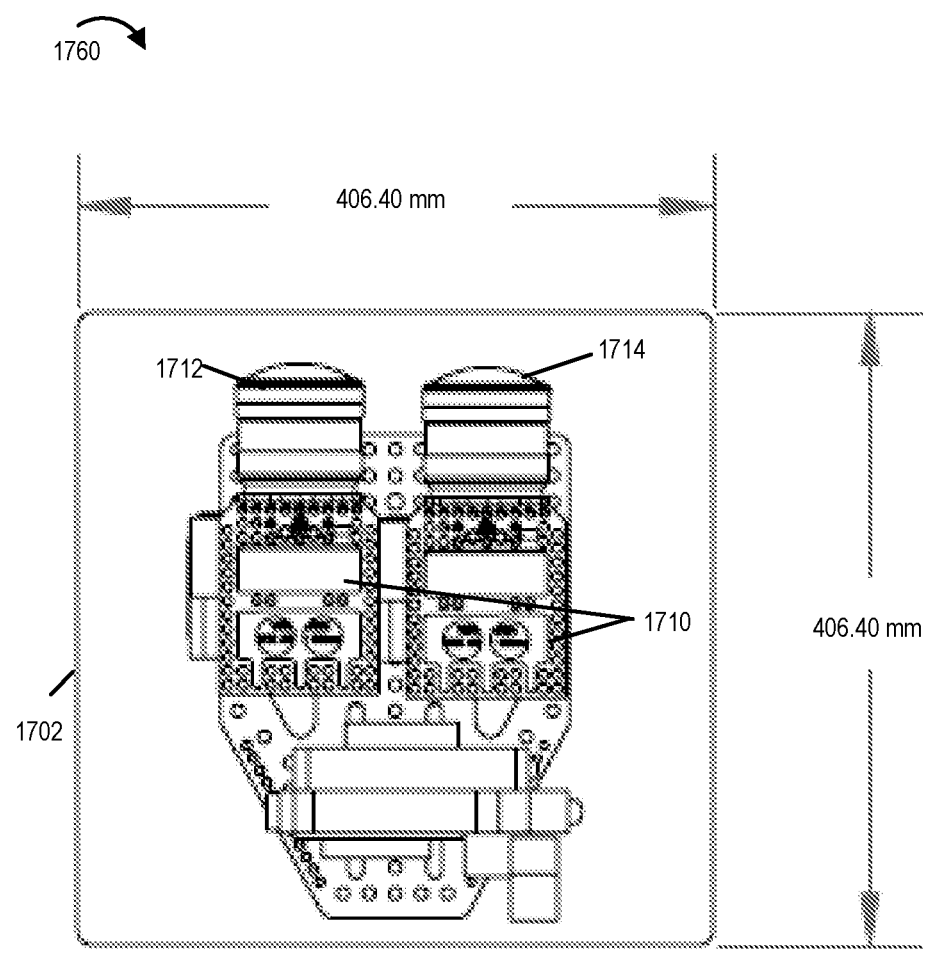
FIG. 15D is a drawing illustrating a top view of the exemplary single tower stereo camera pair rig of FIG. 15A.

FIG. 15D is a drawing 1760 illustrating a top view of the exemplary single stereo camera pair rig 1700. As can be seen in the top view shown in drawing 1760 the support base 1702 is a square shaped support having the dimensions 406.40 mm×406.40 in some embodiments.

Figure 16A:
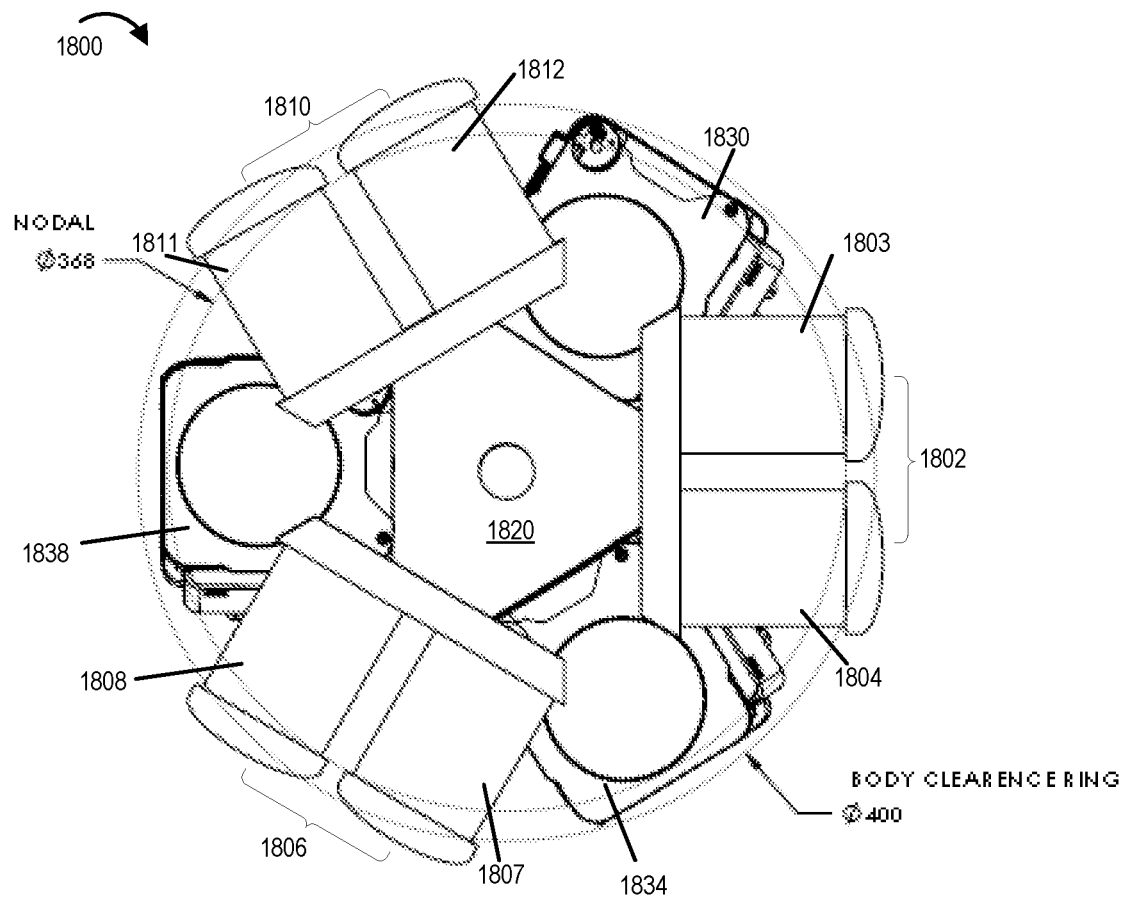
FIG. 16A illustrates a top view of an exemplary triple stereo camera pair rig in accordance with some embodiments.

FIG. 16A illustrates a top view of an exemplary triple stereo camera pair rig 1800 in accordance with some embodiments. As shown in drawing 1800 the camera rig includes three pairs of stereoscopic camera pairs including camera pair 1802, 1806 and 1810 which are mounted on the support structure 1820. The electronic module assemblies 1830, 1834 and 1838 which are coupled to their respective camera pairs are also shown in the figure.

Figure 16B:
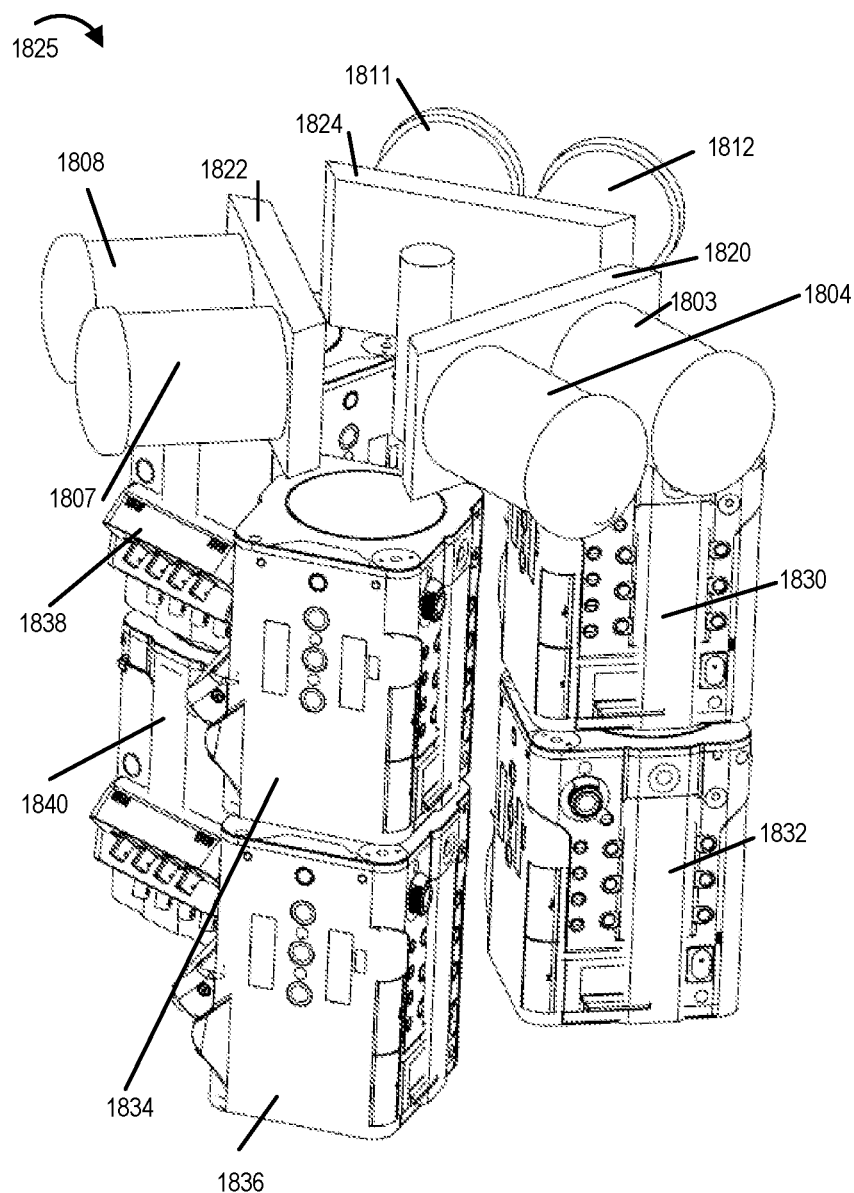
FIG. 16B is a drawing illustrating a perspective view of the exemplary triple stereo camera pair rig with various features and/or elements of the triple stereo camera pair rig being shown in more detail.

FIG. 16B is a drawing 1825 illustrating a perspective view of the exemplary triple stereo camera pair rig 1800 with various features and/or elements of the camera rig 1800 being shown in more detail. The first stereoscopic camera pair 1802 includes a left eye camera 1803 and a right eye camera 1804 and a sensor assembly 1820, the second stereoscopic camera pair 1806 includes a left eye camera 1807 and a right eye camera 1808 and a sensor assembly 1822, and the third stereoscopic camera pair 1810 includes a left eye camera 1811 and a right eye camera 1812 and a sensor assembly 1824. The left and right eye cameras of each stereoscopic camera pair are coupled to their corresponding lens assemblies. In some embodiments each of the sensor assemblies 1820, 1822, 1824 includes one sensor for each lens assembly, e.g., one for the left camera and one for the right camera. The electronic modules 1830, 1832 are coupled to the corresponding camera sensors in the sensor assembly 1820, the electronic modules 1834, 1836 are coupled to the corresponding camera sensors in the sensor assembly 1822 and the electronic modules 1838, 1840 are coupled to the corresponding camera sensors in the sensor assembly 1824.

Figure 16C:
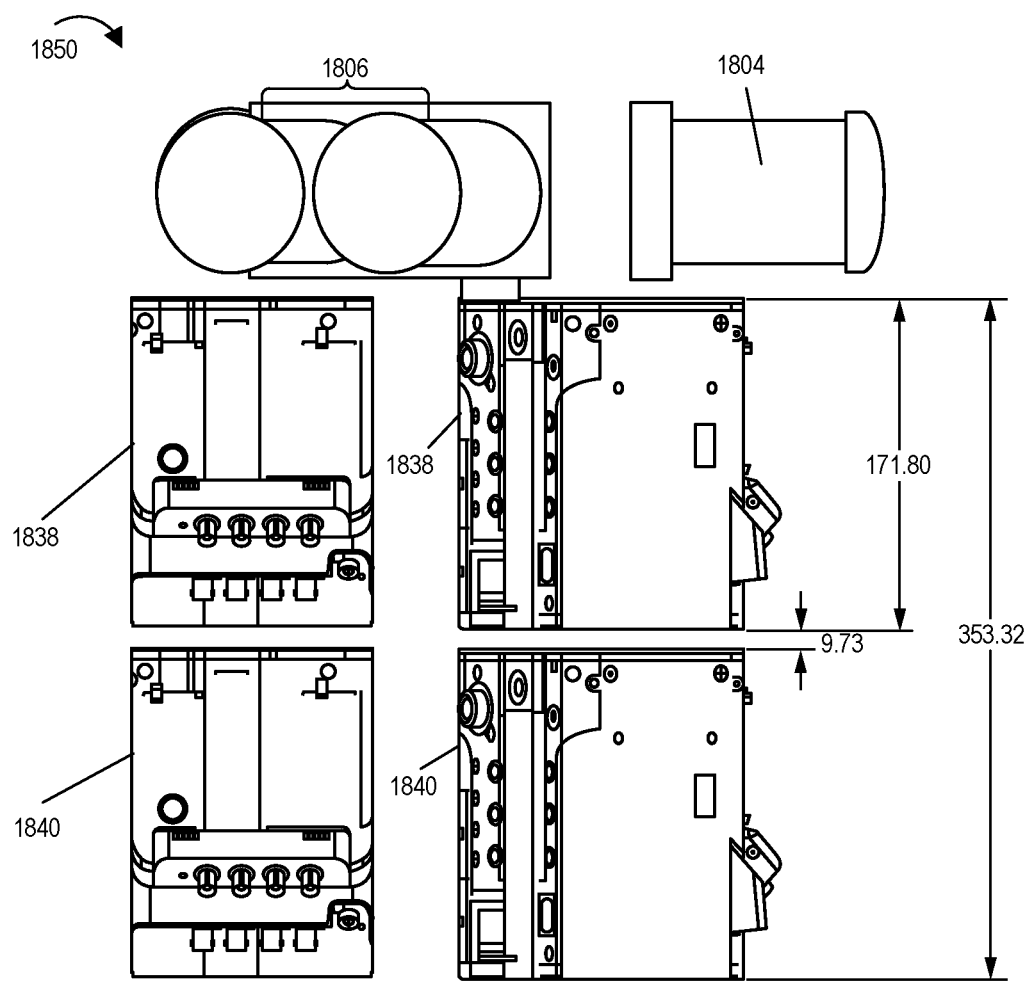
FIG. 16C is a drawing illustrating a side view of the exemplary triple stereo camera pair rig.

FIG. 16C is a drawing 1850 illustrating a side view of the exemplary triple stereo camera pair rig 1800 with the camera pair 1806 being fully visible and only a single camera 1804 of the camera pair 1802 being visible from the side from which the camera rig 1800 is being shown.

Figure 17:
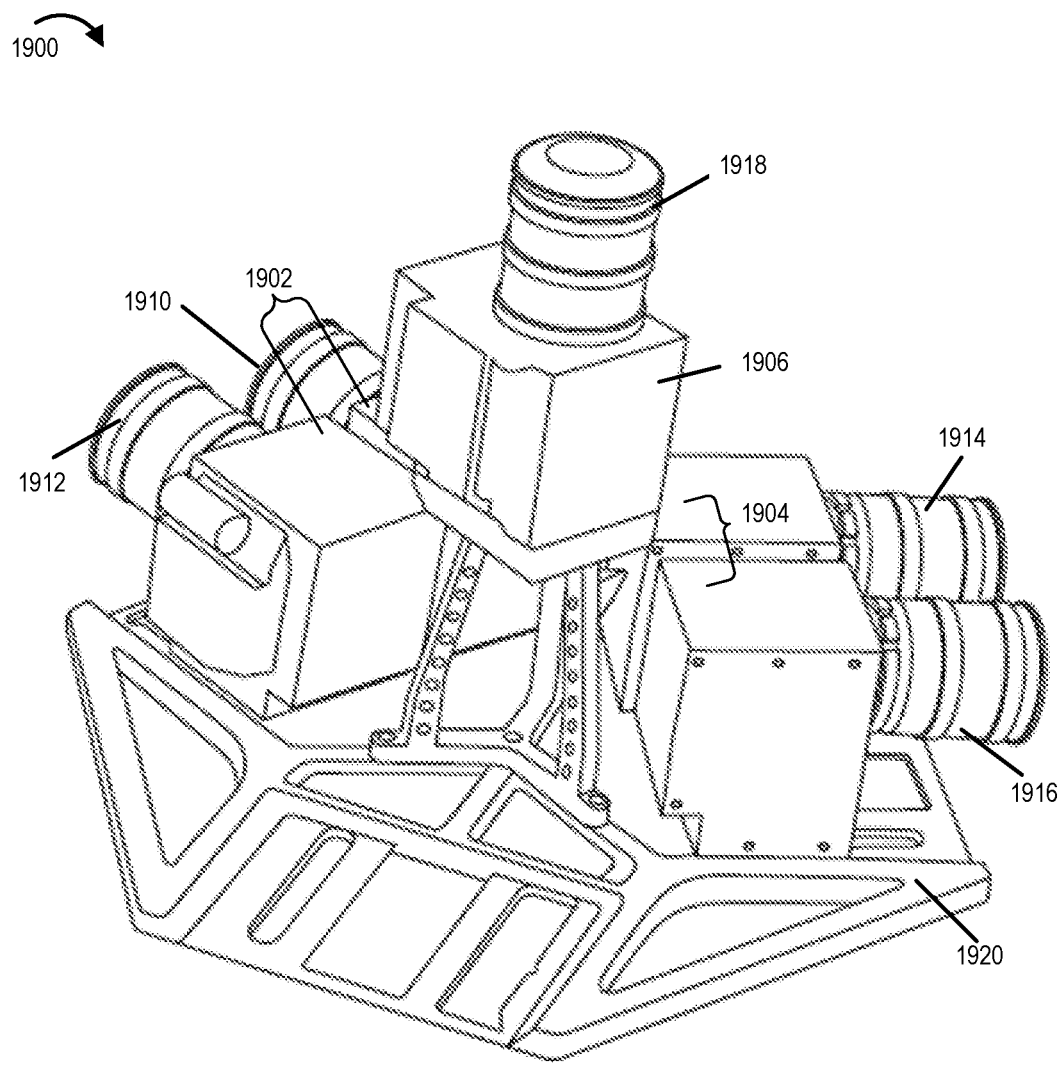
FIG. 17 illustrates an exemplary tri stereo camera rig in accordance with an exemplary embodiment.

FIG. 17 illustrates an exemplary tri stereoscopic camera rig 1900 in accordance with an exemplary embodiment. The exemplary stereo camera rig 1900 includes two stereoscopic camera pairs 1902, 1904 facing in different horizontal directions and a single camera 1906 facing upwards in the vertical direction, e.g., for capturing sky images. The exemplary stereoscopic camera rig 1900 further includes a camera support platform 1920 over which the cameras are mounted. Each of the stereoscopic camera pairs 1902, 1904 includes a left eye camera and a right eye camera for capturing left and right eye images respectively. The left and right eye cameras of the stereoscopic camera pairs 1902, 1904 are coupled to their respective lens assemblies 1910, 1912 and 1914, 1916. The other camera 1906 facing in the vertical direction is also coupled to its own lens assembly 1918.

Figure 18:
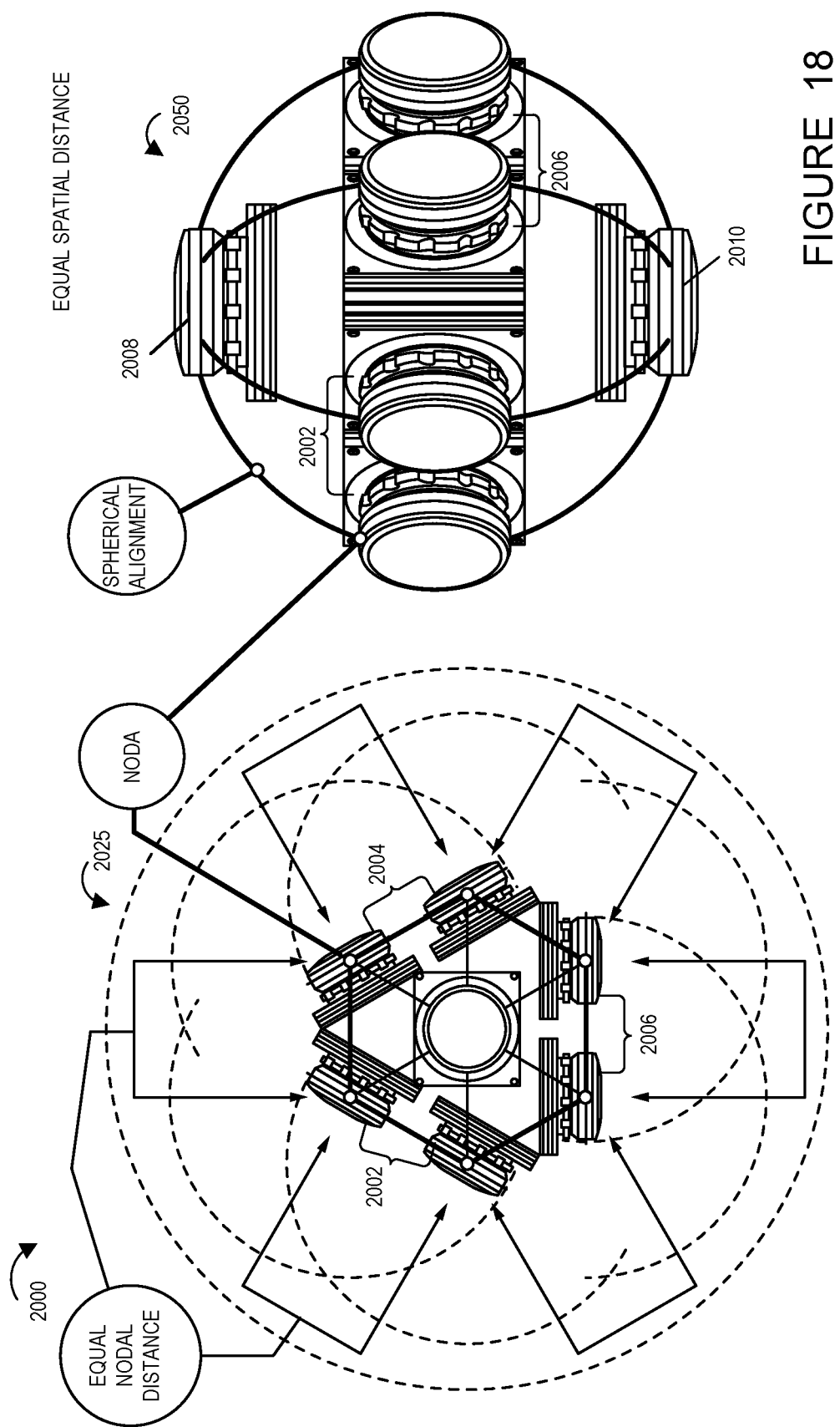
FIG. 18 includes two different views of an exemplary tri stereo camera rig that includes a top upward facing camera and a bottom downward facing camera in accordance with an exemplary embodiment.

FIG. 18 includes two different views of an exemplary tri stereoscopic camera rig 2000 that includes a top upward facing camera and a bottom downward facing camera in accordance with an exemplary embodiment. The first drawing 2025 shows a top view of the exemplary tri stereoscopic camera rig 2000 where the configuration of the camera rig 200 is shown from a top perspective. The exemplary camera rig 2000 includes three stereoscopic camera pairs 2002, 2004 and 2006, a top upward facing camera 2008 and a bottom downward facing camera which is not visible in drawing 2025 but can be seen in drawing 2050 showing the side view. In the FIG. 18 embodiment equi-distant sensors, e.g., optical sensors of the illustrated cameras, are used throughout the camera array. Such a configuration provides for a highly uniform capture of depth and stereoscopic video from the full 360 horizontal view. In the illustrated configuration the stereo-correspondence is uniform for each of the sensors of the sensor pairs (camera pairs) and relative to the other sensors in the constellation.

Figure 19:
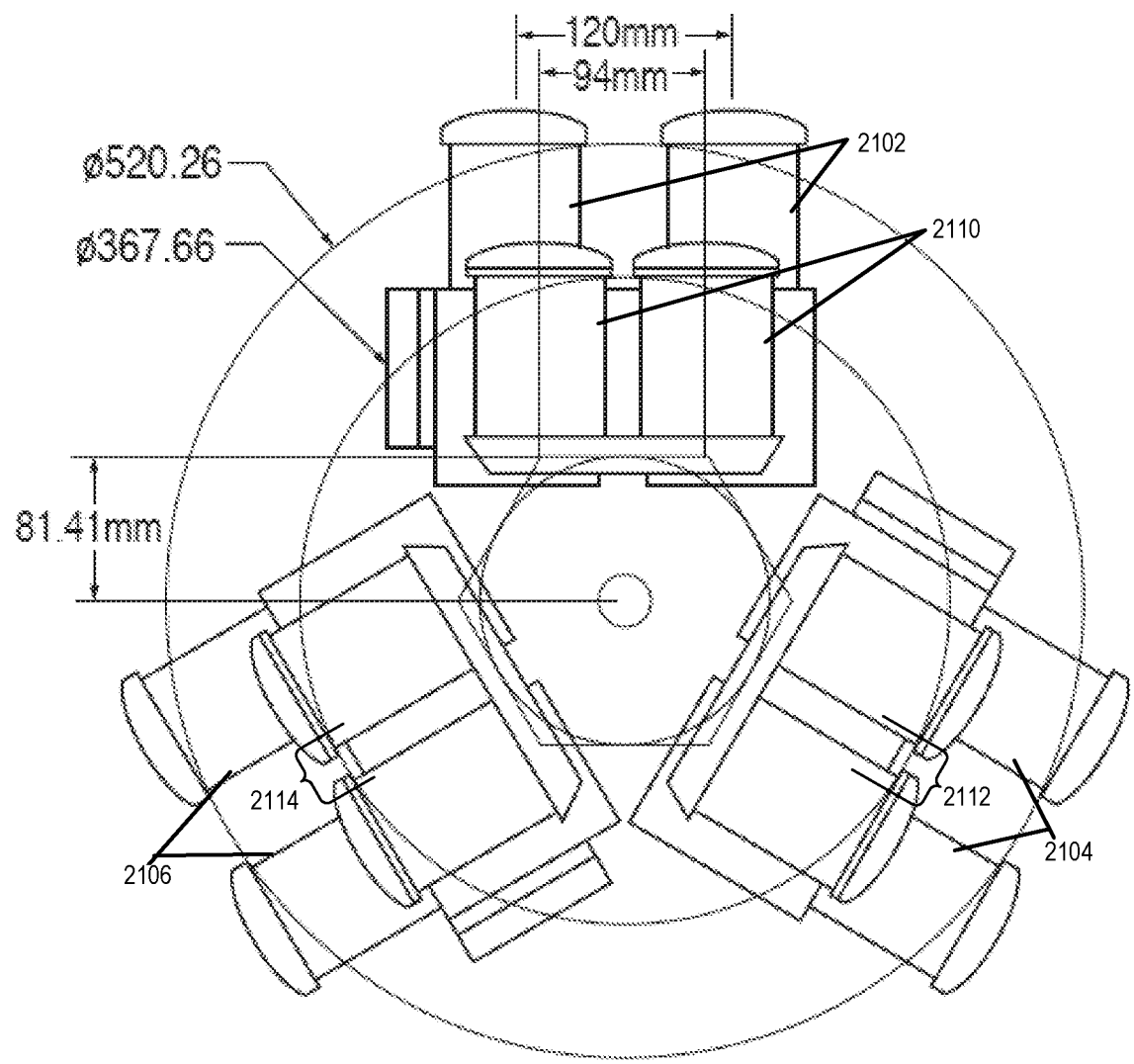
FIG. 19 illustrates an exemplary two level stereo camera rig that includes six pairs of stereoscopic cameras arranged three camera pairs per level.

FIG. 19 illustrates an exemplary two level stereo camera rig 2100 that includes six pairs of stereoscopic cameras arranged three camera pairs per level. The top level includes three stereoscopic camera pairs 2110, 2112 and 2114 while the second bottom level includes another set of three stereoscopic camera pairs 2102, 2104 and 2106.

Figure 20A:
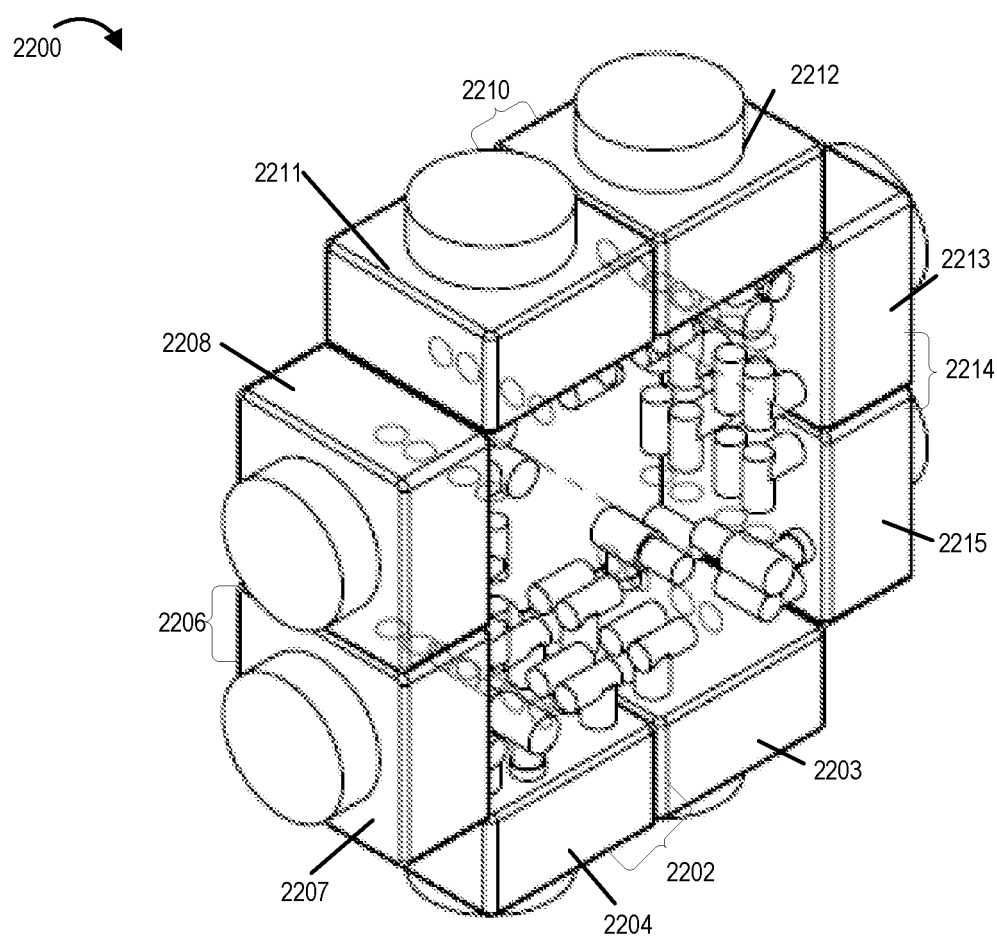
FIG. 20A illustrates a view of an exemplary quad stereoscopic camera pair rig in accordance with an exemplary embodiment.

FIG. 20A illustrates a view of an exemplary quad stereoscopic camera pair rig 2200 in accordance with an exemplary embodiment. The exemplary quad stereoscopic camera pair rig 2200 includes four stereo camera pairs 2202, 2206, 2210 and 2214 arranged along four sides with the four sides forming a rectangle, e.g., square, as shown. Each stereoscopic camera pair includes a left eye camera and a right eye camera for capturing left and right eye images respectively. The stereoscopic camera pair 2202 includes a left eye camera 2203 and a right eye camera 2204, stereoscopic camera pair 2206 includes a left eye camera 2207 and a right eye camera 2208, stereoscopic camera pair 2210 includes a left eye camera 2211 and a right eye camera 2212 and the stereoscopic camera pair 2214 includes a left eye camera 2213 and a right eye camera 2215.

Figure 20B:
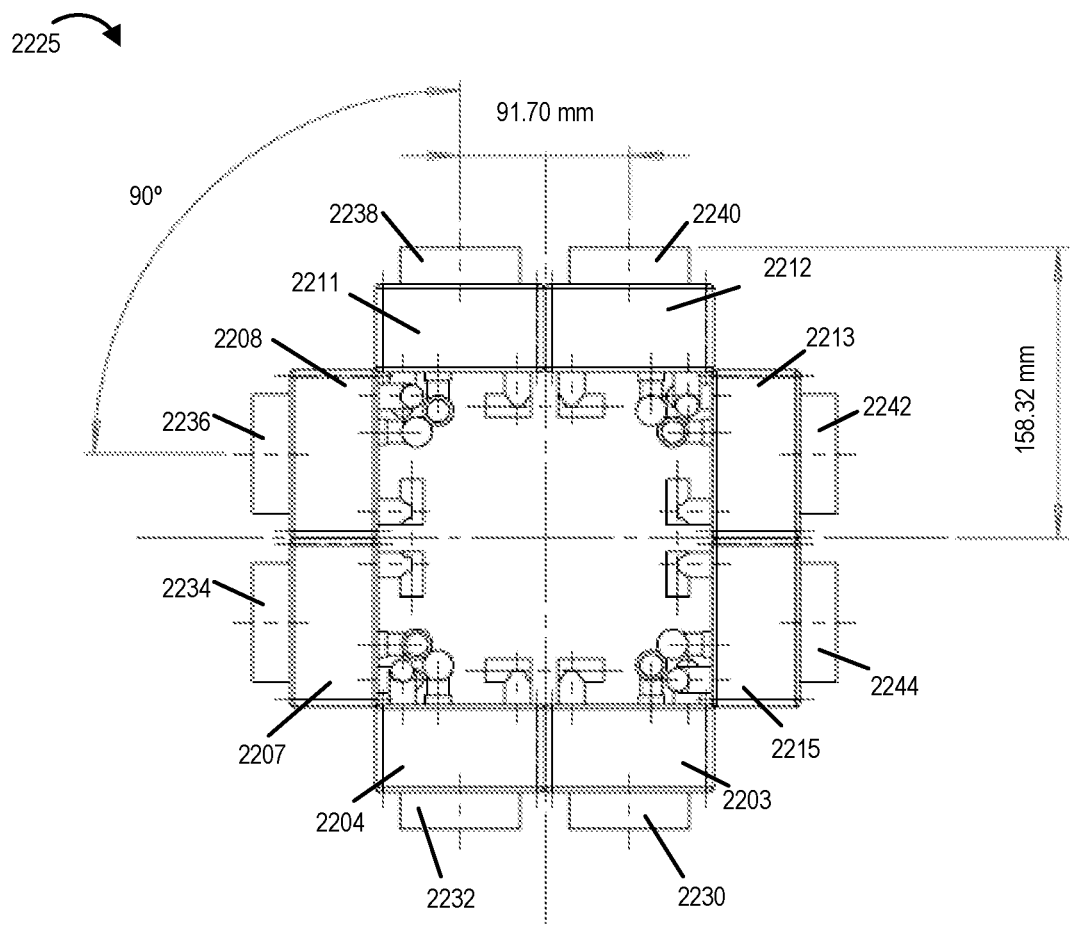
FIG. 20B is a drawing illustrating a top view of the exemplary quad stereoscopic camera pair rig of FIG. 20A with more constructions features and/or dimensions shown for further detail.

FIG. 20B is a drawing 2225 illustrating a top view of the exemplary quad stereoscopic camera pair rig 2200 with more constructions features and/or dimensions shown for further detail. The left eye camera 2203 of the stereoscopic camera pair 2202 is coupled to lens assembly 2230 while the right eye camera 2204 of the stereoscopic camera pair 2202 is coupled to lens assembly 2232. The left eye camera 2204 of the stereoscopic camera pair 2206 is coupled to lens assembly 2234 while the right eye camera 2208 of the stereoscopic camera pair 2206 is coupled to lens assembly 2236, the left eye camera 2211 of the stereoscopic camera pair 2210 is coupled to lens assembly 2238 while the right eye camera 2212 is coupled to lens assembly 2240 and the left eye camera 2213 of the stereoscopic camera pair 2214 is coupled to lens assembly 2242 while the right eye camera 2215 is coupled to lens assembly 2244. As can be seen the directions in which each of the camera pairs face are different and apart by 90 degrees in some embodiments.

Figure 21A:
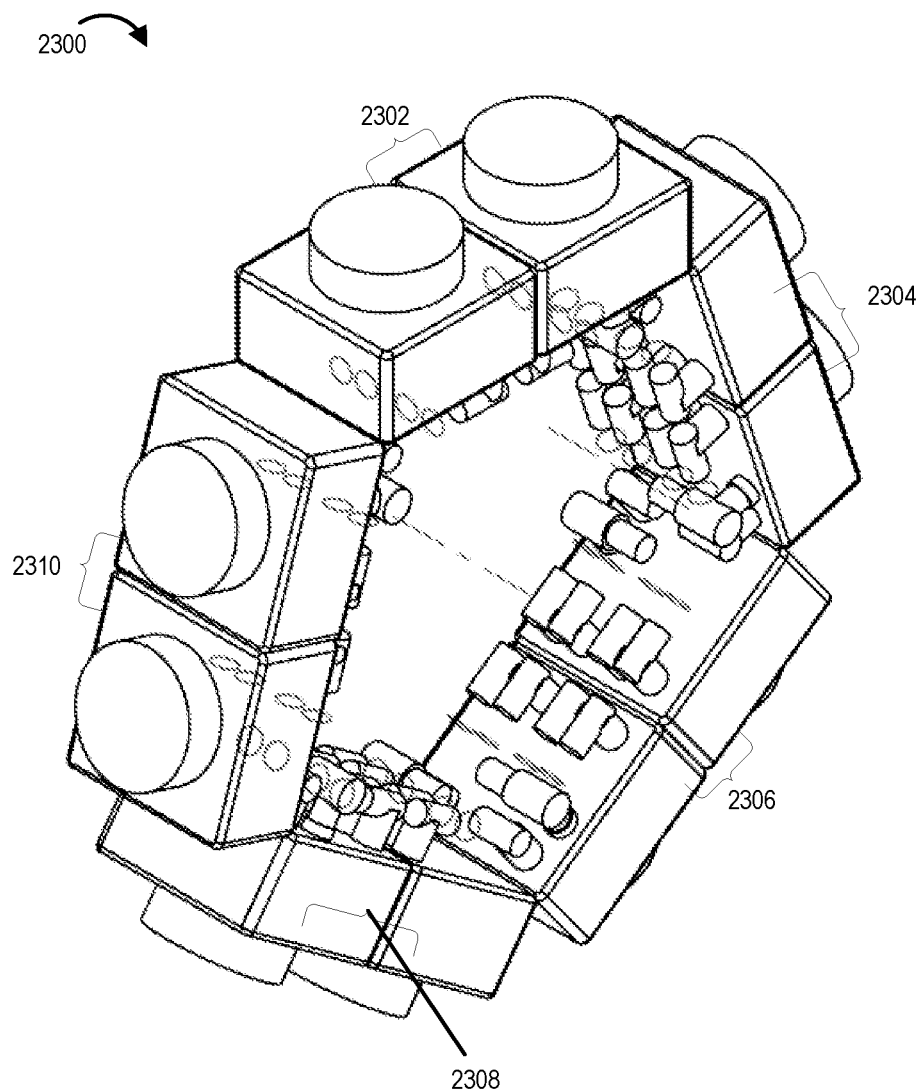
FIG. 21A illustrates a view of an exemplary penta (five) stereoscopic camera pair rig in accordance with an exemplary embodiment.

FIG. 21A illustrates a view of an exemplary penta (five) stereoscopic camera pair rig 2300 in accordance with an exemplary embodiment. The exemplary five stereoscopic camera pair rig 2300 includes five stereo camera pairs 2302, 2304, 2306, 2308, and 2310 arranged along five sides with the five sides forming a pentagon as shown. Each stereoscopic camera pair includes a left eye camera and a right eye camera for capturing left and right eye images respectively.

Figure 21B:
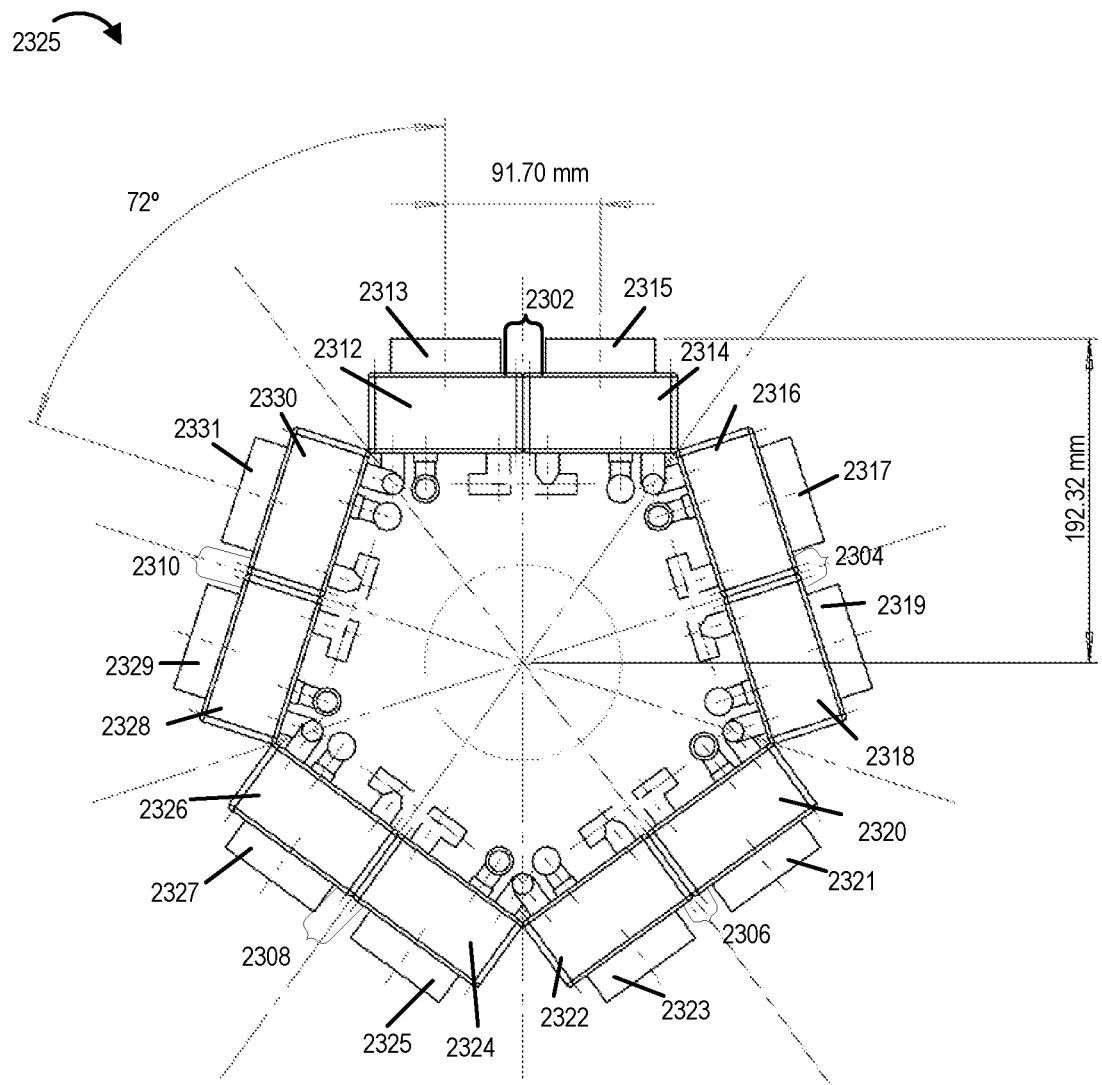
FIG. 21B is a drawing illustrating a top view of the exemplary penta stereoscopic camera pair rig with more constructions features and/or dimensions shown for further detail.

FIG. 21B is a drawing 2325 illustrating a top view of the exemplary penta stereoscopic camera pair rig 2300 with more constructions features and/or dimensions shown for further detail in drawing 2325. The left eye camera 2312 and the right eye camera 2314 of the stereoscopic camera pair 2302 are coupled to their respective lens assemblies 2313 and 2315, the left eye camera 2316 and the right eye camera 2318 of the stereoscopic camera pair 2304 are coupled to their respective lens assemblies 2317 and 2319, the left eye camera 2320 and the right eye camera 2322 of the stereoscopic camera pair 2306 are coupled to their respective lens assemblies 2321 and 2323, the left eye camera 2324 and the right eye camera 2326 of the stereoscopic camera pair 2308 are coupled to their respective lens assemblies 2325 and 2327, and the left eye camera 2328 and the right eye camera 2330 of the stereoscopic camera pair 2310 are coupled to their respective lens assemblies 2329 and 2331. As can be seen in FIG. 21B the directions in which each of the camera pairs face are different and apart by 72 degrees in some embodiments.

Figure 22:
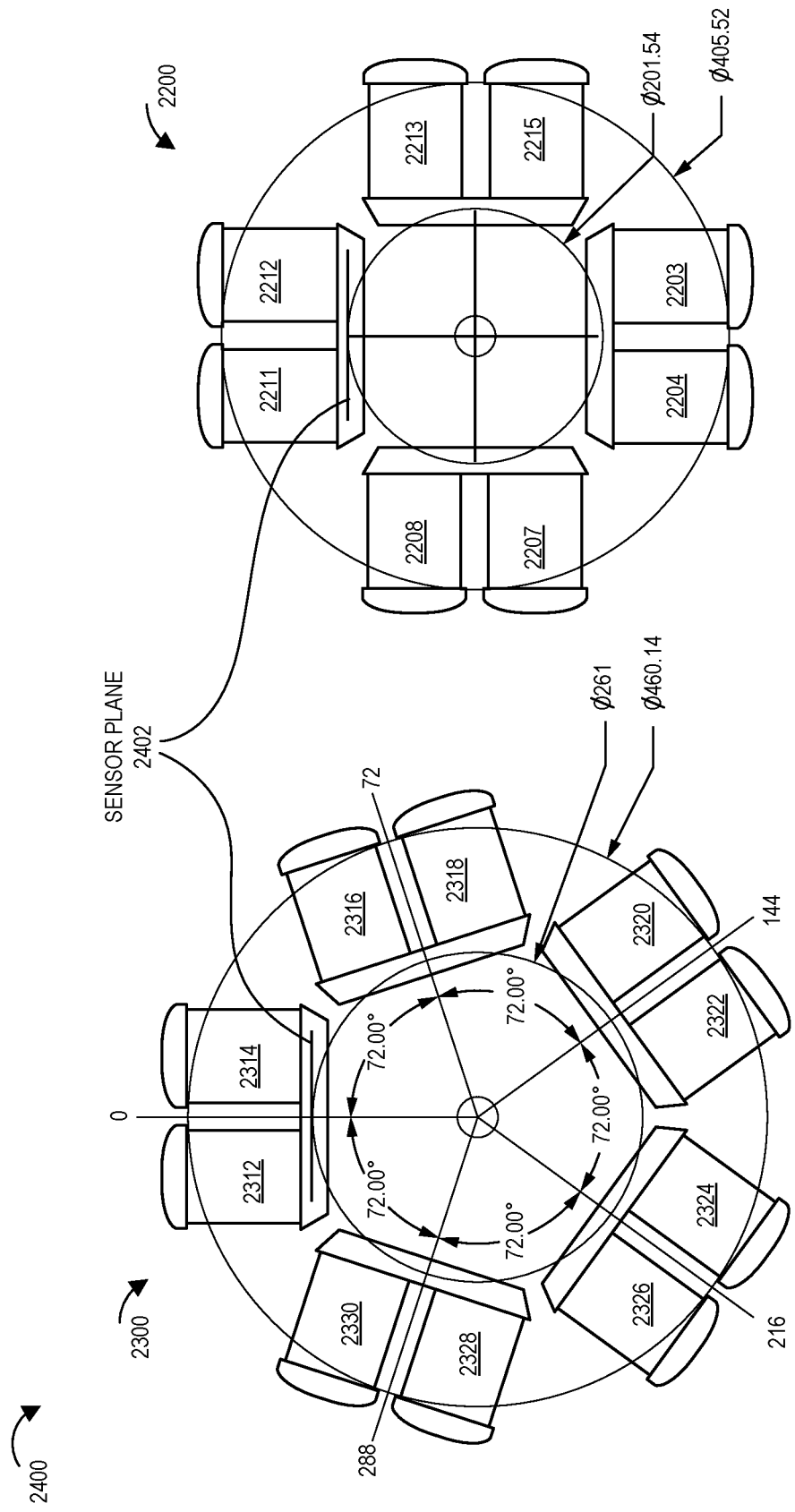
FIG. 22 is a drawing illustrating a side by side comparison of the exemplary penta stereoscopic camera pair rig on the left and the exemplary quad stereo camera pair rig shown on the right.

FIG. 22 is a drawing 2400 illustrating a side by side comparison of the exemplary penta stereoscopic camera pair rig 2300 on the left and the exemplary quad stereo camera pair rig 2200 shown on the right. Drawing 2400 allows for better appreciation of the two camera pair rigs 2200 and 2300 and the differences in their designs and configurations.

Figure 23:
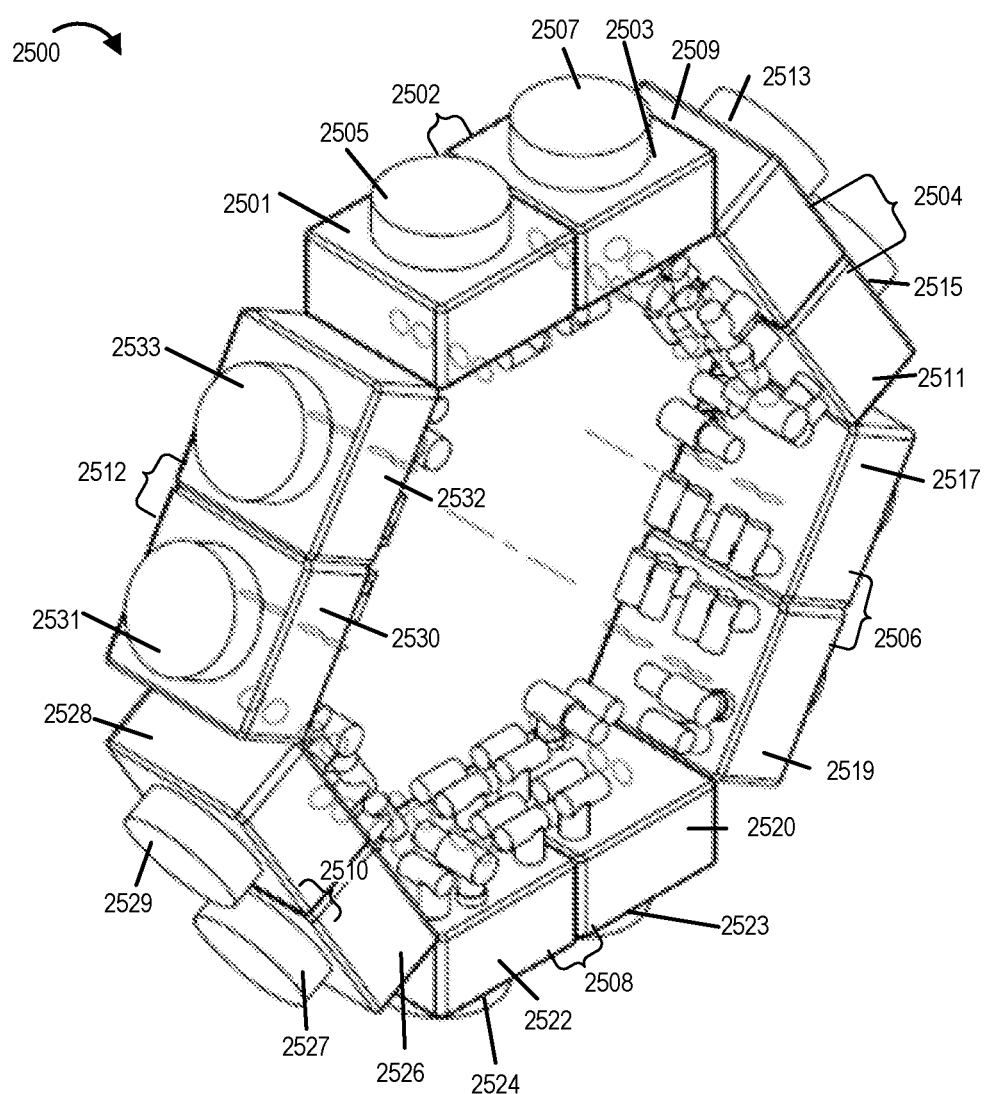
FIG. 23 illustrates a view of an exemplary hexa (six) stereoscopic camera pair rig in accordance with an exemplary embodiment.

FIG. 23 illustrates a view of an exemplary hexa (six) stereoscopic camera pair rig 2500 in accordance with an exemplary embodiment. The exemplary six stereoscopic camera pair rig 2500 includes six stereo camera pairs 2502, 2504, 2506, 2508, 2510 and 2512 arranged along six sides with the six sides forming a hexagon as shown. Each stereoscopic camera pair includes a left eye camera and a right eye camera for capturing left and right eye images respectively. The left eye camera 2501 and the right eye camera 2503 of the stereoscopic camera pair 2502 are coupled to their respective lens assemblies 2505 and 2507, the left eye camera 2509 and the right eye camera 2511 of the stereoscopic camera pair 2504 are coupled to their respective lens assemblies 2513 and 2515, the left eye camera 2517 and the right eye camera 2519 of the stereoscopic camera pair 2506 are coupled to their respective lens assemblies which are not visible in FIG. 23, the left eye camera 2520 and the right eye camera 2522 of the stereoscopic camera pair 2508 are coupled to their respective lens assemblies 2523 and 2524, the left eye camera 2526 and the right eye camera 2528 of the stereoscopic camera pair 2510 are coupled to their respective lens assemblies 2527 and 2529, the left eye camera 2530 and the right eye camera 2532 of the stereoscopic camera pair 2512 are coupled to their respective lens assemblies 2531 and 2533.

Figure 24:
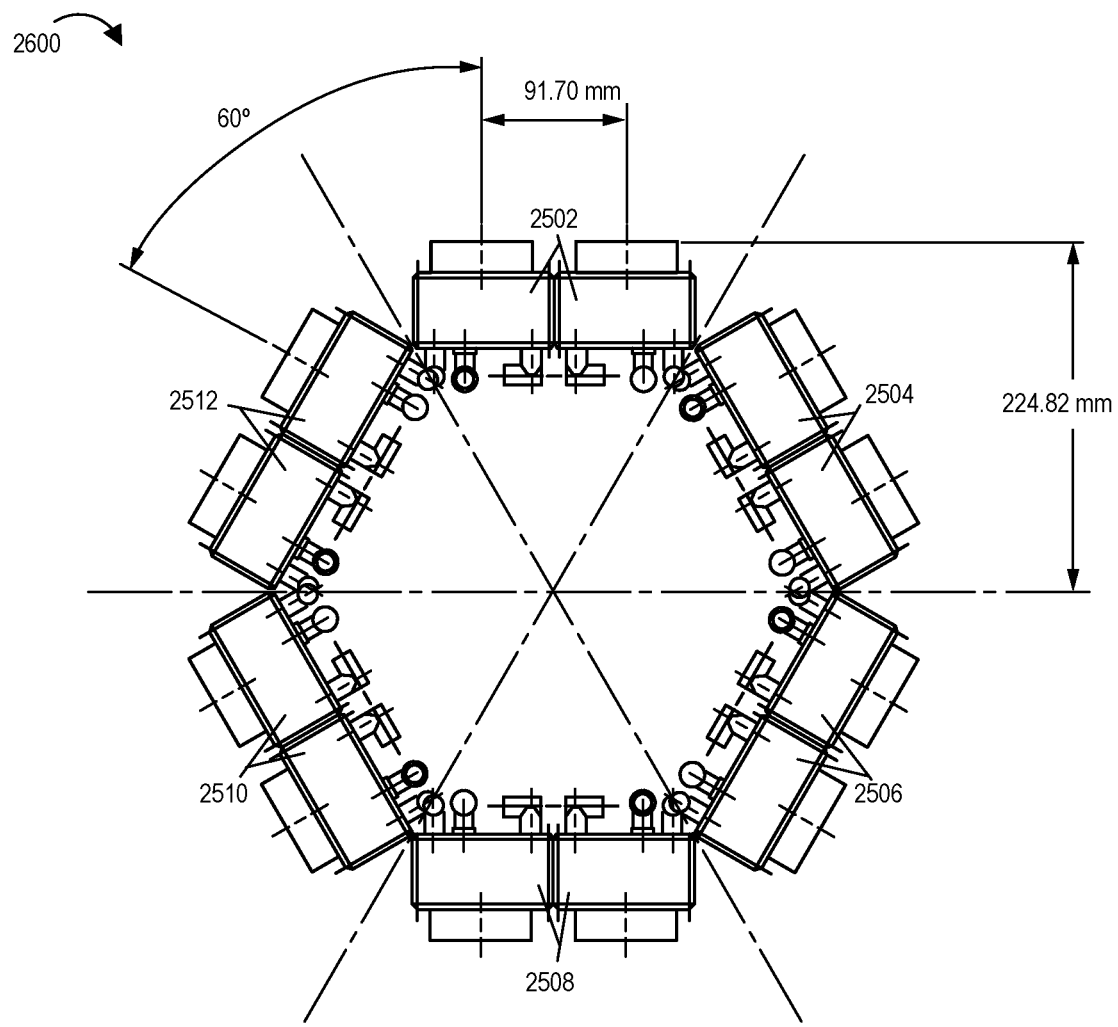
FIG. 24 is a drawing illustrating a top view of the hexa (six) stereoscopic camera pair rig with more constructions features and/or dimensions shown for further detail.

FIG. 24 is a drawing 2600 illustrating a top view of the hexa (six) stereoscopic camera pair rig 2500 with more constructions features and/or dimensions shown for further detail in drawing 2600. As shown the six stereo camera pairs 2502, 2504, 2506, 2508, 2510 and 2312 are arranged along six sides of a hexagon. As can be seen in FIG. 24 the directions in which each of the camera pairs face are different and apart by 60 degrees in some embodiments.

Figure 25:
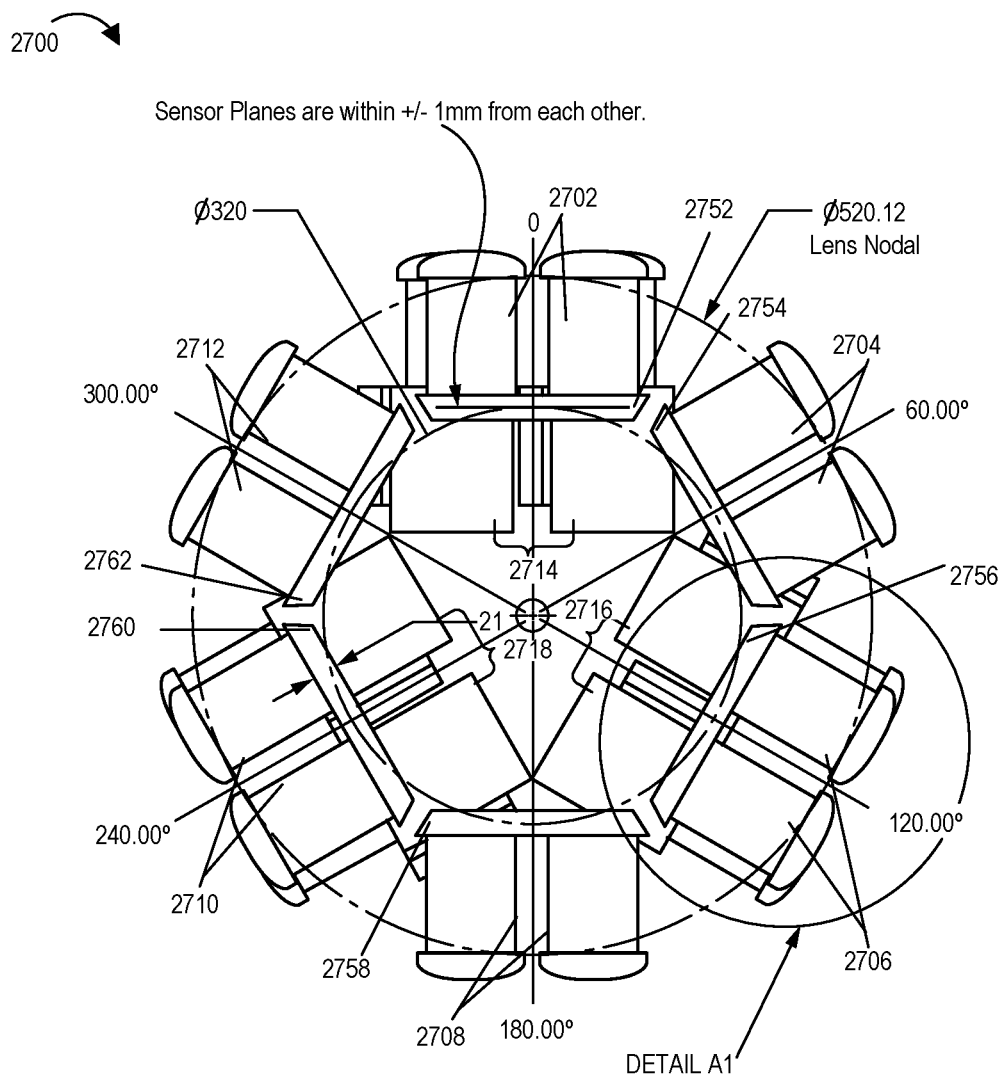
FIG. 25 illustrates a top view of an exemplary bi-level nine stereoscopic camera pair rig in accordance with an exemplary embodiment.

FIG. 25 illustrates a top view of an exemplary bi level nine stereoscopic camera pair rig 2700 in accordance with an exemplary embodiment. The exemplary bi level nine stereoscopic camera pair rig 2700 includes six pairs of stereoscopic cameras arranged on a top level and another three pairs of stereoscopic cameras arranged on a lower level. The top level includes six pairs of stereoscopic cameras 2702, 2704, 2706, 2708, 2710 and 2712 arranged along six sides of a hexagon in the similar manner as illustrated in FIGS. 23-24. The lower level includes three stereoscopic camera pairs 2714, 2716 and 2718 arranged in the same or similar manner as in the case of camera rig 100 of FIGS. 1-2. Each stereoscopic camera pair on the top level and the lower level includes a left eye camera and a right eye camera for capturing left and right eye images respectively. In some embodiments the directions in which each of the camera pairs 2702, 2704, 2706, 2708, 2710 and 2712 face are different and apart by 60 degrees. In some embodiments the directions in which each of the camera pairs 2714, 2716 and 2718 face are different and apart by 120 degrees. In some embodiments the camera pairs 2702 and 2714 face in the same direction. In some embodiments the camera pairs 2706 and 2716 face in the same direction. In some embodiments the camera pairs 2710 and 2718 face in the same direction. In some embodiments the sensor planes 2752, 2754, 2756, 2758, 2760 and 2762 are within a distance of +/−1 mm from each other.

Figure 26:
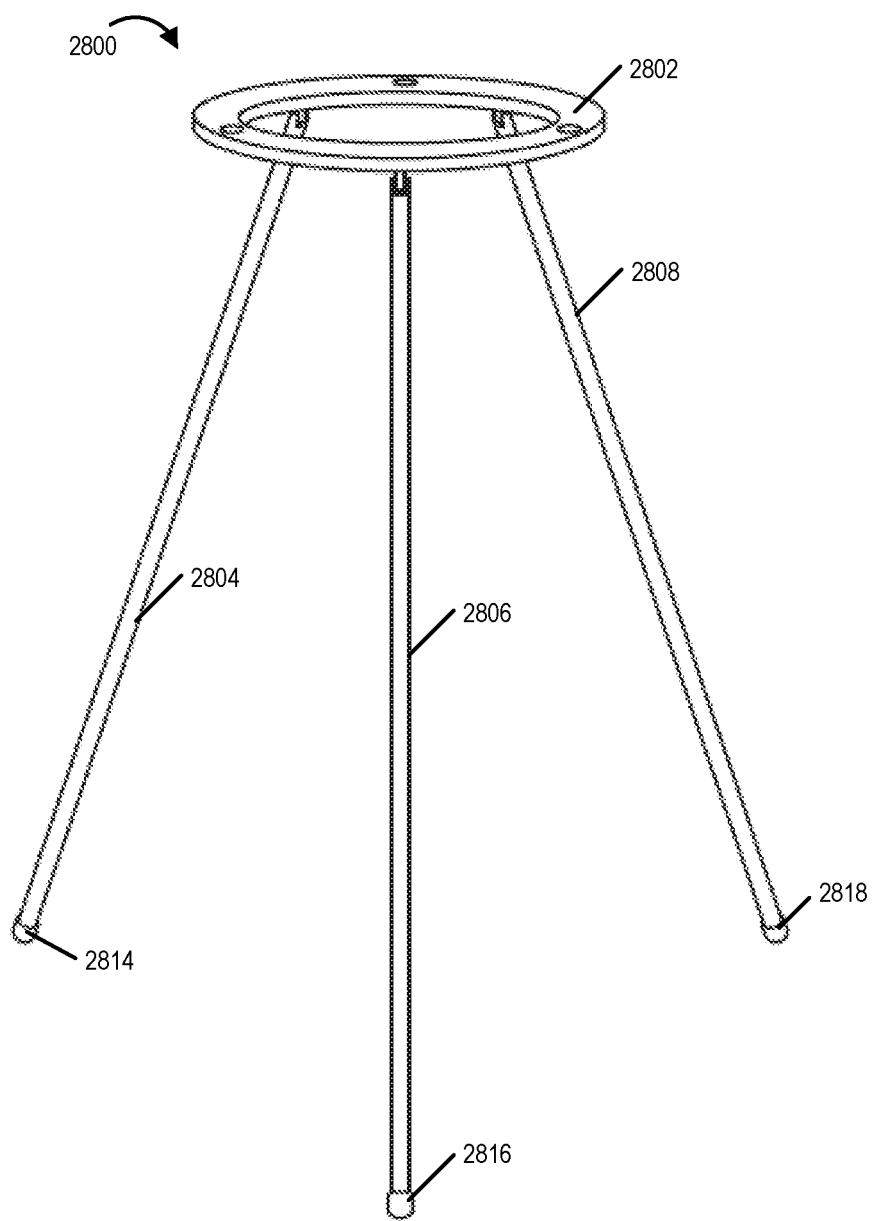
FIG. 26 illustrates an exemplary support structure, e.g., tripod and support ring or plate, which can be used to support various exemplary camera rigs including, for example, the three sided camera rig shown in FIG. 3.

FIG. 26 illustrates an exemplary support structure 2800 including a tripod comprising legs 2804, 2806, 2808 and a support ring or plate 2802 to which a camera rig can be secured, e.g., by screws extending upward through the screw holes in the support ring 2802. The support structure may and sometimes does include feet 2814, 2816, 2808, one foot per leg of the support structure 2800. which can be used to support various exemplary camera rigs including, for example, the three sided camera rig shown in FIG. 3. In some embodiments the legs are welded or bolted to the support ring to secure them in a fixed manner to the support ring. While the legs may be secured in a fixed manner to the support ring 2802 in some embodiments the legs 2804, 2806 and 2808 are attached to the support ring 2802 by hinges and/or pivots. Thus, in the hinged case the legs may be folded inward for transport and spread for use.

Figure 9:
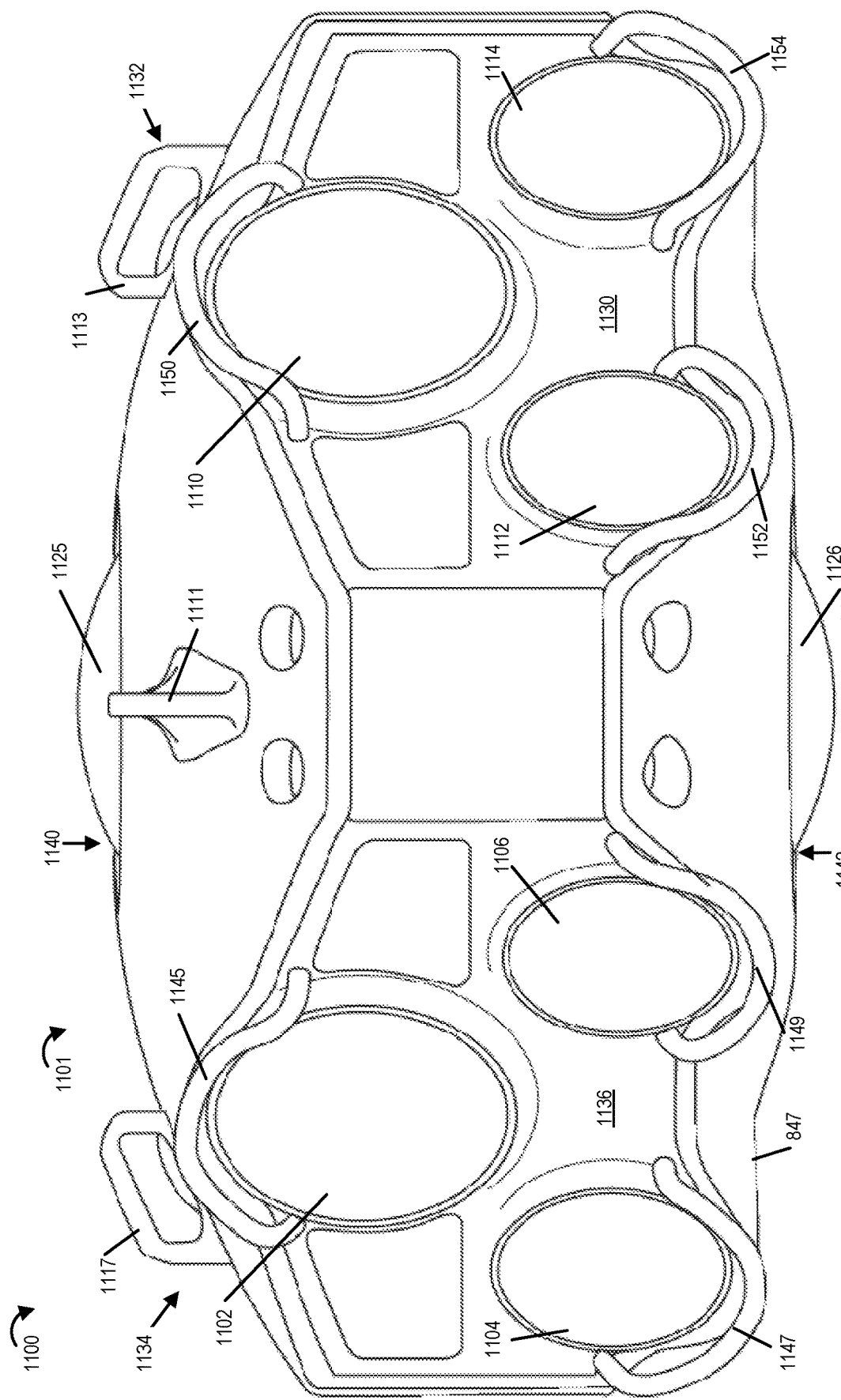
Figure 10:
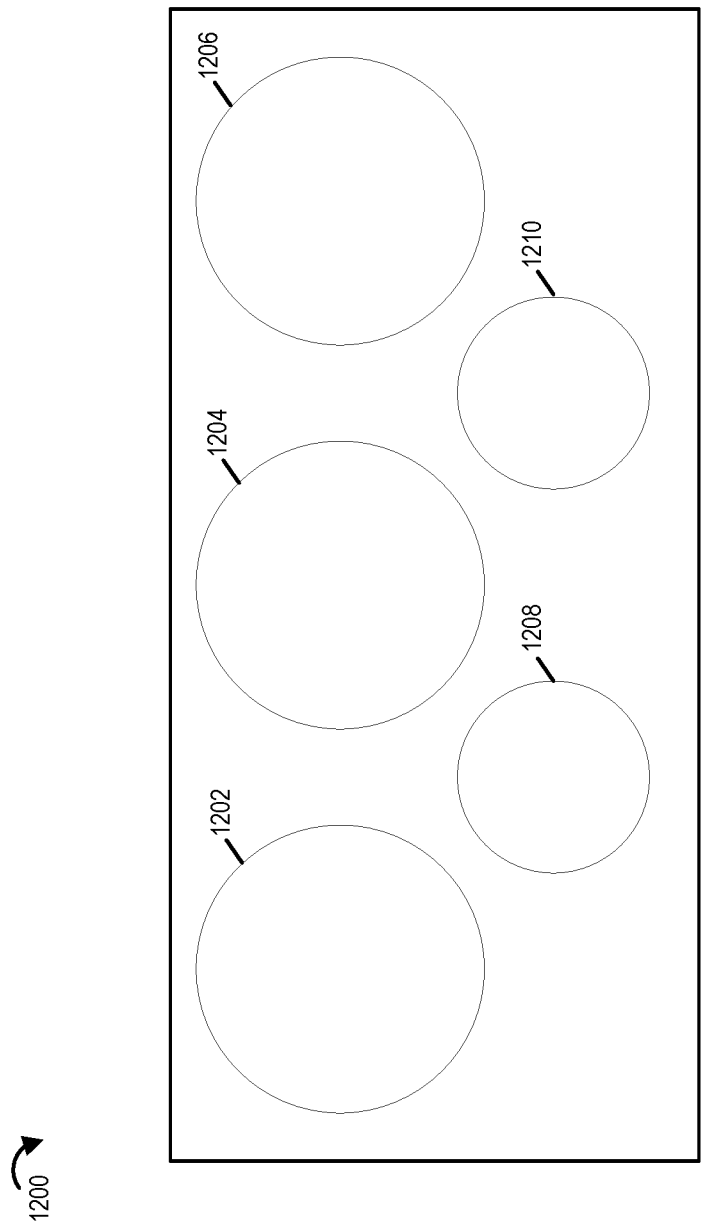
FIG. 10 illustrates a front view of an exemplary arrangement of an array of cameras that can be used in the exemplary camera rigs of the present invention such as camera rigs shown in FIGS. 1-9, in accordance with some embodiments.
Figure 27:
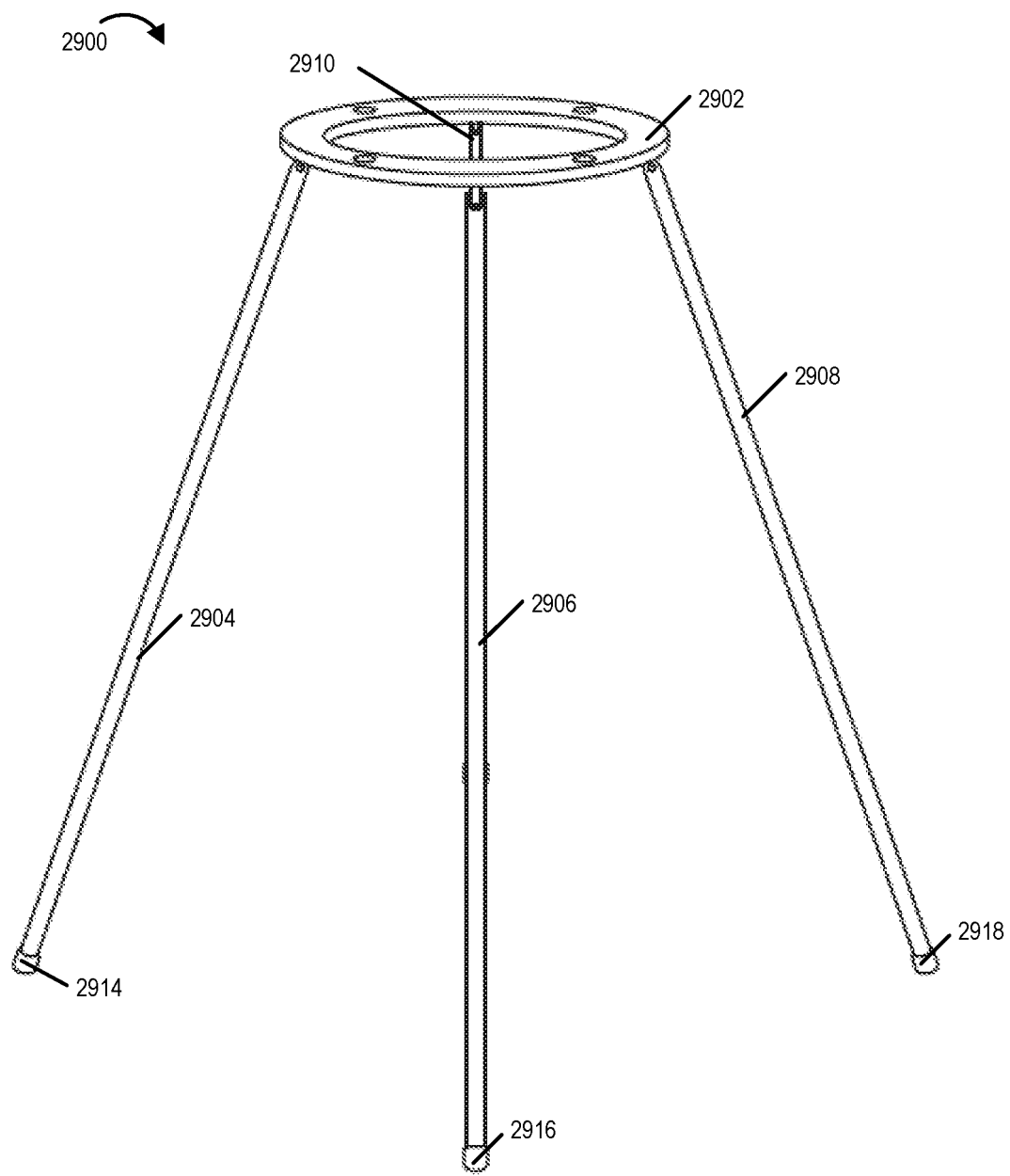
FIG. 27 illustrates an exemplary four legged support structure which can be used to support one or more of the exemplary camera rigs shown in other figures including, for example, the four sided camera rigs shown in FIGS. 8 and 9.

FIG. 27 illustrates an exemplary four legged support structure 2900 which can be used to support one or more of the exemplary camera rigs shown in other figures including, for example, the four sided camera rigs shown in FIGS. 8 and 9. The four legged support structure 2900 includes a support ring 2902 with holes through which screws may be passed to secure a camera rig to the support structure 2900. The support structure 2900 includes four legs 2904, 2906, 2908 and 2910. The legs may be and sometime are secured to the support ring 2902 in a fixed manner, e.g., by being welded or bolted to the support ring. In other embodiments the legs 2904, 2906, 2908 and 2910 are secured to the support ring by a hinge or pivot allowing them to be moved inward for transport.

Figure 28:
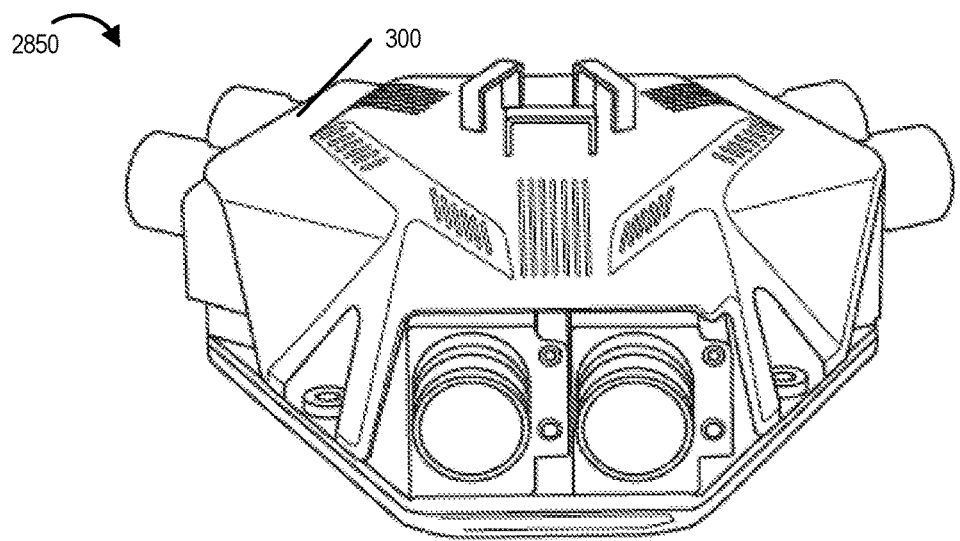
FIG. 28 shows an exemplary stereoscopic camera rig including 3 pairs of cameras and a preferred orientation of the camera rig to the support legs of the tripod support structure shown in FIG. 26 that is used in some but not all embodiments.
Figure 28:
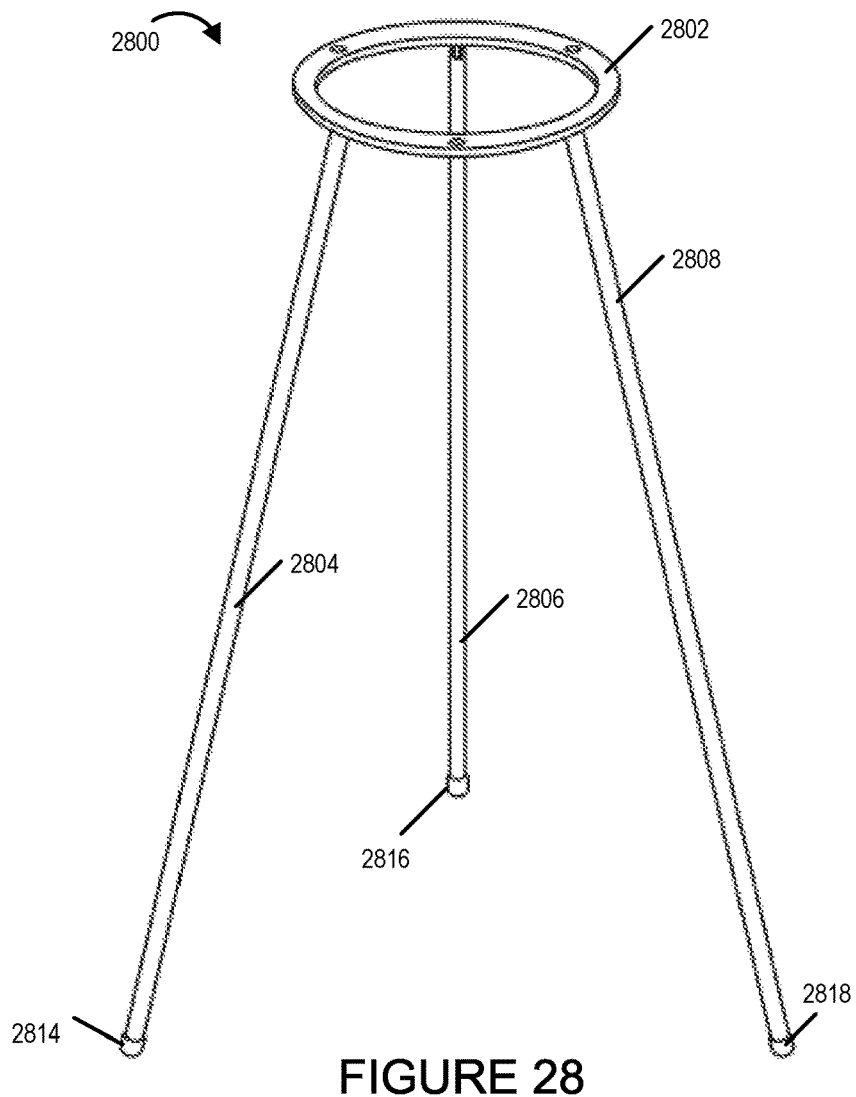

FIG. 28 shows an image 2850 which shows the orientation of an exemplary stereoscopic camera rig 30 including 3 pairs of cameras relative with a preferred camera pair orientation relative to the support legs 2804, 3806, 2808 of the tripod support structure 2800. In this configuration the camera legs are intentionally positioned to be located to correspond to the midpoint between camera pairs of the rig 30. In this way, the legs will appear in the field of view of the cameras, if at all, in the peripheral area where image capture is likely to be blurry or of lower quality due to the use of fish eye lenses on the cameras of the camera pairs include din the rig 30. Thus, the notice-ability of the legs is minimized. In some embodiments the legs are of a known, predetermined color. Image portions of the legs can and sometimes are identified based on their color. location in a captured image and/or shape. In at least some embodiments prior to encoding and transmission, as part of image perpressing, image portions corresponding to the legs of the support structure are replaced with pixel which are the same as neighboring pixels of a capture image and/or which are generated based on neighboring pixels in a captured image. In this way to the extent that a captured image includes a portion of a leg, the portion of the image, e.g., pixels, corresponding to the leg will be removed prior to encoding and transmission to an end playback device. The positioning of the legs so that they will appear, if at all, at an area of low image quality decreases the chance that the image processing used to remove the legs will occur at an area where the image processing to hide the legs is likely to be less noticeable than, for example, if the legs were positioned directly in line with the forward orientation of a camera or camera pair.

Figure 29:
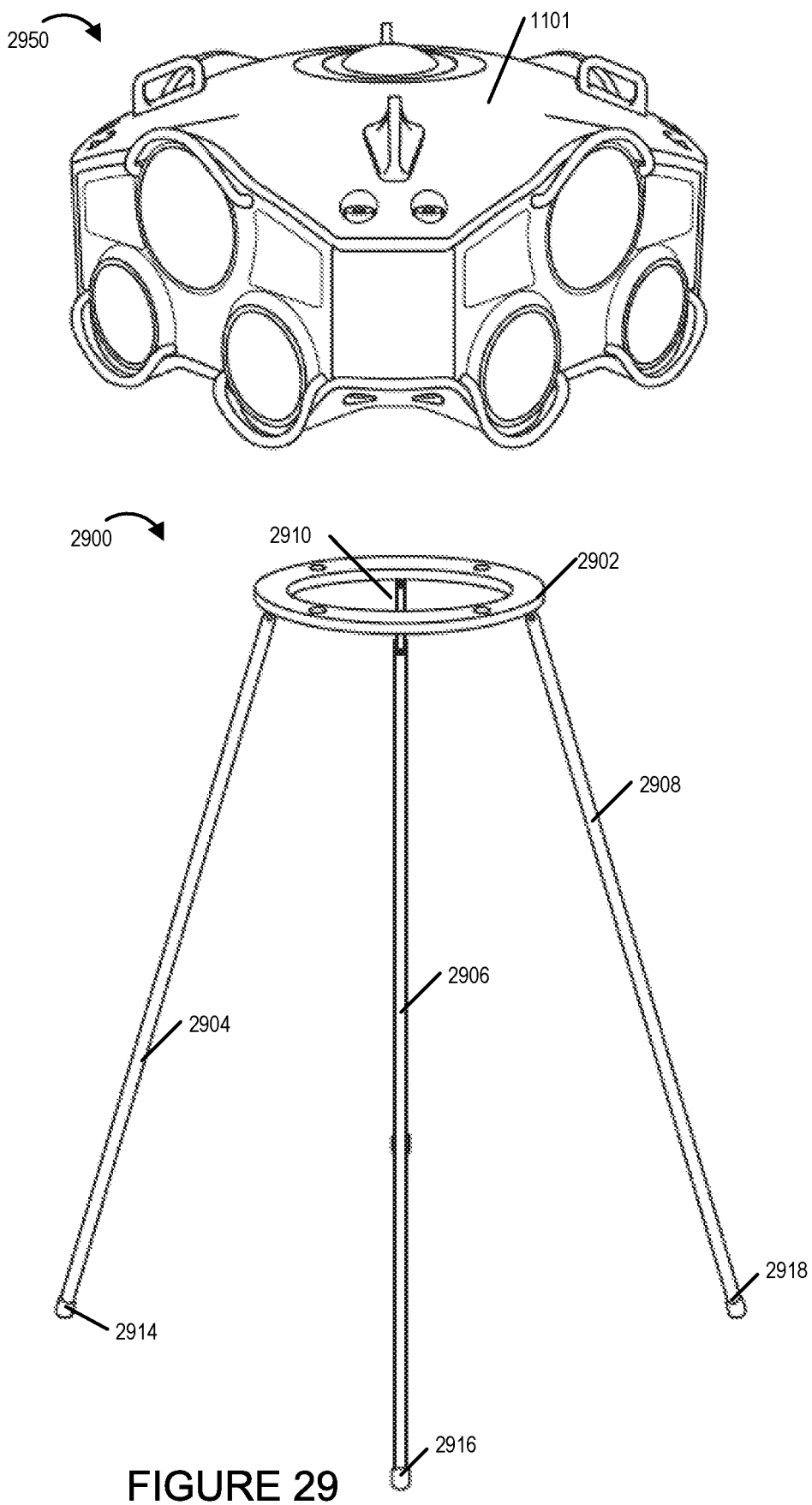
FIG. 29 shows an exemplary camera rig including 4 pairs of cameras used for stereoscopic image capture and a preferred orientation of the camera rig to the support legs of the four legged support structure shown in FIG. 27 that is used in some but not all embodiments.

FIG. 29 shows an exemplary camera rig 1101 including 4 pairs of cameras used for stereoscopic image capture and a preferred orientation of the camera rig to the support legs 2904, 2906, 2908, 2910 of the four legged support structure 2900 shown in FIG. 29 that is used in some but not all embodiments. As with the three legged embodiment, the legs are positioned so that the are offset to the left or right from the forward looking position of a camera or camera pair making the legs and/or the removal of the legs from a captured image less noticeable to an end viewer viewing images in a 3D simulated environment, that uses images captured by the camera rig as textures applied to a 3D model of the environment.

FIG. 30 is an illustration 3050 illustrating how the camera rig 1101 and support structure shown in FIG. 29 may appear during use with the camera rig secured to the support structure. The rig 1101 includes both an upward facing camera and a downward facing camera. A stereoscopic camera pair may be used, and in some embodiments is used, in place of the upward facing camera and downward facing camera. Using a camera rig and stand such as the one shown in FIG. 30, images of the ground, sky and 360 degree environment can be captured at the same time. The images can be and sometimes are, used as textures in a 3D simulated environment.

While steps are shown in an exemplary order it should be appreciated that in many cases the order of the steps may be altered without adversely affecting operation. Accordingly, unless the exemplary order of steps is required for proper operation, the order of steps is to be considered exemplary and not limiting.

While various embodiments have been discussed, it should be appreciated that not necessarily all embodiments include the same features and some of the described features are not necessary but can be desirable in some embodiments.

While various ranges and exemplary values are described the ranges and values are exemplary. In some embodiments the ranges of values are 20% larger than the ranges discussed above. In other embodiments the ranges are 20% smaller than the exemplary ranges discussed above. Similarly, particular values may be, and sometimes are, up to 20% larger than the values specified above while in other embodiments the values are up to 20% smaller than the values specified above. In still other embodiments other values are used.

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., a image data capture and processing system. Various embodiments are also directed to methods, e.g., a method of image capture and/or processing image data. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed:
1. An image capture system, comprising:
a camera rig having a center nodal point of the camera rig, the camera rig comprising:
a first stereoscopic camera pair including a first camera for capturing left eyes images and a second camera for capturing right eye images of an environment of interest, the first stereoscopic camera pair facing away from the center nodal point of the camera rig in a first direction, the first camera having a first optical axis, the second camera having a second optical axis that is parallel to the first optical axis;
a first light field camera, facing away from the center nodal point of the camera rig in the first direction, that captures images used to generate a first environmental depth map, the first environmental depth map representing a three-dimensional environmental model of the environment of interest in the first direction;
a second stereoscopic camera pair including a third camera and a fourth camera facing away from the center nodal point of the camera rig in a second direction, the third camera having a third optical axis, the fourth camera having a fourth optical axis that is parallel to the third optical axis;
a second light field camera, facing away from the center nodal point of the camera rig in the second direction, that captures images used to generate a second environmental depth map, the second environmental depth map representing a three-dimensional environmental model of the environment of interest in the second direction; and a processing system that:
generates a composite depth map using the first environmental depth map captured by the first light field camera and the second environmental depth map captured by the second light field camera, the composite depth map representing a three-dimensional environmental model of the environment of interest in the first direction away from the center nodal point of the camera rig and the second direction away from the center nodal point of the camera rig; and outputs the composite depth map and the left eyes images and the right eye images to a playback device that renders images by applying the left eyes images and the right eye images to the three-dimensional environmental model of the environment of interest.

2. The system of claim 1, wherein the first stereoscopic camera pair and the second stereoscopic camera pair capture different portions of the environment of interest.

3. The system of claim 2,
wherein the first and second cameras are mounted side by side in parallel to each other;
wherein the third and fourth cameras are mounded side by side in parallel with each other;
wherein a distance, D, between the first optical axis of the first camera and the second optical axis of the second camera is the same as a distance between the third optical axis of the third camera and the fourth optical axis of the fourth camera.

4. The system of claim 3, further comprising:
an upward facing camera facing in an upward vertical direction, the system including more cameras facing in the first and second directions than in the upward vertical direction; and
wherein the first and second directions are generally horizontal directions.

5. The system of claim 4, further comprising:
a downward facing camera in a downward vertical direction opposite the upward vertical direction.

6. The system of claim 5, further comprising:
a mounting stand including a circular mounting ring for supporting the first camera pair and the second camera pair, the upward facing camera, and the downward facing camera; and
wherein the downward facing camera is positioned at the center of the mounting ring facing straight down through an opening in the circular mounting ring.

7. The system of claim 2, further comprising:
a fifth camera facing in an upward vertical direction, a lens of the fifth camera being positioned at a central location at the center of a perimeter defined by the first, second, third, and fourth cameras and extending above a top of the first camera;
a sixth camera facing in a downward vertical direction opposite the upward vertical direction, a lens of the sixth camera extending below a bottom of the first camera; and
wherein the first and second directions are generally horizontal directions.

8. The system of claim 7, wherein the lens of the sixth camera extends through a center opening of a support that supports the first, second, third, fourth, fifth, and sixth cameras.

9. The image capture system of claim 1,
wherein the first and second cameras of the first camera pair are positioned adjacent each other with a spacing between the first and second cameras being less than the width of the first camera; and
wherein the third and fourth cameras of the second camera pair are positioned adjacent each other with a spacing between the third and fourth cameras being less than the width of the third camera.

10. The image capture system of claim 9,
wherein a first rear corner of the second camera abuts a rear corner of the third camera; and
wherein a second rear corner of the second camera is positioned adjacent a first rear corner of the first camera.

11. The image capture system of claim 9, wherein a side of the first camera extends parallel to a side of the second camera.

12. The system of claim 1, further comprising:
a third stereoscopic camera pair facing away from the center nodal point of the camera rig in in a third direction, the first and second directions being 120 degrees apart, second and third directions being 120 degrees apart, and the first and third directions being 120 degrees apart; and
a third light field camera, facing away from the center nodal point of the camera rig in the third direction, that captures images used to generate a third environmental depth map, the third environmental depth map representing a three-dimensional environmental model of the environment in the third direction,
wherein the processing system generates the composite depth map of the environment of interest using the first environmental depth map, the second environmental depth map, and the third second environmental depth map.

13. The system of claim 1, wherein:
the first light field camera comprises an array of microlenses; and
the processing system or the playback device is configured to refocus images captured by the array of microlenses.

14. The system of claim 1, wherein the processing system or the playback device is configured to use images captured by the first light field camera to fill in a portion of the left eye image or the right eye image occluded from view from the position of the first stereoscopic camera pair.

15. An image capture and processing method, comprising:
capturing a first set of images using a first stereoscopic camera pair including a first camera and a second camera for capturing left eye images and right eye images, the first stereoscopic camera pair facing away from a center nodal point of a camera rig in a first direction, the first camera having a first optical axis, the second camera having a second optical axis that is parallel to the first optical axis;
capturing images using a first light field camera facing away from the center nodal point of the camera rig in the first direction;
generating a first environmental depth map using the images captured by the first light field camera, the first environmental depth map representing a three-dimensional environmental model of an environment of interest in the first direction;
capturing a second set of images using a second stereoscopic camera pair including a third camera and a fourth camera facing away from the center nodal point of the camera rig in a second direction;

capturing images using a second light field camera facing away from the center nodal point of the camera rig in the second direction;

generating a second environmental depth map using the images captured by the second light field camera, the second environmental depth map representing a three-dimensional environmental model of the environment of interest in the second direction;

generating a composite depth map using the first environmental depth map captured using the first light field camera and the second environmental depth map captured using the second light field camera, the composite depth mep representing a three-dimensional environmental model of the environment of interest in the first direction away from the center nodal point of the camera rig and the second direction away from the center nodal point of the camera rig; and outputting the composite depth map and the left eyes images and the right eye images for transmittal to a playback device that renders images by applying the left eyes images and the right eye images to the three-dimensional environmental model of the environment of interest.

16. The method of claim 15, further comprising:
capturing a third set of images using a fifth camera pointing in an upward vertical direction, the fifth camera being an individual camera positioned at a central location inside a perimeter defined by the position of the first, second, third, and fourth cameras; and
wherein the first and second directions are generally horizontal directions.

17. The method of claim 16, further comprising:
capturing a fourth set of images using a sixth camera facing in a downward vertical direction opposite the upward vertical direction.

18. The method of claim 15, further comprising:
capturing a third set of images using a third stereoscopic camera pair facing away from the center nodal point of the camera rig in in a third direction, the first and second directions being 120 degrees apart, second and third directions being 120 degrees apart, and the first and third directions being 120 degrees apart;
capturing images using a third light field camera facing away from the center nodal point of the camera rig in the third direction; and
generating a third environmental depth map using the images captured using the third light field camera, the third environmental depth map representing a three-dimensional environmental model of the environment of interest in the third direction;
wherein the composite depth map of the environment of interest is generated from the first environmental depth map, the second environmental depth map, and the third second environmental depth map.

19. The method of claim 15, wherein the first light field camera comprises an array of micro-lenses, the method further comprising:
refocusing images captured by the array of micro-lenses.

20. The method of claim 15, further comprising:
using images captured by the first light field camera to fill in a portion of the left eye image or the right eye image occluded from view from the position of the first stereoscopic camera pair.

* * * * *